(12) United States Patent
Tajima et al.

(10) Patent No.: US 9,131,203 B2
(45) Date of Patent: Sep. 8, 2015

(54) INFORMATION RECORDING MEDIUM, REPRODUCTION METHOD AND RECORDING METHOD USING INFORMATION RECORDING MEDIUM, INFORMATION RECORDING/REPRODUCTION DEVICE, AND 3D CONVERSION UNIT AND INFORMATION RECORDING DEVICE

(75) Inventors: Hideharu Tajima, Osaka (JP); Shigemi Maeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 603 days.

(21) Appl. No.: 13/499,189

(22) PCT Filed: Sep. 28, 2010

(86) PCT No.: PCT/JP2010/066860
§ 371 (c)(1),
(2), (4) Date: Mar. 29, 2012

(87) PCT Pub. No.: WO2011/040414
PCT Pub. Date: Apr. 7, 2011

(65) Prior Publication Data
US 2012/0183277 A1    Jul. 19, 2012

(30) Foreign Application Priority Data

Sep. 30, 2009  (JP) ................................ 2009-227529
Sep. 30, 2009  (JP) ................................ 2009-227530
Sep. 28, 2010  (JP) ................................ 2010-217346

(51) Int. Cl.
*H04N 5/92*    (2006.01)
*H04N 9/82*    (2006.01)
(Continued)

(52) U.S. Cl.
CPC ........ *H04N 9/8227* (2013.01); *G11B 20/10527* (2013.01); *G11B 20/1217* (2013.01);
(Continued)

(58) Field of Classification Search
CPC .................... G11B 20/10527; G11B 20/1217; G11B 20/1262; G11B 2020/10611; G11B 2220/211; G11B 2220/235; G11B 27/322; H04N 9/8227; H04N 21/42646; H04N 21/4334; H04N 21/6581; H04N 13/0055; H04N 5/85
USPC ................................................. 386/241, 248
See application file for complete search history.

(56) References Cited

U.S. PATENT DOCUMENTS 5,596,421 A * 1/1997 Shibata et al. ................ 386/355
5,923,869 A   7/1999 Kashiwagi et al.
(Continued)

FOREIGN PATENT DOCUMENTS

CN    1871644 A    11/2006
JP    62-166669 A   7/1987
(Continued)

OTHER PUBLICATIONS

English Translation of Japanese Publication 2000-092519 Mar. 2000.*
(Continued)

*Primary Examiner* — William Tran
(74) *Attorney, Agent, or Firm* — Keating & Bennett, LLP

(57) ABSTRACT

Where 3D conversion complementary information for 3D conversion of a TV program is pre-recorded on a first information recording area of an optical disc, a content recording area is set to an area on which the TV program relating to the 3D conversion complementary information is recordable. Where the 2D video content is pre-recorded on the first information recording area, download information, etc for recording the 3D conversion complementary information on a 3D conversion complementary information recording space is pre-recorded on a third information recording area so that 2D video content can be reproduced as 3D video. This allows recording and viewing 3D video by easily converting 2D video content, without changing standards and communication formats of generally available 2D video contents and while suppressing an increase in distributed information amount caused by conversion to 3D video.

30 Claims, 27 Drawing Sheets

(51) Int. Cl.
  *G11B 20/10* (2006.01)
  *G11B 20/12* (2006.01)
  *H04N 5/85* (2006.01)
  *H04N 21/426* (2011.01)
  *H04N 21/433* (2011.01)
  *H04N 21/658* (2011.01)
  *H04N 13/00* (2006.01)
  *G11B 27/32* (2006.01)

(52) U.S. Cl.
  CPC .......... *G11B20/1262* (2013.01); *G11B 27/322* (2013.01); *H04N 5/85* (2013.01); *H04N 13/0055* (2013.01); *H04N 21/42646* (2013.01); *H04N 21/4334* (2013.01); *H04N 21/6581* (2013.01); *G11B 2020/10611* (2013.01); *G11B 2220/211* (2013.01); *G11B 2220/235* (2013.01)

(56) References Cited

U.S. PATENT DOCUMENTS

| | | |
|---|---|---|
| 6,215,590 B1 | 4/2001 | Okano |
| 6,393,574 B1 | 5/2002 | Kashiwagi et al. |
| 6,470,460 B1 | 10/2002 | Kashiwagi et al. |
| 6,573,819 B1 | 6/2003 | Oshima et al. |
| 6,574,423 B1 | 6/2003 | Oshima et al. |
| 6,925,250 B1 | 8/2005 | Oshima et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0044570 A1* | 3/2004 | Aoyama ........................ 705/14 |
| 2004/0175133 A1 | 9/2004 | Kashiwagi et al. |
| 2004/0179820 A1 | 9/2004 | Kashiwagi et al. |
| 2005/0105892 A1* | 5/2005 | Sugimura et al. ............... 386/95 |
| 2005/0180735 A1 | 8/2005 | Oshima et al. |
| 2006/0087954 A1* | 4/2006 | Hwang et al. ............. 369/272.1 |
| 2006/0204075 A1 | 9/2006 | Mashitani et al. |
| 2008/0018731 A1 | 1/2008 | Era |
| 2008/0046907 A1 | 2/2008 | Nishikiori et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0187287 A1 | 8/2008 | Sugimura et al. |
| 2008/0187288 A1 | 8/2008 | Sugimura et al. |
| 2008/0292287 A1 | 11/2008 | Oshima et al. |
| 2009/0041425 A1 | 2/2009 | Sugimura et al. |
| 2009/0041427 A1 | 2/2009 | Sugimura et al. |
| 2009/0097821 A1 | 4/2009 | Yahata et al. |
| 2009/0142041 A1* | 6/2009 | Nagasawa et al. ............ 386/124 |
| 2009/0154904 A1 | 6/2009 | Yahata et al. |
| 2009/0185791 A1 | 7/2009 | Yahata et al. |
| 2009/0208189 A1* | 8/2009 | Sasaki et al. .................. 386/125 |
| 2009/0220215 A1 | 9/2009 | Oshima et al. |
| 2009/0252483 A1 | 10/2009 | Oshima et al. |
| 2009/0310935 A1 | 12/2009 | Era |
| 2010/0020158 A1 | 1/2010 | Oshima et al. |
| 2010/0111503 A1 | 5/2010 | Oshima et al. |
| 2010/0119213 A1 | 5/2010 | Oshima et al. |
| 2011/0038614 A1* | 2/2011 | Chen et al. .................... 386/341 |
| 2011/0080468 A1 | 4/2011 | Oshima et al. |
| 2011/0181695 A1 | 7/2011 | Oshima et al. |
| 2011/0181696 A1 | 7/2011 | Oshima et al. |
| 2011/0181697 A1 | 7/2011 | Oshima et al. |
| 2011/0181698 A1 | 7/2011 | Oshima et al. |
| 2011/0181699 A1 | 7/2011 | Oshima et al. |
| 2011/0181700 A1 | 7/2011 | Oshima et al. |
| 2011/0234751 A1 | 9/2011 | Oshima et al. |
| 2011/0234752 A1 | 9/2011 | Oshima et al. |
| 2011/0236001 A1 | 9/2011 | Oshima et al. |
| 2011/0279642 A1 | 11/2011 | Oshima et al. |
| 2012/0002943 A1 | 1/2012 | Yahata et al. |
| 2012/0189276 A1 | 7/2012 | Oshima et al. |
| 2012/0189277 A1 | 7/2012 | Oshima et al. |
| 2012/0189278 A1 | 7/2012 | Oshima et al. |

FOREIGN PATENT DOCUMENTS

| | | |
|---|---|---|
| JP | 7-030925 A | 1/1995 |
| JP | 8-307902 A | 11/1996 |
| JP | 9-009296 A | 1/1997 |
| JP | 11-234703 A | 8/1999 |
| JP | 2000-270347 A | 9/2000 |
| JP | 2001-325618 A | 11/2001 |
| JP | 2002-016945 A | 1/2002 |
| JP | 2002-319244 A | 10/2002 |
| JP | 2004-094618 A | 3/2004 |
| JP | 2004-112658 A | 4/2004 |
| JP | 2004-214763 A | 7/2004 |
| JP | 2005-117515 A | 4/2005 |
| JP | 2005-252989 | 9/2005 |
| JP | 2006-319469 A | 11/2006 |
| JP | 2007-166651 A | 6/2007 |
| JP | 2008-500790 A | 1/2008 |
| JP | 2009-135686 A | 6/2009 |
| WO | WO-2004056133 A1 | 7/2004 |
| WO | WO-2005/114998 A1 | 12/2005 |
| WO | WO-2006/109716 A1 | 10/2006 |
| WO | WO-2008/069613 A1 | 6/2008 |
| WO | WO-2009/101787 A1 | 8/2009 |

OTHER PUBLICATIONS

International Search Report from International Application No. PCT/JP2010/066860, mailed on Nov. 9, 2010.

Kinbra and Fujiwara "Applied Physics Samplers 3. Thin Film", (Oyo Butsurigaku Sensho 3. Hakumaku), Published by Shokabo Publishing Co. Ltd., 1st edition, printed on Jun. 5, 1979 and published on Jun. 10, 1979. Partial Translation.

"We leads the 3D revolution" Panasonic introduced first "3D VIERA", IT media News (Feb. 10, 2010), http://www.itmedia.co.jp/news/articles/1002/10/news020.html. Partial Translation.

* cited by examiner

FIG. 1

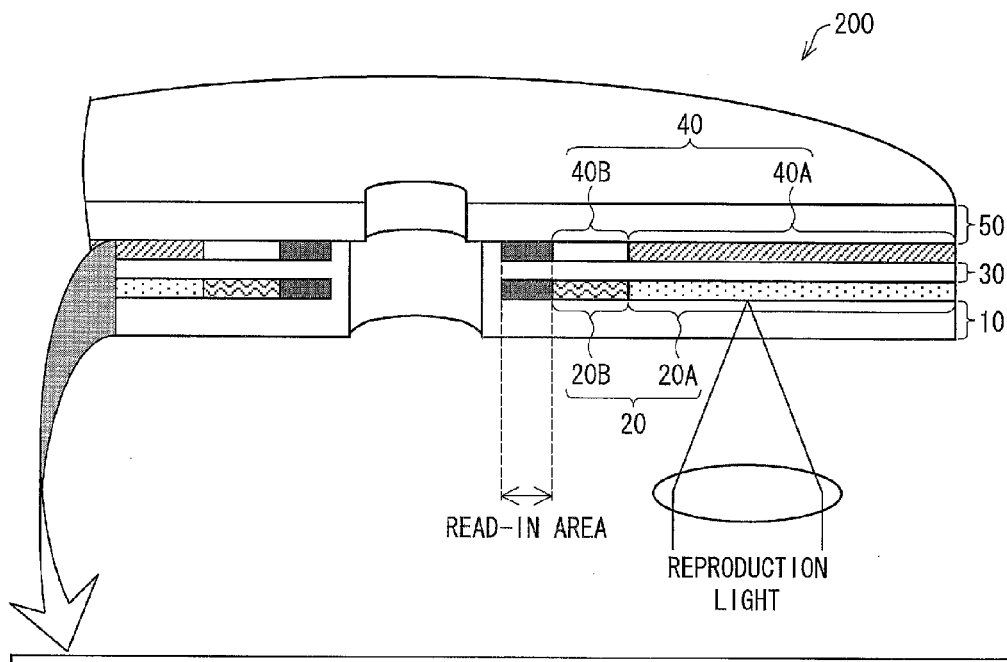

READ-IN AREA

REPRODUCTION LIGHT

| OPTICAL INFORMATION RECORDING MEDIUM 200 |||
|---|---|---|
| RECORDING AREA | RECORDED INFORMATION | STATUS |
| FIRST INFORMATION RECORDING AREA 20A (ROM) | 3D CONVERSION COMPLEMENTARY INFORMATION FOR TV PROGRAM P (2D VIDEO) | ALREADY RECORDED |
| SECOND INFORMATION RECORDING LAYER 40 (RE OR R) / CONTENT RECORDING AREA 40A | NONE | TV PROGRAM P CAN BE RECORDED |
| SECOND INFORMATION RECORDING LAYER 40 (RE OR R) / INVALIDATION INFORMATION RECORDING AREA 40B | NONE | INVALIDATION INFORMATION ON PRESET RECORDING OF TV PROGRAM P CAN BE RECORDED |
| THIRD INFORMATION RECORDING AREA 20B | PRESETTING INFORMATION FOR RECORDING TV PROGRAM | ALREADY RECORDED |
| THIRD INFORMATION RECORDING AREA 20B | DATA ARRANGING INFORMATION FOR 3D CONVERSION, WHICH IS TO BE RECORDED ON CONTENT RECORDING AREA 40A | ALREADY RECORDED |
| THIRD INFORMATION RECORDING AREA 20B | 3D CONVERSION PERMISSION KEY | ALREADY RECORDED |

F I G. 3

| OPTICAL INFORMATION RECORDING MEDIUM 200 ||||
|---|---|---|---|
| RECORDING AREA || RECORDED INFORMATION | STATUS |
| FIRST INFORMATION RECORDING AREA 20A (ROM) || DECOMPRESSING SOFTWARE FOR DATA BROADCASTING (3D CONVERSION COMPLEMENTARY INFORMATION FOR TV PROGRAM P) | ALREADY RECORDED |
| SECOND INFORMATION RECORDING LAYER 40 (RE OR R) | CONTENT RECORDING AREA 40A | NONE | TV PROGRAM P (2D VIDEO) CAN BE RECORDED |
| | INVALIDATION INFORMATION RECORDING AREA 40B | NONE | INVALIDATION INFORMATION ON PRESET RECORDING OF TV PROGRAM P (2D VIDEO) CAN BE RECORDED |
| THIRD INFORMATION RECORDING AREA 20B || PRESETTING INFORMATION FOR RECORDING TV PROGRAM | ALREADY RECORDED |
| || DATA ARRANGING INFORMATION FOR 3D CONVERSION, WHICH IS TO BE RECORDED ON CONTENT RECORDING AREA 40A | ALREADY RECORDED |
| || 3D CONVERSION PERMISSION KEY | ALREADY RECORDED |

FIG. 4

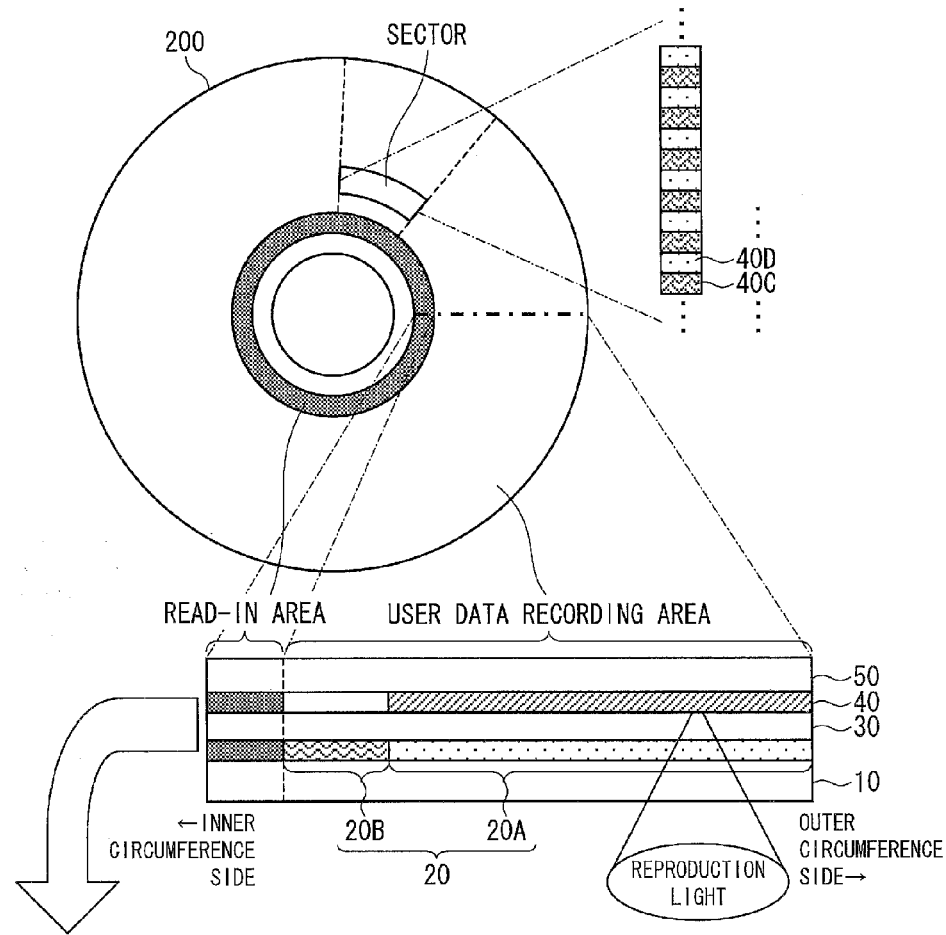

| OPTICAL INFORMATION RECORDING MEDIUM 200 ||||
|---|---|---|---|
| RECORDING AREA || RECORDED INFORMATION | STATUS |
| FIRST INFORMATION RECORDING AREA 20A (ROM) || 2D VIDEO CONTENT P' | ALREADY RECORDED |
| SECOND INFORMATION RECORDING LAYER 40 (RE OR R) | 3D CONVERSION COMPLEMENTARY INFORMATION RECORDING SPACE 40C | NONE | 3D CONVERSION COMPLEMENTARY INFORMATION FOR 2D VIDEO CONTENT P' CAN BE RECORDED |
| | 2D VIDEO RECORDING SPACE 40D | NONE | 2D VIDEO, WHICH IS 2D VIDEO CONTENT P', CAN BE RECORDED |
| THIRD INFORMATION RECORDING AREA 20B || INFORMATION FOR DOWNLOADING 3D CONVERSION COMPLEMENTARY | ALREADY RECORDED |
| || DATA ARRANGING INFORMATION FOR 3D CONVERSION | ALREADY RECORDED |
| || DECOMPRESSING SOFTWARE FOR 3D CONVERSION COMPLEMENTARY INFORMATION | ALREADY RECORDED |
| || 3D CONVERSION PERMISSION KEY | ALREADY RECORDED |

F I G. 5

(a)

| LEFT EYE VIDEO INFORMATION L1' | | LEFT EYE VIDEO INFORMATION L2' | | LEFT EYE VIDEO INFORMATION L3' | | LEFT EYE VIDEO INFORMATION L4' | |
|---|---|---|---|---|---|---|---|
| 40C | 40D | 40C | 40D | 40C | 40D | 40C | 40D |

(b)

| LEFT EYE VIDEO INFORMATION L1' | COMPLEMENTARY INFORMATION R1' FOR PREPARING RIGHT EYE VIDEO | LEFT EYE VIDEO INFORMATION L2' | COMPLEMENTARY INFORMATION R2' FOR PREPARING RIGHT EYE VIDEO | LEFT EYE VIDEO INFORMATION L3' | COMPLEMENTARY INFORMATION R3' FOR PREPARING RIGHT EYE VIDEO | LEFT EYE VIDEO INFORMATION L4' | COMPLEMENTARY INFORMATION R4' FOR PREPARING RIGHT EYE VIDEO |
|---|---|---|---|---|---|---|---|
| 40C | 40D | 40C | 40D | 40C | 40D | 40C | 40D |

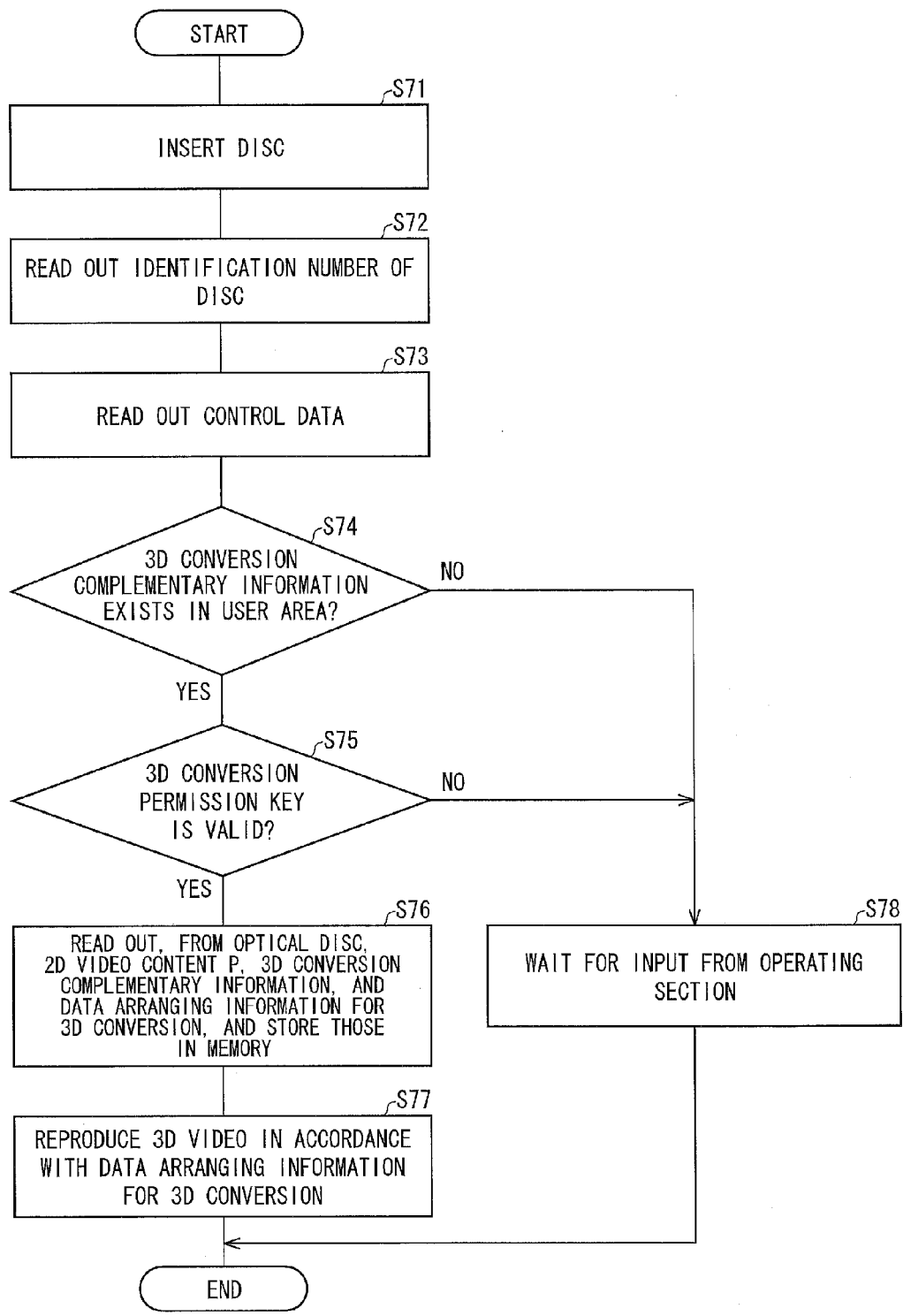

INFORMATION RECORDING MEDIUM, REPRODUCTION METHOD AND RECORDING METHOD USING INFORMATION RECORDING MEDIUM, INFORMATION RECORDING/REPRODUCTION DEVICE, AND 3D CONVERSION UNIT AND INFORMATION RECORDING DEVICE

CROSS-REFERENCE TO RELATED APPLICATIONS

This application is the national stage application pursuant to 35 U.S.C. §371 of PCT International Application No. PCT/JP2010/066860, filed Aug. 28, 2010, which claims priority to Japanese Patent Application No. 2009-227529, filed Sep. 30, 2009; Japanese Patent Application No. 2009-227530, filed Sep. 30, 2009; and Japanese Patent Application No. 2010-217346, filed Sep. 28, 2010. The contents of these applications are incorporated herein by reference in their entirety.

TECHNICAL FIELD

The present invention relates to (i) an information recording medium for performing viewing and the like of a three-dimensional (hereinafter, abbreviated to "3D") video, (ii) a method for reproducing the 3D video recorded on the information recording medium, (iii) a method for recording the 3D video on the information recording medium, (iv) an information recording/reproducing device configured to record and reproduce the 3D video, (v) a 3D conversion unit, and (vi) an information recording device including the 3D conversion unit.

BACKGROUND ART

In recent years, methods for handling (e.g., viewing) a 3D video, not a 2D video, have been actively studied.

In order for a user to view the 3D video, it is necessary that, for example, (i) a right eye video and a left eye video for the 3D video are separately displayed, and (ii) the user watches the right eye video and the left eye video by the right eye and the left eye, respectively, with the use of a pair of polarized glasses or the like.

Patent Literature 1 discloses a stereoscopic image recording method, as an example of a conventional technique to view a 3D video.

According to the stereoscopic image recording method disclosed in Patent Literature 1, a left eye video and a right eye video for a 3D video are arranged in such a sequence that the 3D video can be outputted, and the left eye video and the right eye video thus arranged are recorded on an optical disc. This allows viewing of the 3D video.

As another example of the conventional technique to view the 3D video, Patent Literature 2 discloses a video tape recorder.

According to the video tape recorder disclosed in Patent Literature 2, images in odd-numbered fields and images in even-numbered fields for a 3D video are selected and reproduced such that the 3D video can be viewed.

Although not relating to viewing of the 3D video, Patent Literature 3 discloses a recording medium, which exemplifies a technique to reproduce pieces of information in a plurality of fields by combining the pieces of information.

According to the recording medium disclosed in Patent Literature 3, a mainstream delivered from the Internet and a sub-stream read out from a ROM (read only memory) are simultaneously supplied to a TV (television) so that the pieces of information in the plurality of fields are combined and reproduced.

CITATION LIST

[Patent Literatures]
[Patent Literature 1]
Japanese Patent Application Publication Tokukai No. 2009-135686 A (Publication date: Jun. 18, 2009)
[Patent Literature 2]
Japanese Patent Application Publication Tokukaisho No. 62-166669 A (Publication date: Jul. 23, 1987)
[Patent Literature 3]
International Publication No. WO2006/109716 A1 (Publication date: Oct. 19, 2006)
[Non Patent Literature]
[Non Patent Literature 1]
"Selected Writings of Applied Physics 3. Thin Film" by Akira Kinbara and Hideo Fujiwara, published by SHOKABO PUBLISHING Co., Ltd. on Jun. 20, 1979, on page 198

SUMMARY OF INVENTION

Technical Problem

However, each of above Patent Literatures relating the conventional techniques to view the 3D video merely discloses the method for reproducing the 3D video by utilizing the two types of videos for the 3D video, which videos have been prepared in advance. That is, above Patent Literatures do not disclose or suggest at all a method for recording a 3D video on an information recording medium or for viewing the 3D video, which has been obtained by easily converting a generally available 2D video content into the 3D video.

In a case where a 2D video is converted into a 3D video, such conversion requires extra amount of information, which amount is at least approximately 30% of an information amount of the 2D video.

For example, a maximum transfer rate of a current broadcasting system (e.g., digital terrestrial broadcasting) is 17 Mbps (Mega-bits/second), which includes (i) approximately 15 Mbps of a transfer rate for broadcasting a main content and (ii) approximately 2 Mbps of a transfer rate for broadcasting a sub content. That is, the transfer rate for broadcasting the sub content is approximately 13% with respect to the transfer rate for broadcasting the main content.

Under the circumstances, it is difficult to utilize with the current broadcasting system to broadcast the 3D video as it is, unless the maximum transfer rate of the current broadcasting system is increased. Alternatively, if the current broadcasting system is changed to decrease the transfer rate for broadcasting the main content, image quality and the like of the main content will be deteriorated. Therefore, such a method is not practical, in which the transfer rate for broadcasting the main content is decreased.

Meanwhile, it may seem that the 3D video as it is could be distributed via the Internet or the like, because the Internet or the like has a higher maximum transfer rate to allow distribute a video content therethrough. However, in order to distribute the 3D video as it is via the Internet or the like, it is necessary to change current standards, communication systems, and the like, because such standards and communication systems are predicated on distribution of the 2D video. Therefore, it is still not practical to distribute the 3D video as it is via the Internet or the like.

In view of the circumstances, in order to enhance convenience for users, it has been required to contrive a method or the like for recording or for viewing the 3D video, by easily converting a generally available 2D video content (e.g., a broadcast program), without changing the standards and the communication systems.

However, according to the conventional stereoscopic image recording method disclosed in Patent Literature 1 and the conventional video tape recorder disclosed in Patent Literature 2, only the method and the like are disclosed, in which the two types of videos for the 3D video, which videos are prepared in advance, are recorded on the information recording medium. That is, Patent Literatures 1 and 2 do not disclose at all a method or the like for recording a 3D video on an information recording medium or for viewing the 3D video, which has been obtained by easily converting, into the 3D video, a video content which is a generally available 2D video (hereinafter, referred to as "2D video content"), without changing the standards and the communication systems for such a 2D video content.

Moreover, Patent Literatures 1 and 2 do not disclose or suggest at all a method or the like for recording a 3D video on an information recording medium or for viewing the 3D video, which has been obtained by easily converting a 2D video content into the 3D video, while suppressing an increase in information amount of distributed information, which increase is caused by the conversion of the 2D video content into the 3D video.

Furthermore, the conventional recoding medium disclosed in Patent Literature 3 is based on the idea of combining and reproducing the pieces of information in the plurality of fields. However, in the first place, Patent Literature 3 does not disclose at all an idea of viewing a 3D video.

The present invention is attained in view of the conventional problems, and an object of the present invention is to provide an information recording medium and the like which allows recording and viewing of a the three-dimensional video, which has been obtained by easily converting the two-dimensional video content into the three-dimensional video, while suppressing an increase in information amount of distributed information, which increase is caused by the conversion of the two-dimensional video content into the three-dimensional video. Such an object of the present invention can be attained, (i) without changing the standards and the communication systems for the generally available two-dimensional video content or (ii) regardless of whether or not the two-dimensional video content is generally available one.

Solution to Problem

In order to attain the object, an information recording medium of the present invention includes: at least one recording layer, which is at least readable to read out information therefrom, the at least one recording layer to which a plurality of information recording areas are allotted, the plurality of information recording areas including (i) a first information recording area on which complementary information is recorded in advance and (ii) a second information recording area on which a two-dimensional video content relating to the complementary information is recordable, and the complementary information being information for use in converting the two-dimensional video content into a three-dimensional video.

According to the configuration, the information recording medium of the present invention includes the at least one recording layer, (i) which is at least readable to read out information therefrom, and (ii) to which a plurality of information recording areas are allotted. With the configuration, in a case where information is recorded on the at least one recording layer, the information can be read out.

Moreover, the plurality of information recording areas include the first information recording area and the second information recording area.

Note that the plurality of information recording areas may include an information recording area other than the first information recording area and the second information recording area.

In a case where the at least one recording layer of the information recording medium is a single recording layer, all the plurality of information recording areas including the first information recording area and the second information recording area are allotted to the single recording layer.

In a case where the at least one recording layer of the information recording medium is a plurality of recording layers, the first information recording area and the second information recording area can be allotted to (i) different ones of the plurality of recording layers or (ii) one of the plurality of recording layers.

On the first information recording area, the complementary information is recorded in advance. The complementary information is information for use in converting, into a three-dimensional video, a predetermined two-dimensional video content which is generally available and is to be externally obtained via broadcasting, the Internet, or the like.

Note that information other than the complementary information can be recorded on the first information recording area in advance.

On the second information recording area, the two-dimensional video content relating to the complementary information is recordable.

Note that information other than the two-dimensional video content can be recorded on the second information recording area.

With the configuration above, it is substantially possible to record the three-dimensional video, which has been obtained by easily converting the two-dimensional video content into the three-dimensional video, merely by recording, on the second information recording area, the two-dimensional video content relating to the (particular) complementary information.

Accordingly, it is possible to read out, from the information recording medium of the present invention, the complementary information and the two-dimensional video content relating to the complementary information. This allows viewing of the three-dimensional video which has been obtained by converting the two-dimensional video content into the three-dimensional video.

Moreover, since the three-dimensional video can be obtained by utilizing the generally available two-dimensional video content, it is not necessary to change the standard and the communication system for the two-dimensional video content.

This allows recording and viewing of the three-dimensional video which has been obtained by easily converting the generally available two-dimensional video content into the three-dimensional video, without changing the standards and the communication systems for the generally available two-dimensional video content.

Note that Patent Literatures 1 through 3 are completely silent about (i) the problem that if three-dimensional contents are broadcasted under the current circumstances where most of TVs in use are dedicated to two-dimensional contents, such three-dimensional contents cannot be viewed with the most of TVs and (ii) a method for obtaining the "complementary information" of the present invention, which solves such a problem.

As above described, the maximum transfer rate of the digital terrestrial broadcasting is 17 Mbps, which includes (i) approximately 15 Mbps of the transfer rate for broadcasting the main content and (ii) approximately Mbps of the transfer rate for broadcasting the sub content. That is, the transfer rate for broadcasting the sub content is approximately 13% with respect to the transfer rate for broadcasting the main content.

Under the circumstances, if the three-dimensional video is distributed via the digital terrestrial broadcasting without increasing the maximum transfer rate, the main content (broadcast content) is to be broadcasted at a transfer rate of approximately 6.7 Mbps or less, assuming that the sub content (complementary information) is broadcasted at the transfer rate of approximately 2 Mbps. This concomitantly causes a problem that the image quality of the main content is drastically deteriorated.

However, the information recording medium of the present invention is on the premise of utilizing a broadcast content (in general, a two-dimensional video), as it is, which is broadcasted in practice. In other words, it is not necessary to decrease the transfer rate of the main content. This allows recording or viewing of the three-dimensional video, which has been obtained by easily converting the broadcast content (two-dimensional video) into the three-dimensional video, without deteriorating image quality of the broadcast content. Therefore, the present invention does not cause the problem of image quality deterioration concomitantly caused by the decrease in the transfer rate of the main content.

Here, examples of the "two-dimensional video content" encompass a moving image (containing data such as music data, audio data, and text data such as of subtitles) and a still image such as images for use in frame-by-frame advance reproduction.

Examples of standards of a data format and a data compression system for the "two-dimensional video content" encompass (i) Flash (that is software for creating animation for the Web, sold by Macromedia) which relates to a video, (ii) JPEG (Joint Photographic Experts Group) standard which relates to compression of still image, and (iii) MPEG (Moving Picture Experts Group) standard which relates to compression of moving image.

Note that the MPEG standard is a standard relating to compression and decompression of moving image data and audio data, and is recommended, as a standard technology, by ITU-T (International Telecommunications Union-Telecommunication Standardization Sector) and ISO (International Organization for Standardization). Currently, the MPEG standard encompasses (i) MPEG1 for a medium such as a video CD, (ii) MPEG2 for a DVD (Digital Versatile Disc) and for broadcasting, and (iii) MPEG4 for distribution on a network and for a portable terminal.

Examples of a method for distributing the "two-dimensional video content" encompass wired or wireless communications such as Bluetooth (registered trademark), Felica, PLC (power line communication), Wireless LAN (WLAN), IrDA (infrared wireless communication), IrSS (infrared wireless communication), and WCDMA (communication network).

Examples of the "broadcast content", which is the "two-dimensional video content", encompass broadcast programs which are broadcasted by TV broadcasting employing NTSC (national television system committee) system, PAL (phase alternation by line) system, SECAM (sequential couleur a memoire) system, HD-MAC (high definition-multiple analogue component) system, or ATV (advanced television) system; duplex audio broadcasting; stereophonic sound multiplex broadcasting; satellite broadcasting utilizing a radio wave from a broadcasting satellite (BS) or a communication satellite (CS); cable television (CATV); extended definition television (EDTV); high definition television (HDTV); MUSE system; one-segment broadcasting; three-segment broadcasting; and digital terrestrial broadcasting.

Examples of the "complementary information" encompass pseudo three-dimension-conversion information for use in virtually converting the two-dimensional video content into the three-dimensional video; a left eye video if the two-dimensional video content is a right eye video; and the right eye video if the two-dimensional video content is the left eye video.

In other words, the "complementary information" for obtaining a 3D video is not limited to actual video data. Therefore, the complementary information may be differential information with respect to the two-dimensional video content (right eye video or right eye video). Alternatively, in the first place, the complementary information may not be related with video data, as long as the two-dimensional video can be converted into the three-dimensional video with the use of the complementary information.

In order to attain the object, an information recording medium of the present invention includes: at least one recording layer, which is at least readable to read out information therefrom, the at least one recording layer to which a plurality of information recording areas are allotted, the plurality of information recording areas including (i) a first information recording area on which a decompressing program is recorded in advance and (ii) a second information recording area on which a two-dimensional video content relating to compressed complementary information is recordable, and the decompressing program being a program for decompressing the compressed complementary information so as to obtain decompressed complementary information which is for use in converting the two-dimensional video content into a three-dimensional video.

The above configuration is different from that of the early described information recording medium only in that (i) the decompressing program, which is a program for use in decompressing the compressed complementary information for use in converting the predetermined two-dimensional video content into the three-dimensional video, is recorded on the first information recording area in advance and (ii) the second information recording area is an area on which the two-dimensional video content relating to the compressed complementary information is recordable.

Here, it is assumed that the compressed complementary information is sent as data (e.g., the sub content associated with the broadcast content) associated with the two-dimensional video content.

With the configuration above, it is substantially possible to record the three-dimensional video, which has been obtained by easily converting the two-dimensional video content into the three-dimensional video, by (i) recording the (particular) two-dimensional video content on the second information recording area and (ii) decompressing, with the decompressing program recorded on the first information recording area, the compressed complementary information which is associated with the two-dimensional video content.

Moreover, with the configuration, it is possible to read out, from the information recording medium of the present invention, (i) the decompressed complementary information, which has been obtained by decompressing the compressed complementary information with the use of the decompressing program read out from the first information recording area and (ii) the two-dimensional video content associated with the compressed complementary information. This allows viewing of the three-dimensional video, which has been obtained by converting the two-dimensional video content into the three-dimensional video.

Moreover, the three-dimensional video is obtained by utilizing, for example, the sub content which is broadcasted together with the broadcast content, i.e., the two-dimensional video. It is therefore not necessary to change the broadcasting system of the broadcast content.

This allows recording and viewing of the three-dimensional video, which has been obtained by easily converting an actual broadcast content into the three-dimensional video, without changing the broadcasting system of the actual broadcast content.

In a case where, for example, a compression ratio with the MPEG standard is set to approximately 1/100 to 1/200, it is possible to compress the complementary information without deteriorating image quality of the complementary information. Moreover, the complementary information compressed at the above compression ratio can be broadcasted at the transfer rate of approximately 2 Mbps.

With the configuration above described, the information recording medium of the present invention allows recording and viewing of the three-dimensional video, which has been obtained by easily converting the generally available two-dimensional video content into the three-dimensional video without changing the standards and the communication systems for the generally available two-dimensional video content.

Here, examples of the "compression method" mainly encompass (i) the JPEG system in which a still image is compressed by being subjected to DCT (discrete cosine transform) conversion carried out for each pixel or for each of a plurality of pixel blocks so that data regarding color alteration and a high-frequency component are removed and (ii) the MPEG standard in which a moving image is compressed by being subjected to a motion compensation process in a direction of time.

As above described, examples of the MPEG standard encompass MPEG1, MPEG2, and MPEG4. Note that MPEG4 is employed as a standard for H.264, Windows (registered trademark), Quick Time (registered trademark), DivX (registered trademark), and the like.

In a case of, for example, a three-dimensional video which utilizes a parallax between the broadcast content serving as a right eye video and the complementary information serving as a left eye video, it is particularly preferable that image compression with the MPEG standard is carried out with the use of differential information between the right eye video and the left eye video. This makes it possible to increase the compression ratio of the three-dimensional video.

In order to attain the object, an information recording medium of the present invention includes: at least one recording layer, which is at least readable to read out at least information therefrom, the at least one recording layer to which a plurality of information recording areas are allotted, the plurality of information recording areas including (a) a first information recording area on which (i) a video content, which is a two-dimensional video, and (ii) recording process information are recorded in advance and (b) a second information recording area, and the recording process information being information for use in recording, on the second information recording area, complementary information for use in converting the video content into a three-dimensional video, the complementary information being recorded on the second information recording area in such a manner that the video content is reproducible as the three-dimensional video.

According to the configuration, the video content, which is the two-dimensional video, is recorded on the first information recording area in advance.

Note that information other than the video content can be recorded on the first information recording area.

The second information recording area is an area on which information can be recorded.

Moreover, the recording process information is recorded on the first information recording area in advance. The recording process information is information for use in recording, on the second information recording area, the complementary information for use in converting the video content into the three-dimensional video. The complementary information is recorded on the second information recording area in such a manner that the video content is reproducible as the three-dimensional video.

With the configuration above, it is substantially possible to record the three-dimensional video obtained by easily converting the video content in the form of the two-dimensional video into the three-dimensional video merely by recording, based on the recording process information, the complementary information on the second information recording area, the complementary information relating to the video content recorded on the first information recording area in advance.

With the configuration, it is possible to read out, from the information recording medium of the present invention, the complementary information and the video content relating to the complementary information. This allows viewing of the three-dimensional video obtained by converting the video content in the form of the two-dimensional video into the three-dimensional video.

In the information recording medium of the present invention, the video content is recorded on the first information recording area in advance. Under the circumstances, the complementary information is to be externally obtained, instead of the video content, for converting the video content into the three-dimensional video.

In general, an information amount of the complementary information, which is required for converting the video content (i.e., the two-dimensional video) into the three-dimensional video, is approximately 30% of an information amount of the video content. That is, the complementary information, which has the information amount smaller than that of the video content, is to be distributed. It is therefore possible to suppress an increase in amount of information, which is to be distributed for converting the video content into the three-dimensional video.

This allows recording and viewing of the three-dimensional video, which has been obtained by easily converting the video content, which is the two-dimensional video, into the three-dimensional video, while suppressing an increase in amount of information, which is to be distributed for converting the video content into the three-dimensional video.

Moreover, the video content is not simply recorded on the information recording medium but is recorded based on the recording process information so that the video content can be reproduced as the three-dimensional video. It is therefore possible to provide the information recording medium, which allows the user to further add value to the video content, in accordance with the user's intention.

Here, the "recording process information" is information provided in carrying out a process for recording, on the second information recording area, the complementary information and/or the video content read out from the first information recording area. Examples of the "recording process information" encompass various kinds of data such as (i) information indicative of a relation between the video content and the complementary information, (ii) information indicative of a supplier of the complementary information, and (iii) address information which indicates a recording start point or a recording end point for each information unit and is used when the complementary information is recorded on the second information recording area.

As an alternative to the above described various kinds of data, the "recording process information" may be a software program for causing a computer to execute the process for recording, on the second information recording area, the complementary information and/or the video content read out from the first information recording area.

Examples of the "video content" encompass a moving image (containing data such as music data, audio data, and text data such as of subtitles) and a still image such as images for use in frame-by-frame advance reproduction.

Examples of standards of a data format and a data compression system for the "video content" encompass (i) Flash which relates to a video, (ii) JPEG standard which relates to compression of still image, and (iii) MPEG standard which relates to compression of moving image.

Examples of the broadcast content, which is the "video content", encompass broadcast programs which are broadcasted by TV broadcasting employing NTSC system, PAL system, SECAM system, HD-MAC system, or ATV system; duplex audio multiplex broadcasting; stereophonic sound multiplex broadcasting; satellite broadcasting utilizing a radio wave from a broadcasting satellite or a communication satellite; cable television; extended definition television; high definition television; MUSE system; one-segment broadcasting; three-segment broadcasting; and digital terrestrial broadcasting.

Examples of a method for distributing the "complementary information" encompass wired or wireless communications such as Bluetooth, Felica, PLC, Wireless LAN, IrDA, IrSS, and WCDMA.

In order to attain the object, a three-dimensional-conversion unit of the present invention is configured to convert a two-dimensional video content into a three-dimensional video, the three-dimensional-conversion unit including: information separating means (i) for separating, from an externally-obtained content that the three-dimensional-conversion unit obtains externally, the two-dimensional video content and compressed complementary information which is information for use in converting the two-dimensional video content into the three-dimensional video and (ii) for outputting the two-dimensional video content and the compressed complementary information thus separated from the externally-obtained content; decompressing means for decompressing the compressed complementary information, which has been outputted from the information separating means, so as to obtain decompressed complementary information; and arranging means for carrying out an arrangement process to arrange the two-dimensional video content and the decompressed complementary information such that the two-dimensional video content and the decompressed complementary information are reproducible as the three-dimensional video, the arrangement process being carried out by adjusting a time difference between (i) a time point at which the two-dimensional video content and the compressed complementary information are outputted from the information separating means and (ii) a time point at which the decompressing means finishes decompressing the compressed complementary information.

According to the configuration, the information separating means (i) separates the two-dimensional video content and the compressed complementary information from the externally-obtained content and (ii) outputs the two-dimensional video content and the compressed complementary information thus separated from the externally-obtained content.

The decompressing means decompresses the compressed complementary information, which has been outputted from the information separating means.

The arranging means carries out the arrangement process to arrange the two-dimensional video content and the decompressed complementary information such that the two-dimensional video content and the decompressed complementary information are reproducible as the three-dimensional video. The arrangement process is carried out by adjusting a time difference between (i) a time point at which the two-dimensional video content and the compressed complementary information are outputted from the information separating means and (ii) a time point at which the decompressing means finishes decompressing the compressed complementary information.

This makes it possible to arrange (i) the two-dimensional video content, which has been separated from the externally-obtained content, and (ii) the decompressed complementary information, which has been obtained by decompressing the compressed complementary information separated from the externally-obtained content, such that the two-dimensional video content and the decompressed complementary information are reproducible as the three-dimensional video.

Advantageous Effects of Invention

As early described, the information recording medium of the present invention has the plurality of information recording areas including the first information recording area and the second information recording area. On the first information recording area, the complementary information is recorded in advance. The complementary information is information for use in converting, into the three-dimensional video, the two-dimensional video content (i.e., a predetermined two-dimensional video content which is generally available and is externally obtained via broadcasting, the Internet, or the like). The second information recording area is an area on which the two-dimensional video content relating to the complementary information is recordable.

Alternatively, as early described, the information recording medium of the present invention has the plurality of information recording areas including the first information recording area and the second information recording area. On the first information recording area, the decompressing program is recorded in advance. The decompressing program is a program for use in decompressing the compressed complementary information, which is information for use in converting, into the three-dimensional video, the two-dimensional video content (i.e., a predetermined two-dimensional video content which is generally available and is externally obtained via broadcasting, the Internet, or the like). The second information recording area is an area on which the two-dimensional video content relating to the compressed complementary information is recordable.

As early described, the three-dimensional-conversion unit of the present invention is configured to convert a two-dimensional video content into a three-dimensional video, the three-dimensional-conversion unit including: information separating means (i) for separating, from an externally-obtained content that the three-dimensional-conversion unit obtains externally, the two-dimensional video content and compressed complementary information which is information for use in converting the two-dimensional video content into the three-dimensional video and (ii) for outputting the two-dimensional video content and the compressed complementary information thus separated from the externally-obtained content; decompressing means for decompressing the compressed complementary information, which has been outputted from the information separating means, so as to obtain decompressed complementary information; and arranging means for carrying out an arrangement process to arrange the two-dimensional video content and the decompressed complementary information such that the two-dimensional video content and the decompressed complementary information are reproducible as the three-dimensional video, the arrangement process being carried out by adjusting a time difference between (i) a time point at which the two-dimensional video content and the compressed complementary information are outputted from the information separating means and (ii) a time point at which the decompressing means finishes decompressing the compressed complementary information.

This brings about an effect of allowing recording and viewing of the three-dimensional video which has been obtained by easily converting the generally available two-dimensional video content into the three-dimensional video, without changing the standards and the communication systems for the generally available two-dimensional video content.

As early described, the information recording medium of the present invention has (i) the first information recording area on which the video content, which is the two-dimensional video, is recorded in advance and (ii) the second information recording area on which information is recordable. On the first information recording area, the recording process information is also recorded in advance. The recording process information is information for use in recording, on the second information recording area, the complementary information for use in converting the video content into a three-dimensional video. The complementary information is recorded on the second information recording area in such a manner that the video content is reproducible as the three-dimensional video.

This allows recording and viewing of the three-dimensional video, which has been obtained by easily converting the video content, which is the two-dimensional video, into the three-dimensional video, while suppressing an increase in amount of information, which is to be distributed for converting the video content into the three-dimensional video.

For a fuller understanding of other objects, characteristics, and advantages of the present invention, reference should be made to the ensuing detailed description taken in conjunction with the accompanying drawings.

BRIEF DESCRIPTION OF DRAWINGS

FIG. 1 is a schematic view schematically illustrating a configuration of an information recording medium, in accordance with an embodiment of the present invention.

FIG. 3 is a schematic view schematically illustrating a configuration of an information recording medium, in accordance with another embodiment of the present invention.

FIG. 4 is a schematic view schematically illustrating a configuration of an information recording medium, in accordance with yet another embodiment of the present invention.

FIG. 5 is a schematic view relating to the information recording medium, which illustrates states of video information before and after a video content is inserted. (a) of FIG. 5 illustrates a state where each of recordable spaces is provided between adjacent ones of divided pieces of complementary information so that the video content can be inserted. (b) of FIG. 5 illustrates a state where information units of the video content are inserted into the respective recordable spaces.

FIG. 27 is a flowchart illustrating another example of a process flow carried out by the information recording/reproducing device.

DESCRIPTION OF EMBODIMENTS

Figure 2:
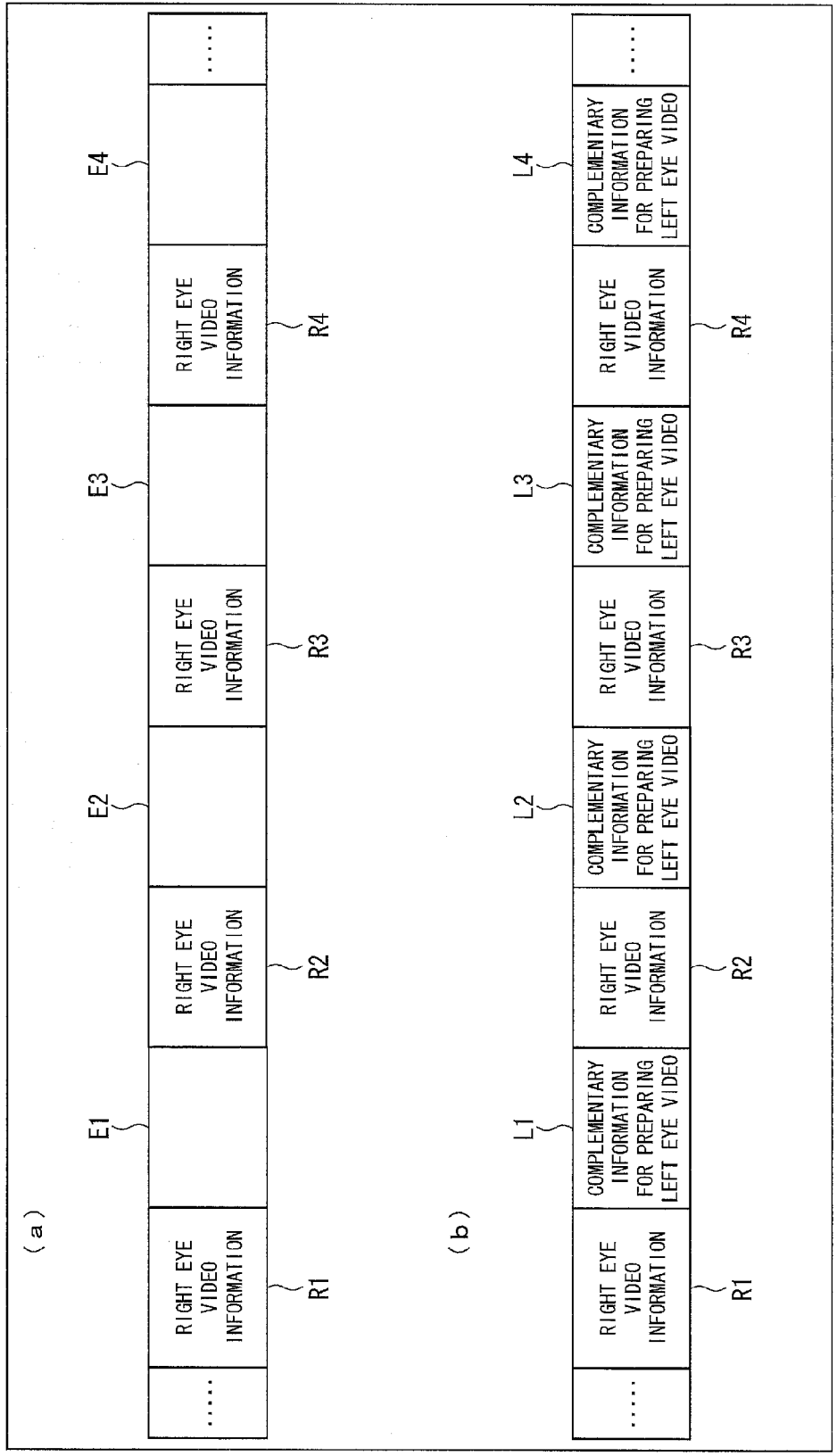
FIG. 2 is a schematic view relating to the information recording medium, which illustrates states of video information before and after complementary information is inserted. (a) of FIG. 2 illustrates a state where each of recordable spaces is provided between adjacent ones of divided pieces of information of a broadcast content so that the complementary information can be inserted. (b) of FIG. 2 illustrates a state where pieces of complementary information are inserted into the respective recordable spaces.

One embodiment of the present invention is described below with reference to FIGS. 1 through 26. The description below may omit an explanation of a constituent in a particular chapter as necessary, if such a constituent is arranged as described in another chapter. Further, the description below, for convenience of explanation, the like members to have the like functions are labeled with the like reference numerals throughout each chapter, and their explanation is not repeated if appropriate.

[1. Conceptual Arrangement of Information Recording Medium and Information Recorded Thereon (Part 1)]

Some important aspects in the present invention are (i) information recorded in advance on a predetermined information recording area of an information recording medium and (ii) information to be recorded thereon in the future.

Referring to FIG. 1 and (a) and (b) of FIG. 2, the description below first describes (i) a conceptual arrangement of an information recording medium as one embodiment of the present invention and (ii) one example of information recorded on the information recording medium. The description below then deals with specific examples of the information recording medium of the present invention, with reference to FIG. 6 and its subsequent drawings.

What is only required in the information recording medium of the present invention is to include at least one recording layer, which is at least readable to read out information therefrom, the at least one recording layer to which a plurality of information recording areas are allotted. Apart from that, the present invention is, needless to say, not limited to a structure described in the present embodiment.

FIG. 1 is a schematic diagram conceptually illustrating a configuration of an optical disc (information recording medium) 200 as one embodiment of the information recording medium of the present invention.

The following describes a preferable structure for the information recording medium of the present invention.

In a technical field of a multilayer optical information recording medium, recent years, an optical information recording medium (hereinafter referred to as "hybrid optical information recording medium") has been recently required to have an increased recording capacity by including, in addition to a recording layer in which information is rewritable, either (i) a reproduction only recording layer in which various contents are recorded and in which information is only reproducible or (ii) a recording layer in which information is additionally recordable. The description below uses (i) the term "RE layer" to refer to the above rewritable recording layer, (ii) the term "ROM layer" to refer to a read only layer, that is, a reproduction only information recording layer, and (iii) the term "R (recordable) layer" to refer to the above additionally recordable recording layer.

The optical disc 200 described herein and an optical disc (information recording medium) 201 described later are each a hybrid optical information recording medium mentioned above.

A hybrid optical information recording medium includes: a substrate; a plurality of recording layers provided over the substrate; at least one intermediate layer which separates adjacent recording layers from each other; a light transmitting layer which is provided over the substrate and is a layer positioned farthest from the substrate.

The plurality of recording layers are readable by use of reproduction light.

Among the plurality of recording layers, at least one recording layer is a ROM layer and at least one of the other recording layers is a recordable layer. This is a basic structure of the hybrid optical information recording medium.

The term "recordable layer" refers to either a layer (R layer) in which information is only additionally recordable or a layer (RE layer) in which information is rewritable.

The expression "only additionally recordable" means that information is readable and recordable, but not erasable.

Specifically, the optical disc 200 of the present embodiment, as illustrated in FIG. 1, includes in a structure thereof: a light transmitting layer 10; a first information recording layer (read only layer; recording layer) 20; an intermediate layer 30; a second information recording layer (recordable layer; recording layer) 40; and a substrate 50, all stacked on top of one another in that order from a side of a reproduction light incident plane.

The following first describes, for example, (i) allocation of information recording areas to individual recording layers and (ii) information recorded on individual information recording areas. A physical structure, a characteristic and the like of the optical disc 200 will be described later in detail.

First, the first information recording layer 20 includes, allotted thereto: a first information recording area (read only area) 20A; and a third information recording area (first information recording area; read only area) 20B.

The third information recording area 20B is, as illustrated in FIG. 1, preferably allotted to a position in the first information recording layer which position is located (i) further outward along a radius of the optical disc 200 from a lead-in area thereof and (ii) closely to an inner edge of the optical disc. The third information recording area 20B may, however, be allotted to any position that is located between an inner edge of the first information recording layer 20 and an outer edge thereof.

Next, the second information recording layer 40 includes, allotted thereto: a content recording area (second information recording area) 40A; and an invalidation information recording area (second information recording area) 40B. The content recording area 40A is a so-called user area. The invalidation information recording area 40B is, as illustrated in FIG. 1, preferably allotted to a position in the second information recording layer which position is located (i) further outward along the radius of the optical disc 200 from the lead-in area thereof and (ii) closely to the inner edge of the optical disc. The invalidation information recording area may, however, be allotted to any position that is located between an inner edge of the second information recording layer 40 and an outer edge thereof.

The optical disc 200 includes only two recording layers. The information recording medium of the present invention may alternatively include three or more recording layers, which are at least readable to read out information therefrom, the three or more recording layers to each of which a plurality of information recording areas are allotted.

The information recording medium, in a case where it includes a single recording layer, includes all the above information recording areas (namely, the first information recording area 20A, the third information recording area 20B, the content recording area 40A, and the invalidation information recording area 40B) allotted to the single recording layer.

In the above case, the single recording layer preferably includes (i) a ROM area and (ii) an R or RE area, the ROM area including the first information recording area 20A and the third information recording area 20B both allotted thereto and the R or RE area including the content recording area 40A and the invalidation information recording area 40B both allotted thereto.

The information recording medium including a plurality of recording layers may be arranged variously. Such an information recording medium may be arranged, for example, such that (i) the first information recording area 20A, the third information recording area 20B, the content recording area 40A, and the invalidation information recording area 40B are allotted to respective recording layers different from one another, or that (ii) two or three of the above information recording areas are allotted to a single recording layer and a rest thereof is allotted to another recording layer.

Even in the above case, it is preferable that the first information recording area 20A and the third information recording area 20B be allotted to a ROM area and that the content recording area 40A and the invalidation information recording area 40B be allotted to an R or RE area.

This is because the content recording area 40A needs to record a TV program (two-dimensional video content) P externally obtained via a broadcast as described below, and thus needs to be allotted to an R or RE area.

Further, in a case where the first information recording area 20A is allotted to a ROM area, on which information is not writable, it is possible to prevent a misoperation of erroneously overwriting below-described 3D conversion complementary information (complementary information) with other data.

Further, it is possible to record 3D conversion complementary information in advance during production of the optical disc 200. As such, a user does not need to record 3D conversion complementary information for a TV program P on the optical disc 200 by one means or another. Further, since 3D conversion complementary information is recorded in a ROM layer, there is no reduction of a recordable area of the content recording area 40A included in the R or RE layer, in which a TV program P is to be recorded.

A ROM area is, for example, an area on which (i) information is recorded with use of a train of embossed prepits or (ii) information is recorded with use of a laser.

The above arrangement provides a manufacturer of the optical disc 200 with such merits that 3D conversion complementary information and the like can be changed easily and inexpensively during production of the optical disc.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

The following describes, with reference to a table shown in FIG. 1, details of various information recorded on the individual information recording areas included in the optical disc 200.

The table shown in FIG. 1 has (i) a left item "RECORDING AREA" in a column which indicates the individual information recording areas allotted to the first information recording layer 20 and the second information recording layer 40 and (ii) a middle item "RECORDED INFORMATION" in a column which indicates data currently recorded on the individual information recording areas.

The table also has a right item "STATUS" in a column which indicates respective states of the first information recording area 20A, the content recording area 40A, the invalidation information recording area 40B, and the third information recording area 20B. This column shows, for example, (i) "ALREADY RECORDED" for an information recording area on which any data has already been recorded and (ii) what data is recordable, for an information recording area on which any data is to be recorded in the future. This description applies also to a table of FIG. 3 referred to below.

As illustrated in FIG. 1, in the first information recording area 20A as a ROM area, at least 3D conversion complementary information has been recorded thereon in advance. The 3D conversion complementary information is for use in converting, into a 3D video, a TV program P, which is a 2D video to be recorded on the content recording area 40A.

The "3D conversion complementary information" is, for example, (i) pseudo 3D conversion information for use in converting a TV program P into a pseudo 3D video or (ii) in a case where the TV program P is either a left eye video or right eye video, such a left eye video or right eye video.

In other words, the "3D conversion complementary information" for use in 3D conversion is not necessarily actual video data such as a right eye video and a left eye video, and may thus be, for example, difference information for a TV program P (that is, a right eye video or right eye video). The "3D conversion complementary information" is not necessarily relating to video data in the first place, and simply needs to be complementary information for 3D conversion of a 2D video.

The above expression "at least" indicates that the first information recording area may include, recorded thereon, information other than 3D conversion complementary information.

The content recording area 40A of the second information recording layer 40 is an area on which a TV program P relating to 3D conversion complementary information is recordable.

With the above configuration, by simply recording, on the content recording area 40A, a TV program P based on a 2D video and relating to (particular) 3D conversion complementary information, it is substantially possible to easily record a 3D video obtained by 3D conversion of the TV program P.

With the above configuration, it is also possible to read out 3D conversion complementary information and a TV program P from the optical disc 200. As such, it is possible to view a 3D video obtained by 3D conversion of a TV program P based on a 2D video.

Further, since a TV program P itself based on a 2D video can be converted into a 3D video, there is no need to change a broadcast form of the TV program P.

As such, the conversion of a TV program P into a 3D video to be recorded or viewed for example can be easily carried out without requiring to change the current broadcast form of the TV program P.

As described above, terrestrial digital broadcasting has a transfer rate having a maximum of 17 Mbps. The overall transfer rate has the following breakdown: approximately 15 Mbps for a transfer rate of full-scale broadcasting; and approximately 2 Mbps for a transfer rate of data broadcasting. The transfer rate of data broadcasting is approximately 13% of the full-scale broadcasting.

As such, in a case where terrestrial digital broadcasting is to be converted into a three-dimensional video without increasing the maximum transfer rate, assuming that the data broadcasting (corresponding to 3D conversion complementary information) has a transfer rate of approximately 2 Mbps as above, the full-scale broadcasting (corresponding to a TV program P) will have a transfer rate of approximately 6.7 Mbps or less. As a result, there is a secondary problem of a significant decrease in image quality of the full-scale broadcasting.

The optical disc 200, in contrast, uses a TV program P actually broadcasted. As such, the conversion of the TV program P into a three-dimensional video to be recorded or viewed for example can be easily carried out without decreasing image quality. As such, the optical disc 200 is free from the above secondary problem.

Examples of the "TV program P" encompass broadcast programs of: TV broadcast by an NTSC system, a PAL system, a SECAM system, an HD-MAC system, or an ATV system; dual sound multiplex broadcasting; stereophonic sound multiplex broadcasting; satellite broadcasting utilizing a radiowave from a broadcasting satellite (BS) or a communication satellite (CS); a wire broadcasting TV; a high image quality television; a high definition television; a MUSE system; one-segment broadcasting; three-segment broadcasting; and terrestrial digital broadcasting.

The present embodiment externally obtains a two-dimensional video content by a communication mode of "broadcasting" as an example. The communication mode is, however, not limited to "broadcasting". The present invention encompasses in its scope any communication mode (such as Internet distribution and cable communication) regardless of whether it involves a wired communication or a wireless communication.

Specifically, a two-dimensional video content other than a TV program P is, for example, (i) a moving image (for example, music, audio data, and text data such as subtitles) or (ii) a still image such as an image for frame advance reproduction.

Examples of a protocol of a data format or data compression format for a two-dimensional video content encompass: Flash for a video; a JPEG format for a still image compression; and an MPEG format for a moving image compression.

Currently, the MPEG format includes: MPEG1 for media such as a video CD; MPEG2 for a DVD, a broadcast medium and the like; and MPEG4 for network distribution, a portable terminal or the like.

Examples of a method for distributing a two-dimensional video content encompass, for example, distribution through a wired or wireless telecommunication such as Bluetooth, Felica, PLC, Wireless LAN, IrDA, IrSS, and WCDMA.

As shown in the table of FIG. 1, the third information recording area 20B as a ROM area may include, recorded thereon in advance, recording presetting information (presetting information) for presetting a recording of a TV program P on the content recording area 40A.

With the above configuration, in a case where recording presetting information for a TV program P corresponding to 3D conversion complementary information is recorded on the optical disc 200 during production thereof, a user does not need to record recording presetting information for the TV program P on the optical disc 200 by one means or another.

The description later deals with a 3D video viewing system (information recording/reproducing device; information recording device) 1 which can handle the optical disc 200 and including an information recording/reproducing device 1001 or an information recording/reproducing device 1002 each of which is arranged to be capable of recording a TV program P on the basis of recording presetting information at a start of broadcast of the TV program P.

As such, simply loading the optical disc 200 in the information recording/reproducing device 1001 or information recording/reproducing device 1002 makes it possible to record a TV program P on the content recording area 40A without requiring a user's operation.

Recording presetting information is recorded on the third information recording area 20B, which is a ROM area. As such, it is possible to prevent a misoperation of erroneously overwriting recording presetting information, recorded in advance, with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

As shown in the table of FIG. 1, the invalidation information recording area 40B, as an R or RE area, of the second information recording layer 40 is an area which is capable of recording invalidation information for use in canceling a recording preset by the above-described recording presetting information for recording a TV program P on the content recording area 40A.

With the above configuration, in a case where a TV program P recorded on the basis of recording presetting information fails to meet a user's expectation, the recording presetting information can be invalidated with use of invalidation information. As a result, a recording area for use in presetting a recording based on recording presetting information can be diverted for use in recording another content.

As such, it is possible to prevent an optical disc 200 from being completely unnecessary for the user as a result of, for example, such an optical disc 200 including a recording area which, after a TV program P corresponding to recording presetting information is broadcast, (i) includes, recorded thereon, only recording presetting information and (ii) cannot be diverted for use in recording another content.

The "invalidation information" is information for use in canceling a recording, on the content recording area 40A, of a TV program P corresponding to recording presetting information. In a case where "invalidation information" is present, it is possible to, for example, (i) prevent a TV program P corresponding to recording presetting information from being recorded on the content recording area 40A or (ii) divert a recording area, for use in presetting a recording based on recording presetting information, for use in recording another content.

As shown in the table of FIG. 1, the third information recording area 20B as a ROM area may include, recorded thereon in advance, 3D conversion data arrangement information (arrangement process information) for use in (i) arranging a TV program P and 3D conversion complementary information so that the TV program P and the 3D conversion complementary information can be reproduced as a 3D video and (ii) recording the TV program P and the 3D conversion complementary information on the content recording area 40A.

With the above configuration, it is possible, with use of 3D conversion data arrangement information, to (i) arrange, as illustrated in (a) and (b) of FIG. 2, a TV program P [right eye video information items (broadcast content; two-dimensional video) R1 through R4 . . . ] and 3D conversion complementary information [left eye video preparation complementary information items (complementary information) L1 through L4 . . . ] so that the TV program P and the 3D conversion complementary information can be reproduced as a 3D video, and thus (ii) record the TV program P and the 3D conversion complementary information on the content recording area 40A.

As such, in a case where right eye video information items R1 through R4 . . . and left eye video preparation complementary information items L1 through L4 . . . are arranged as illustrated in (b) of FIG. 2 and recorded on the content recording area 40A, there is no need to read out, from the optical disc 200, an end of left eye video preparation complementary information items L1 through L4 . . . for recording so as to reproduce a 3D video. As a result, it is possible to save a recording capacity of, for example, a memory or hard disk provided to the 3D video viewing system 1 which can handle the optical disc 200.

The "arrangement process" refers to, for example, a process of, as illustrated in (b) of FIG. 2, (i) dividing a TV program P into right eye video information items R1 through R4 . . . in correspondence with left eye video preparation complementary information items L1 through L4 . . ., respectively, and (ii) alternately arranging the right eye video information items R1 through R4 . . . and the left eye video preparation complementary information items L1 through L4 . . . so that a left eye video preparation complementary information L1 corresponding to a particular right eye video information R1 is inserted between the right eye video information R1 and its subsequent right eye video information R2. With this process, it is possible to record a TV program P so that the TV program P can be directly reproduced three-dimensionally.

The "3D conversion data arrangement information" may be data for use in the arrangement process which data is, when right eye video information items R1 through R4 . . . and left eye video preparation complementary information items L1 through L4 . . . are alternately arranged, used as, for example, a recording start position and recording end position for each of the above information items.

The "3D conversion data arrangement information" may alternatively be, for example, an arrangement process program for carrying out a process of (i) as illustrated in (a) of FIG. 2, providing recording spaces E1 through E4 . . . between individual right eye video information items R1 through R4 . . . and (ii) as illustrated in (b) of FIG. 2, inserting left eye video preparation complementary information items L1 through L4 . . . corresponding to the recording spaces E1 through E4 . . . , respectively, so that the right eye video information items R1 through R4 . . . and the left eye video preparation complementary information items L1 through L4 . . . are alternately arranged.

The following describes a case in which the "3D conversion data arrangement information" is data for use in the arrangement process as described above.

In this case, the 3D video viewing system 1 may be arranged to (i) alternately arrange right eye video information items R1 through R4 . . . and left eye video preparation complementary information items L1 through L4 . . . on the basis of "3D conversion data arrangement information", for example, a recording start position and recording end position for each of the above information items, and thus (ii) record the above information items on the content recording area 40A of the optical disc 200.

Note that 3D conversion data arrangement information is recorded on the third information recording area 20B, which is a ROM area. This makes it possible to prevent a misoperation of erroneously overwriting 3D conversion data arrangement information, recorded in advance, with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

As shown in the table of FIG. 1, the third information recording area 20B as a ROM area may include, recorded thereon in advance, a 3D conversion authorization key (permission information) indicative of permission for 3D conversion of a TV program P.

The "3D conversion authorization key" specifically indicates, for example, that a copyright holder, a neighboring right holder or the like for a television broadcast permits a user of the optical disc 200 to convert a TV program P into a 3D video with use of 3D conversion complementary information.

With the above configuration, permission for 3D conversion of a TV program P is given with use of a 3D conversion authorization key recorded in advance on the optical disc 200. This makes it possible to prevent a TV program P from being converted into a 3D video to be recorded on an information recording medium on which a valid 3D conversion authorization key is not recorded.

In other words, a 3D conversion authorization key recorded in advance on the optical disc 200 is information indicative of permission for 3D conversion of an externally obtained TV program P, that is, information that warrants user's 3D conversion of a TV program P.

As such, in a case of converting a TV program P into a 3D video with use of an optical disc 200 including a 3D conversion authorization key recorded in advance on the third information recording area 20B, a user can convert the TV program P into a 3D video at ease without worrying about, for example, a copyright and a neighboring right.

Further, 3D conversion complementary information recorded on the first information recording area 20A of an optical disc 200 including a 3D conversion authorization key recorded in advance on the third information recording area 20B serves also to reliably warrant that the optical disc is produced by, for example, a broadcasting station. As such, 3D conversion is possible of a TV program P which is provided through a service by, for example, a broadcasting station and which is in agreement with a user's preference.

The "valid 3D conversion authorization key" may be included in (i) data that is broadcast as an accompaniment of a TV program P, (ii) data such as program information contained in an electronic program guide (EPG) and corresponding to a TV program P, or (iii) information such as bar code information for a TV program P appearing in, for example, a TV program billboard magazine.

The "valid 3D conversion authorization key" may alternatively be an encryption key which can be learned by only a legitimate purchaser when the optical disc 200 is sold.

In this case, when a user inputs the encryption key in the 3D video viewing system 1 via an operating section 126 described below, it becomes possible to convert a TV program P into a 3D video with use of the optical disc 200.

More specifically, whether or not the "3D conversion authorization key" is valid can simply be determined on the basis of whether or not the 3D conversion authorization key inputted by the user matches the 3D conversion authorization key recorded on the third information recording area 20B of the optical disc 200.

The phrase "3D conversion" as used herein refers, for example, to (i) reproducing a TV program P and 3D conversion complementary information as a 3D video, and to (ii) arranging a TV program P and 3D conversion complementary information so that the TV program P and the 3D conversion complementary information can be reproduced as a 3D video and thus recording the TV program P and the 3D conversion complementary information on the content recording area 40A of the optical disc 200.

Examples of the "3D conversion authorization key" encompass: 3D conversion complementary information; and information relating to, for example, an encryption key and license agreement for permitting use of 3D conversion data arrangement information.

The "3D conversion authorization key" is recorded in advance on an optical disc 200 under control of, for example, a copyright holder or neighboring right holder for a TV program. As such, a user is not illegally using a TV program P when (i) converting the TV program P into a 3D video with use of an optical disc 200 on which a 3D conversion authorization key is recorded or (ii) converting the TV program P into a 3D video as such and recording the 3D video.

In a case where, for example, the optical disc 200 is sold at a price including a royalty which a user must pay as a consideration for permission for 3D conversion, the user of the optical disc 200 can pay a price of the permission for 3D conversion when purchasing the optical disc 200. Further, 3D conversion to be permitted may be relating to copying of a content onto another recording medium.

The third information recording area 20B as a ROM area may include, other than the information exemplified above, a pseudo 3D conversion process program for (i) converting a 2D moving image into a pseudo 3D moving image or (ii) converting 2D photo data into pseudo 3D photo data for use in a 3D picture frame.

Note that in a case where a 3D conversion authorization key and/or pseudo 3D conversion process program are recorded on the third information recording area 20B (ROM area), it is possible to prevent a misoperation of erroneously overwriting the 3D conversion authorization key and/or pseudo 3D conversion process program, recorded in advance, with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

[2. Conceptual Arrangement of Information Recording Medium and Information Recorded Thereon (Part 2)]

With reference to FIGS. 1 through 3, the following description deals with another example of information recorded on the optical disc 200. The description below then, with reference to FIG. 6 and its subsequent drawings, deals with specific examples of the information recording medium of the present invention.

A table illustrated in FIG. 3 shows an example which is different from that shown in the table of FIG. 1 in that the first information recording area 20A as a ROM area includes, recorded thereon in advance, at least decompressing process software (decompressing process program) for decompressing compressed 3D conversion complementary information for 3D conversion of a TV program P based on a 2D video.

The example shown in the table illustrated in FIG. 3 is also different from that shown in the table of FIG. 1 in that the content recording area 40A is an area which is capable of recording a TV program P relating to compressed 3D conversion complementary information. The decompressing process software may alternatively be recorded in advance in the 3D video viewing system 1.

Compressed 3D conversion complementary information is transmitted as data that is broadcast as an accompaniment of a TV program P.

With the above configuration, in a case where (i) the content recording area 40A includes a (particular) TV program P recorded thereon and (ii) compressed 3D conversion complementary information accompanying the TV program P is decompressed by the decompressing process program recorded on the third information recording area 20B, it is substantially possible to easily record a 3D video obtained by 3D conversion of the TV program P.

With the above configuration, it is also possible to (i) decompress compressed 3D conversion complementary information with use of a decompressing process program read out from the optical disc 200 and (ii) read out a TV program P from the optical disc 200. As such, it is possible to view a 3D video obtained by 3D conversion of a TV program P based on a 2D video.

Further, according to, for example, the MPEG format, it is possible, with a compression ratio within an appropriate range of 1/100 to 1/200, to (i) compress 3D conversion complementary information without decreasing image quality and (ii) carry out a data broadcasting at a transfer rate of approximately 2 Mbps.

As such, with the user of the optical disc 200, the conversion of an actually broadcasted TV program P into a three-dimensional video to be recorded or viewed for example can be performed easily without decreasing image quality.

Examples of the "compression format" mainly encompass: a JPEG format, which compresses a still image by carrying out DCT for each unit of pixel or pixel block so as to cut off, for example, data of a color change and a high-frequency component; and a MPEG format, which compresses a moving image by carrying out a motion compensation process in a time direction. Examples of the MPEG format encompass, in addition to MPEG1 and MPEG2, MPEG4, which is used as a standard in, for example, H.264, Windows, QuickTime, and DivX.

In a particular case of a 3D video utilizing parallax between a left eye video and a right eye video as in (i) the right eye video information items R1 through R4 ... and (ii) the left eye video preparation complementary information items L1 through L4 ... both illustrated in (b) of FIG. 2, it is preferable to carry out an image compression in the MPEG format with use of information on a difference between each of the right eye video information items R1 through R4 ... and a corresponding one of the left eye video preparation complementary information items L1 through L4 .... With this arrangement, it is possible to increase a 3D video compression ratio.

More specifically, the individual right eye video information items R1 through R4 ... and the individual left eye video preparation complementary information items L1 through L4 ... are each digital video information including: an I picture obtained by data compression within a frame; a P picture obtained by data compression involving motion compensation by an I picture occurring in a forward time direction; and a B picture obtained by data compression involving motion compensation by an I picture or P picture occurring in a forward-and-backward time direction.

The left eye video preparation complementary information L1, for example, includes, in a unit of pixel or macroblock, that is, a minimum unit of a compressed video, (i) parallax angle information which can be expressed with use of a parallax angle with respect to the right eye video information R1 and (ii) difference information which cannot be expressed with use of the parallax angle information. The parallax angle information and the difference information are recorded on the optical disc 200 as 3D conversion complementary information (that is, the left eye video preparation complementary information L1).

With the above configuration, since a TV program P itself based on a 2D video can be converted into a 3D video, there is no need to change a broadcast form of the TV program P.

As such, the conversion of the actually broadcasted TV program P into a 3D video to be, for example, recorded or viewed can be easily performed without changing the broadcast form of a TV program P.

Note that the decompressing process software is recorded on the third information recording area 20B (that is, a ROM area, in which information is not writable). As such, it is possible to prevent a misoperation of erroneously overwriting decompressing process software with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

As in the example shown in the table of FIG. 1, information which is preferably recorded in advance on the third information recording area 20B (ROM area) shown in the table of FIG. 3 includes, as described above, information such as (i) recording presetting information for a TV program P, (ii) 3D conversion data arrangement information for recording a 3D video on the content recording area 40A, and (iii) a 3D conversion authorization key. The above information is as described above with reference to FIG. 1, and is thus not described here.

[3. Conceptual Arrangement of Information Recording Medium and Information Recorded Thereon (Part 3)]

With reference to FIG. 4 and (a) and (b) of FIG. 5, the description below describes (i) a conceptual arrangement of an information recording medium as another embodiment of the present invention and (ii) an example of information recorded on the information recording medium. The description below then deals with specific examples of the information recording medium of the present invention, with reference to FIG. 6 and its subsequent drawings.

The information recording medium of the present invention is simply required to include at least one recording layer, which is at least readable to read out information therefrom, the at least one recording layer to which a plurality of information recording areas are allotted. Apart from that, the present invention is, needless to say, not limited to a structure described in the present embodiment.

FIG. 4 is a schematic diagram conceptually illustrating a configuration of an optical disc (information recording medium) 200 as an embodiment of the information recording medium of the present invention.

The optical disc 200 described herein and an optical disc (information recording medium) 201 described later are each a hybrid optical information recording medium mentioned above.

Specifically, the optical disc 200 of the present embodiment, as illustrated in FIG. 4, includes in a structure thereof: a light transmitting layer 10; a first information recording layer (read only layer; recording layer) 20; an intermediate layer 30; a second information recording layer (recordable layer; recording layer) 40; and a substrate 50, all stacked on top of one another in that order from a side of a reproduction light incident plane.

The following first describes, for example, (i) allocation of information recording areas to individual recording layers and (ii) information recorded on individual information recording areas. A physical structure, a characteristic and the like of the optical disc 200 will be described later in detail.

First, the first information recording layer 20 includes, allotted thereto: a first information recording area (read only area) 20A; and a third information recording area (first information recording area; read only area) 20B.

The third information recording area 20B is, as illustrated in FIG. 4, preferably allotted to a position in the first information recording layer which position is located (i) further outward along a radius of the optical disc 200 from a lead-in area thereof and (ii) closely to an inner edge of the optical disc. The third information recording area 20B may, however, be allotted to any position that is located between an inner edge of the first information recording layer 20 and an outer edge thereof.

Next, the second information recording layer 40 includes, allotted thereto: a 3D conversion complementary information recording space (second information recording area) 40C; and a 2D video recording space (second information recording area) 40D.

The above recording spaces are present in a so-called user area, and are allotted alternately along a sector which is in parallel to a track direction of the optical disc 200.

FIG. 4 illustrates, for convenience of explanation, an example in which a single sector includes at least six blocks of the 3D conversion complementary information recording space 40C and at least six blocks of the 2D video recording space 40D. The example illustrates the 3D conversion complementary information recording space 40C and the 2D video recording space 40D each in an exaggerated size, and thus does not indicate actual sizes of the above recording spaces.

The optical disc 200 includes only two recording layers. The information recording medium of the present invention may alternatively include three or more recording layers, which are at least readable to read out information therefrom, the three or more recording layers to each of which a plurality of information recording areas are allotted.

The information recording medium, in a case where it includes a single recording layer, includes all the above information recording areas (namely, the first information recording area 20A, the third information recording area 20B, the 3D conversion complementary information recording space 40C, and the 2D video recording space 40D) allotted to the single recording layer.

In the above case, the single recording layer preferably includes (i) a ROM area and (ii) an R or RE area, the ROM area including the first information recording area 20A and the third information recording area 20B both allotted thereto and the R or RE area including the 3D conversion complementary information recording space 40C and the 2D video recording space 40D both allotted thereto.

The information recording medium, in the case where it includes a plurality of recording layers, may be arranged variously. The information recording medium may be arranged, for example, such that the first information recording area 20A, the third information recording area 20B, the 3D conversion complementary information recording space 40C, and the 2D video recording space 40D are allotted to respective recording layers different from one another. Note that the 3D conversion complementary information recording space 40C and the 2D video recording space 40D are allotted on an identical information recording area in an identical recording layer.

Even in the above case, it is preferable that the first information recording area 20A and the third information recording area 20B be allotted to a ROM area and that the 3D conversion complementary information recording space 40C and the 2D video recording space 40D be allotted to an R or RE area.

This is because the 3D conversion complementary information recording space 40C and the 2D video recording space 40D need to record, for example, (i) data obtained by reading out a 2D video content (video content; two-dimensional video) P' recorded on the first information recording area 20A described below and (ii) 3D conversion complementary information (complementary information) distributed from outside the medium, and thus need to be allotted to an R or RE area.

Further, in a case where the first information recording area 20A is allotted to a ROM area, on which information is not writable, it is possible to prevent a misoperation of erroneously overwriting a 2D video content P' with other data.

Further, it is possible to record a 2D video content P' in advance during production of the optical disc 200. As such, a user does not need to record a 2D video content P' on the optical disc 200 by one means or another.

Further, since a 2D video content P' is recorded in a ROM layer, there is no reduction of a recordable area of the second information recording layer 40 including the 3D conversion complementary information recording space 40C and the 2D video recording space 40D.

With the above configuration, there is an advantage on a side of a manufacturer of the optical disc 200 that a 2D video content P' and the like can be changed easily during production of the optical disc.

The following describes, with reference to a table shown at a lower portion of FIG. 4, details of various information recorded on the individual information recording areas included in the optical disc 200.

The table shown in FIG. 4 has (i) a left item "RECORDING AREA" in a column which indicates the individual information recording areas allotted to the first information recording layer 20 and the second information recording layer 40 and (ii) a middle item "RECORDED INFORMATION" in a column which indicates whether any data is currently recorded on the individual information recording areas.

The table also has a right item "STATUS" in a column which indicates respective states of the first information recording area 20A, the 3D conversion complementary information recording space 40C, the 2D video recording space 40D, and the third information recording area 20B. This column shows, for example, (i) "ALREADY RECORDED" for an information recording area on which any data has already been recorded and (ii) what data is recordable, for an information recording area on which any data is to be recorded in the future.

As illustrated in FIG. 4, the first information recording area 20A as a ROM area includes, recorded thereon in advance, a 2D video content P' which is to be reproduced or to be recorded on the 2D video recording space 40D for 3D reproduction.

The first information recording area 20A may further include, recorded thereon, information other than a 2D video content P'.

The 3D conversion complementary information recording space 40C, as an R or RE layer, of the second information recording layer 40 is a recording space in which 3D conversion complementary information relating to a 2D video content P' is to be recorded.

Further, the 2D video recording space 40D of the second information recording layer 40 is, as described above, a recording space in which a 2D video content P' relating to 3D conversion complementary information is to be recorded.

The third information recording area 20B includes, recorded thereon in advance, recording process information for use in recording, on the 3D conversion complementary information recording space 40C, 3D conversion complementary information for 3D conversion of a 2D video content P' so that the 2D video content P' can be reproduced as a 3D video.

The "recording process information" refers to information for use in recording (i) 3D conversion complementary information and/or (ii) a 2D video content P', read out from the first information recording area 20A, on the 3D conversion complementary information recording space 40C and/or the 2D video recording space 40D. The "recording process information" is, for example, any of various data such as (i) information indicative of relevance of a 2D video content P' and 3D conversion complementary information to each other, (ii) information indicative of a distributor of 3D conversion complementary information, and (iii) address information indicative of a recording start position or recording end position for each information unit for recording 3D conversion complementary information on the 3D conversion complementary information recording space 40C.

The "recording process information" further includes various data such as address information indicative of a recording start position or recording end position for each information unit for recording, on the 2D video recording space 40D, data obtained by reading out a 2D video content P' recorded on the first information recording area 20A.

The "recording process information" may still further include, in addition to various data mentioned above, information such as that of 3D conversion data arrangement process software (arrangement process program) for use in causing a control section 115 (computer) included in a below-described 3D video viewing system (information recording/reproducing device; information recording device) 1 to record (i) 3D conversion complementary information and/or (ii) a 2D video content P', read out from the first information recording area 20A, on the 3D conversion complementary information recording space 40C and/or the 2D video recording space 40D.

With the above configuration, by simply recording 3D conversion complementary information, relating to a 2D video content P' based on a 2D video and recorded on the first information recording area 20A in advance, on the 3D conversion complementary information recording space 40C either on the basis of recording process information or by activating 3D conversion data arrangement process software, it is substantially possible to easily record a 3D video obtained by 3D conversion of the 2D video content P'.

With the above configuration, it is also possible to read out 3D conversion complementary information and its relating 2D video content P' from the optical disc 200. As such, it is possible to view a 3D video obtained by 3D conversion of a 2D video content P'.

The optical disc 200 includes a 2D video content P' recorded in advance on the first information recording area 20A, and thus externally obtains, not a 2D video content P', but 3D conversion complementary information for 3D conversion of a 2D video content P'.

Further, 3D conversion complementary information for use in 3D conversion of a 2D video content P' typically has an information amount that is approximately 30% of that of the 2D video content P'. As such, it is preferable that 3D conversion complementary information be distributed which has an information amount smaller than that of a 2D video content P'. As a result, it is possible to prevent an increase caused in the amount of distributed information by 3D conversion of a 2D video content P'.

As described above, with the optical disc 200, it is possible to achieve both (i) prevention of an increase caused in the amount of distributed information by 3D conversion of a 2D video content P' and (ii) easy conversion of the 2D video content P' into a 3D video so as to, for example, record or view the 3D video.

Further, the optical disc 200 not only includes a 2D video content P' recorded thereon, but also allows 3D conversion of the 2D video content P' on the basis of recording process information. As such, it is possible to provide an optical disc 200 including a 2D video content P' having an increased added value.

Examples of the "2D video content P'" encompass (i) a moving image (for example, music, audio data, and text data such as subtitles) and (ii) a still image such as an image for frame advance reproduction.

Examples of a protocol of a data format or data compression format for the "2D video content P'" encompass: Flash for a video; a JPEG format for a still image compression; and an MPEG format for a moving image compression.

Examples of a method for distributing 3D conversion complementary information encompass, for example, distribution through a wired or wireless telecommunication such as Bluetooth, Felica, PLC, Wireless LAN, IrDA, IrSS, and WCDMA.

The present embodiment externally obtains 3D conversion complementary information by a communication mode of "Internet distribution" as an example. The communication mode is, however, not limited to "Internet distribution". The present invention encompasses in its scope any communication mode (such as broadcasting and cable communication) regardless of whether it involves a wired communication or a wireless communication.

Examples of the "2D video content P'", in a case where it is a broadcast content, encompass broadcast programs of: TV broadcast by an NTSC system, a PAL system, a SECAM system, an HD-MAC system, or an ATV system; dual sound multiplex broadcasting; stereophonic sound multiplex broadcasting; satellite broadcasting utilizing a radiowave from a broadcasting satellite or a communication satellite; a wire broadcasting TV; a high image quality television; a high definition television; a MUSE system; one-segment broadcasting; three-segment broadcasting; and terrestrial digital broadcasting.

The "3D conversion complementary information" is, for example, (i) pseudo 3D conversion information for use in converting a 2D video content P' into a pseudo 3D video or (ii) in a case where the 2D video content P' is either a left eye video or right eye video, such a left eye video or right eye video.

In other words, the "3D conversion complementary information" for use in 3D conversion is not necessarily actual video data such as a right eye video and a left eye video, and may thus be, for example, difference information for a 2D video content P' (that is, a right eye video or right eye video). The "3D conversion complementary information" is not necessarily relating to video data in the first place, and simply needs to be complementary information for 3D conversion of a 2D video.

Note that recording process information is recorded on the third information recording area 20B, which is a ROM area. As such, it is possible to prevent a misoperation of erroneously overwriting recording process information, recorded in advance, with other data.

As shown in the table at the lower portion of FIG. 4, the third information recording area 20B of the optical disc 200 includes, recorded thereon in advance, download information, as an example of recording process information, for use in downloading 3D conversion complementary information and recording the 3D conversion complementary information in the 3D conversion complementary information recording space 40C.

With the above configuration, it is possible, on the basis of download information, to (i) download 3D conversion complementary information and (ii) record the 3D conversion complementary information in the 3D conversion complementary information recording space 40C.

The "download information" refers to various information such as (i) information on a protocol for a 2D video content P' which protocol includes, for example, a data format or compression format for a 2D video content P' and (ii) a URL indicative of a distribution of a 2D video content P'.

Note that download information is recorded on the third information recording area 20B, which is a ROM area. As such, it is possible to prevent a misoperation of erroneously overwriting download information, recorded in advance, with other data.

The second information recording layer 40 as an R or RE area may additionally include an invalidation information recording area (not particularly shown in the table at the lower portion of FIG. 4) which is capable of recording invalidation information for use in canceling a recording, in the 3D conversion complementary information recording space 40C, of 3D conversion complementary information corresponding to download information mentioned above.

With the above configuration, in a case where 3D conversion complementary information has become unnecessary for a user, the download information can be invalidated with use of invalidation information. As a result, it is possible to divert the 3D conversion complementary information recording space 40C (and the 2D video recording space 40D), which is used in downloading and recording 3D conversion complementary information, for use in recording another content.

As such, it is possible to prevent an optical disc 200 from being completely unnecessary for the user as a result of, for example, such an optical disc 200 including an RE area which, after a 2D video content P' is viewed, cannot be diverted for use in recording another content.

The "invalidation information" is information for use in canceling a recording, in the 3D conversion complementary information recording space 40C and the 2D video recording space 40D, of 3D conversion complementary information and/or a 2D video content P' both corresponding to download information. In a case where "invalidation information" is present, it is possible to, for example, (i) prevent 3D conversion complementary information and/or a 2D video content P' both corresponding to download information from being recorded in the 3D conversion complementary information recording space 40C and the 2D video recording space 40D or (ii) divert the 3D conversion complementary information recording space 40C and the 2D video recording space 40D for use in recording another content.

Next, the third information recording area 20B of the optical disc 200 includes, recorded thereon in advance, 3D conversion data arrangement information (arrangement process information) as another example of recording process information.

The "3D conversion data arrangement information" refers to information for use in (i) arranging a 2D video content P' and 3D conversion complementary information so that the 2D video content P' and the 3D conversion complementary information can be reproduced as a 3D video and (ii) recording the 2D video content P' and the 3D conversion complementary information in the 3D conversion complementary information recording space 40C and the 2D video recording space 40D in such an arrangement that the 2D video content P' and the 3D conversion complementary information thus recorded in the arrangement can be reproduced as a 3D video.

With the above configuration, it is possible to record the 2D video content P' and the 3D conversion complementary information in the 3D conversion complementary information recording space 40C and the 2D video recording space 40D in such an arrangement that the 2D video content P' and 3D conversion complementary information are arranged with use of 3D conversion data arrangement information, so that the 2D video content P' and the 3D conversion complementary information thus recorded can be reproduced as a 3D video.

As such, in a case where, as described above, a 2D video content P' and 3D conversion data arrangement information are arranged and thus recorded in the 3D conversion complementary information recording space 40C and the 2D video recording space 40D with use of 3D conversion data arrangement information, there is no need to read out, from the first information recording area 20A of the optical disc 200, an end of a 2D video content P' for recording so as to reproduce a 3D video. As a result, it is possible to save a recording capacity of, for example, a memory or hard disk provided to a 3D video viewing system 1 described below.

The "arrangement process" refers to a process of, as illustrated in (b) of FIG. 5, first (i) dividing 3D conversion complementary information into a plurality of left eye video information items (divisional information; complementary information) L1' through L4' . . . and then (ii) inserting, between, for example, a left eye video information item L1' and its subsequent left eye video information item L2', a right eye video preparation complementary information item R1' which is an information unit of a 2D video content P' and which corresponds to the left eye video information item L1'. The "arrangement process" thus alternately arranges the left eye video information items L1' through L4' . . . and the right eye video preparation complementary information items (video content; two-dimensional video) R1' through R4' . . . . With this process, it is possible to record a 2D video content P', based on a 2D video, so that the 2D video content P' can be directly reproduced as a 3D video.

The "3D conversion data arrangement information" may be data for use in the arrangement process which data indicates, for example, a recording start position and recording end position for use in alternately arranging the left eye video information items L1' through L4' . . . and the right eye video preparation complementary information items R1' through R4' . . . .

The "3D conversion data arrangement information" may alternatively be, for example, 3D conversion data arrangement process software for (i) as illustrated in (a) of FIG. 5, providing a 2D video recording space 40D between, for example, a left eye video information item L1' and its subsequent left eye video information item L2' and (ii) inserting a right eye video preparation complementary information item R1', corresponding to the left eye video information item L1', in the above-provided 2D video recording space 40D so as to alternately arrange the left eye video information items L1' through L4' . . . and the right eye video preparation complementary information items R1' through R4' . . . as illustrated in (b) of FIG. 5.

The following describes a case in which the "3D conversion data arrangement information" is data for use in the arrangement process as described above.

In this case, the 3D video viewing system 1 simply needs to be arranged to (i) alternately arrange right eye video preparation complementary information items R1' through R4' . . . and left eye video information items L1' through L4' . . . on the basis of "3D conversion data arrangement information", for example, a recording start position and recording end position for each of the above information items, and thus (ii) record the above information items in the 3D conversion complementary information recording space 40C and the 2D video recording space 40D of the optical disc 200.

Note that 3D conversion data arrangement information is recorded on the third information recording area 20B, which is a ROM area. As such, it is possible to prevent a misoperation of erroneously overwriting 3D conversion data arrangement information, recorded in advance, with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

Next, the third information recording area 20B of the optical disc 200 includes, recorded thereon, decompressing process software (decompressing process program) as still another example of recording process information.

The "decompressing process software" is a software program for, in a case where 3D conversion complementary information is compressed, decompressing such compressed 3D conversion complementary information.

With the above configuration, in a case where (i) the decompressing process software is activated, (ii) compressed 3D conversion complementary information relating to a 2D video content P' is decompressed, and (iii) the 3D conversion complementary information thus decompressed is recorded on the optical disc 200, it is substantially possible to easily record a 3D video obtained by 3D conversion of the 2D video content P' based on a 2D video.

With the above configuration, it is also possible to (i) read out decompressing process software from the optical disc 200 so as to decompress compressed 3D conversion complementary information and (ii) read out a 2D video content P' relating to the compressed 3D conversion complementary information. As such, it is possible to view a 3D video obtained by 3D conversion of the 2D video content P' based on a 2D video.

Further, not a 2D video content P' but compressed 3D conversion complementary information is distributed. As such, it is possible to simultaneously (i) significantly prevent an increase caused in the amount of distributed information by 3D conversion of a 2D video content P' and (ii) easily convert the 2D video content P' into a 3D video so as to, for example, record or view the 3D video. According to, for example, the above-mentioned MPEG format, it is possible, with a compression ratio within an appropriate range of 1/50 to 1/200, to compress 3D conversion complementary information without decreasing image quality.

Examples of the "compression format" mainly encompass: a JPEG format, which compresses a still image by carrying out DCT for each unit of pixel or pixel block so as to cut, for example, data of a color change and a high-frequency component; and a MPEG format, which compresses a moving image by carrying out a motion compensation process in a time direction. Examples of the MPEG format encompass, in addition to MPEG1 and MPEG2, MPEG4, which is used as a standard in, for example, H.264, Windows, Quick Time, and DivX.

In a particular case of a 3D video utilizing parallax between (i) a 2D video content P' (that is, the right eye video preparation complementary information items R1' through R4' . . . ) and (ii) 3D conversion complementary information (that is, the left eye video information items L1' through L4' . . . ) as illustrated in (a) and (b) of FIG. 5, it is preferable to carry out an image compression in the MPEG format with use of information on a difference between each of the right eye video preparation complementary information items R1' through R4' . . . and a corresponding one of the left eye video information items L1' through L4' . . . . With this arrangement, it is possible to (i) increase a 3D video compression ratio, and consequently (ii) significantly prevent an increase in the amount of distributed information.

More specifically, the individual right eye video preparation complementary information items R1' through R4' . . . and the individual left eye video information items L1' through L4' . . . are each digital video information including: an I picture obtained by data compression within a frame; a P picture obtained by data compression involving motion compensation by an I picture occurring in a forward time direction; and a B picture obtained by data compression involving motion compensation by an I picture or P picture occurring in a forward-and-backward time direction.

The left eye video information item L1', for example, includes, in a unit of pixel or macroblock, that is, a minimum unit of a compressed video, (i) parallax angle information which can be expressed with use of a parallax angle with respect to the right eye video preparation complementary information item R1' and (ii) difference information which cannot be expressed with use of the parallax angle information. The parallax angle information and the difference information are recorded on the optical disc 200 as 3D conversion complementary information (that is, the left eye video information item L1').

Note that decompressing process software is recorded on the third information recording area 20B, which is a ROM area. As such, it is possible to prevent a misoperation of erroneously overwriting decompressing process software, recorded in advance, with other data.

Next, the third information recording area 20B of the optical disc 200 includes a 3D conversion authorization key (or a 3D conversion permission key; permission information) recorded thereon in advance.

The "3D conversion authorization key" is information indicative of permission for 3D conversion of a 2D video content P'.

With the above configuration, permission for 3D conversion of a 2D video content P' is given with use of a 3D conversion authorization key recorded in advance on the optical disc 200. As such, it is possible to prevent a 2D video content P' from being converted into a 3D video to be recorded on an information recording medium on which a valid 3D conversion authorization key is not recorded.

In other words, a 3D conversion authorization key recorded in advance on the optical disc 200 is information indicative of permission for 3D conversion of a 2D video content P', that is, information that warrants 3D conversion of a 2D video content P' for a user.

As such, in a case of converting a 2D video content P' into a 3D video with use of an optical disc 200 including a 3D conversion authorization key recorded in advance on the third information recording area 20B, a user can convert the 2D video content P' into a 3D video at ease without worrying about, for example, a copyright and a neighboring right.

Further, a 2D video content P' recorded on the first information recording area 20A of an optical disc 200 including a 3D conversion authorization key recorded in advance on the third information recording area 20B serves also to reliably warrant that the optical disc is produced by, for example, a distributor website. As such, 3D conversion is possible of a 2D video content P' which is provided through a service by, for example, a distributor website and which is in agreement with a user's preference.

The "valid 3D conversion authorization key" may be included in (i) distribution data distributed as an accompaniment of 3D conversion complementary information or (ii) information such as bar code information corresponding to a 2D video content P' appearing in, for example, a billboard magazine for 2D video contents P'.

The "valid 3D conversion authorization key" may alternatively be an encryption key which can be learned by only a legitimate purchaser when the optical disc 200 is sold.

In this case, when a user inputs the encryption key in the 3D video viewing system 1 via an operating section 126 described below, it becomes possible to convert a 2D video content P' into a 3D video with use of the optical disc 200.

More specifically, whether or not the "3D conversion authorization key" is valid can simply be determined on the basis of whether or not the 3D conversion authorization key inputted by the user matches the 3D conversion authorization key recorded on the third information recording area 20B of the optical disc 200.

The phrase "3D conversion" as used herein refers, for example, to (i) reproducing a 2D video content P' and 3D conversion complementary information (or 3D conversion complementary information obtained by decompressing compressed 3D conversion complementary information) as a 3D video, and to (ii) arranging a 2D video content P' and 3D conversion complementary information for recording so that the 2D video content P' and the 3D conversion complementary information can be reproduced as a 3D video.

Examples of "permission information" such as a 3D conversion authorization key encompass: 3D conversion complementary information (compressed 3D conversion complementary information); and information on, for example, a three-dimensional-conversion permission key (encryption key) and license agreement for permitting (i) use of recording process information and (ii) decompression of compressed 3D conversion complementary information.

Note that a 3D conversion authorization key is recorded on the third information recording area 20B, which is a ROM area. As such, it is possible to prevent a misoperation of erroneously overwriting a 3D conversion authorization key, recorded in advance, with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

The "3D conversion authorization key" is recorded in advance on an optical disc 200 under control of, for example, a copyright holder or neighboring right holder for a 2D video content P'. As such, a user is not illegally using a 2D video content P' when (i) converting the 2D video content P' into a 3D video with use of an optical disc 200 on which a 3D conversion authorization key is recorded or (ii) converting the 2D video content P' into a 3D video as such and recording the 3D video.

In a case where, for example, the optical disc 200 is sold at a price including a royalty which a user must pay as a consideration for permission for 3D conversion, the user of the optical disc 200 can pay a price of the permission for 3D conversion when purchasing the optical disc 200. Further, 3D conversion to be permitted may be relating to copying of a content onto another recording medium.

The third information recording area 20B as a ROM area may include, other than the information exemplified above, a pseudo 3D conversion process program for (i) converting a 2D moving image into a pseudo 3D moving image or (ii) converting 2D photo data into pseudo 3D photo data for use in a 3D picture frame.

Note that in a case where a 3D conversion authorization key and/or pseudo 3D conversion process program are recorded on the third information recording area 20B (ROM area), it is possible to prevent a misoperation of erroneously overwriting the 3D conversion authorization key and/or pseudo 3D conversion process program, recorded in advance, with other data.

Further, With the above configuration, information can be recorded during preparation of a stamper. As such, it is possible to distribute a large amount of information inexpensively in a short period of time as compare to, for example, (i) a case in which information is recorded after preparation of the optical disc 200 or (ii) a case in which information is distributed over the Internet or the like.

[4. Basic Information on Information Recording Medium and Information Recording/Reproducing Device]

With reference to FIGS. 6 through 14, the following description deals with basic information on, for example, (i) an optical disc 200 and optical disc 201 each as an embodiment of the information recording medium of the present invention and (ii) a reproducing system 100 which can handle the optical disc 200 and optical disc 201.

The description below first deals with a detailed structure of each of the above recording media which serves as an embodiment of the information recording medium of the present invention.

Figure 6:
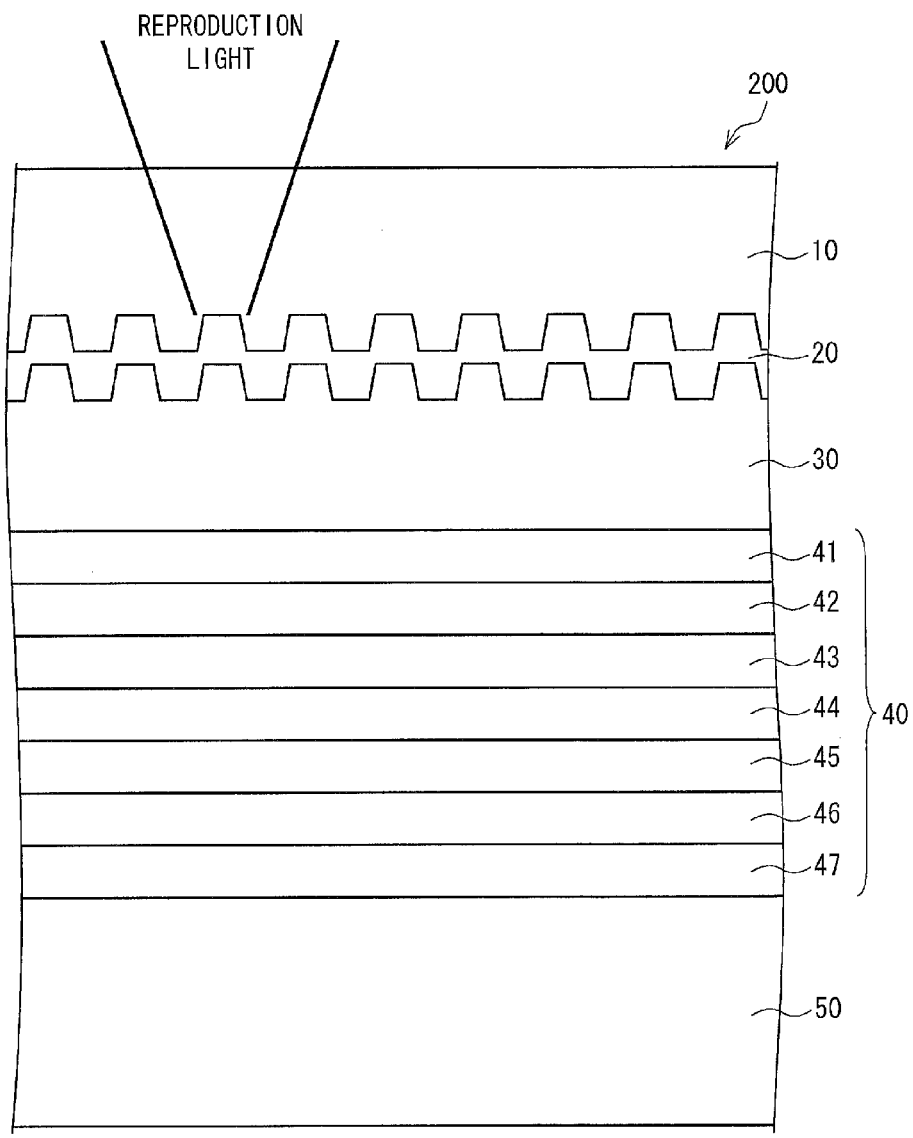
FIG. 6 is a cross-sectional view schematically illustrating a configuration example of an optical information recording medium, which is embodied as an information recording medium of the present invention.

The optical disc 200 of the present embodiment, as illustrated in FIGS. 1 and 6, includes in a structure thereof: a light transmitting layer 10; a first information recording layer 20; an intermediate layer 30; a second information recording layer 40; and a substrate 50, all stacked on top of one another in that order from the side of a reproduction light incident plane.

FIG. 1 is a perspective view schematically illustrating an example configuration of the optical disc 200. FIG. 6 is a cross-sectional view schematically illustrating an example configuration of the optical disc 200.

The light transmitting layer 10 is, for example, made of an ultraviolet curing resin and 75 μm in thickness. The light transmitting layer 10 simply needs to be made of a material which has a high transmittance with respect to wavelengths of reproduction light. Specifically, the light transmitting layer 10 may be made of, for example, a polycarbonate film and a transparent adhesive. The light transmitting layer 10 may be provided with, on a surface thereof, a hard coat for surface protection. The thickness of the light transmitting layer 10 may be changed depending on an optical system of an information recording/reproducing device handling the optical disc 200. Specifically, the light transmitting layer 10 may be made of a polycarbonate substrate having a thickness of, for example, 0.6 mm.

The first information recording layer 20 is a ROM layer. The first information recording layer is made of, for example, aluminum nitride having a refractive index adjusted on the basis of a nitrogen flow rate achieved for film formation, and has a thickness of 15 nm. The thickness and material of the first information recording layer 20 are not limited to the above, and simply need to, for example, allow the first information recording layer 20 to have a reflectance of not less than 0.4% and not greater than 2.2% with respect to the reproduction light wavelengths.

In other words, the first information recording layer 20 simply needs to (i) transmit light having the reproduction light wavelengths and (ii) have a reflectance value which prevents focus pull-in with respect to second reproduction light for reproducing the second information recording layer 40 and which allows focus pull-in with respect to first reproduction light for reproducing the first information recording layer 20.

Specifically, the first information recording layer 20 may (i) be made of, other than aluminum nitride mentioned above, a material such as silicon nitride and a dielectric containing aluminum nitride or silicon nitride as a main component, and may (ii) have a multilayer structure.

The second reproduction light is emitted to the optical disc 200 when information is reproduced from an RE layer such as the second information recording layer 40. The second reproduction light can be emitted by even, for example, an information recording/reproducing device handling an optical information recording medium based on an conventional standard. The first reproduction light has an intensity higher than that of the second reproduction light, and is emitted to the optical disc 200 (or an optical disc 201 described below) when information is reproduced from the first information recording layer 20. The first reproduction light is emitted by an information recording/reproducing device handling an optical information recording medium based on a new standard.

The intermediate layer 30 is, for example, made of a transparent ultraviolet curing resin and 25 μm in thickness. The material of the intermediate layer 30 is not limited to that, and may be any material that has a high transmittance with respect to the reproduction light wavelengths. The thickness of the intermediate layer 30 is not limited to the above, either, and simply needs to be a suitable thickness which allows the individual recording layers (in the present embodiment, the first information recording layer 20 and the second information recording layer 40) to be separated from one another and which causes no interlayer cross talk.

Interlayer cross talk refers to a noise from a recording layer other than a recording layer from which information is being reproduced. The intermediate layer 30 may have a multilayer structure. The intermediate layer 30 includes, on a surface thereof which faces the first information recording layer 20, prepits (not shown) formed of projections and depressions corresponding to information recorded as shapes in the first information recording layer 20.

The second information recording layer 40 is an RE layer, and includes, for example, seven layers of thin films as illustrated in FIG. 6. The seven layers of thin films are: a first protective film 41 (for example, a film made of ZnS—SiO$_2$ and 35 nm in thickness); a second protective film 42 (for example, a film made of ZrO and 5 nm in thickness); a recording layer 43 (for example, a film made of GeTe—Sb$_2$Te$_3$ and 10 nm in thickness); a third protective film 44 (for example, a film made of ZrO and 5 nm in thickness); a fourth protective film 45 (for example, a film made of ZnS—SiO$_2$ and 35 nm in thickness); a fifth protective film 46 (for example, a film made of ZrO and 5 nm in thickness); and a reflective film 47 (for example, a film made of APC (AgPdCu) and 20 nm in thickness), all stacked on top of one another in that order from a side from which reproduction light is incident.

The material and thickness of the second information recording layer 40 and a number of the layers making up the second information recording layer are not limited to the above, and may be any material, thickness, and number that allow the second information recording layer to serve as an RE layer.

The substrate 50 is, for example, made of a polycarbonate and 1.1 mm in thickness. The material, size, and thickness of the substrate 50 are not limited to the above. The substrate is simply required to (i) include grooves on a surface thereof and (ii) have a predetermined strength sufficient for the substrate to serve as such. Specifically, the substrate 50 may be made of a material such as a polyolefin resin and a metal. The substrate 50 may further have a multilayer structure.

The substrate 50 may include, on a surface thereof, prepits, other than the grooves, which prepits are formed of projections and depressions corresponding to information recorded as shapes in the second information recording layer 40. In this case, an area of the second information recording layer 40 on which the prepits are provided is an area on which information is only readable. In other words, the second information recording layer 40 may include both an RE area and a ROM area. For application of the present invention, however, the ROM area is preferably as narrow in range as possible in comparison to the RE area.

Figure 7:
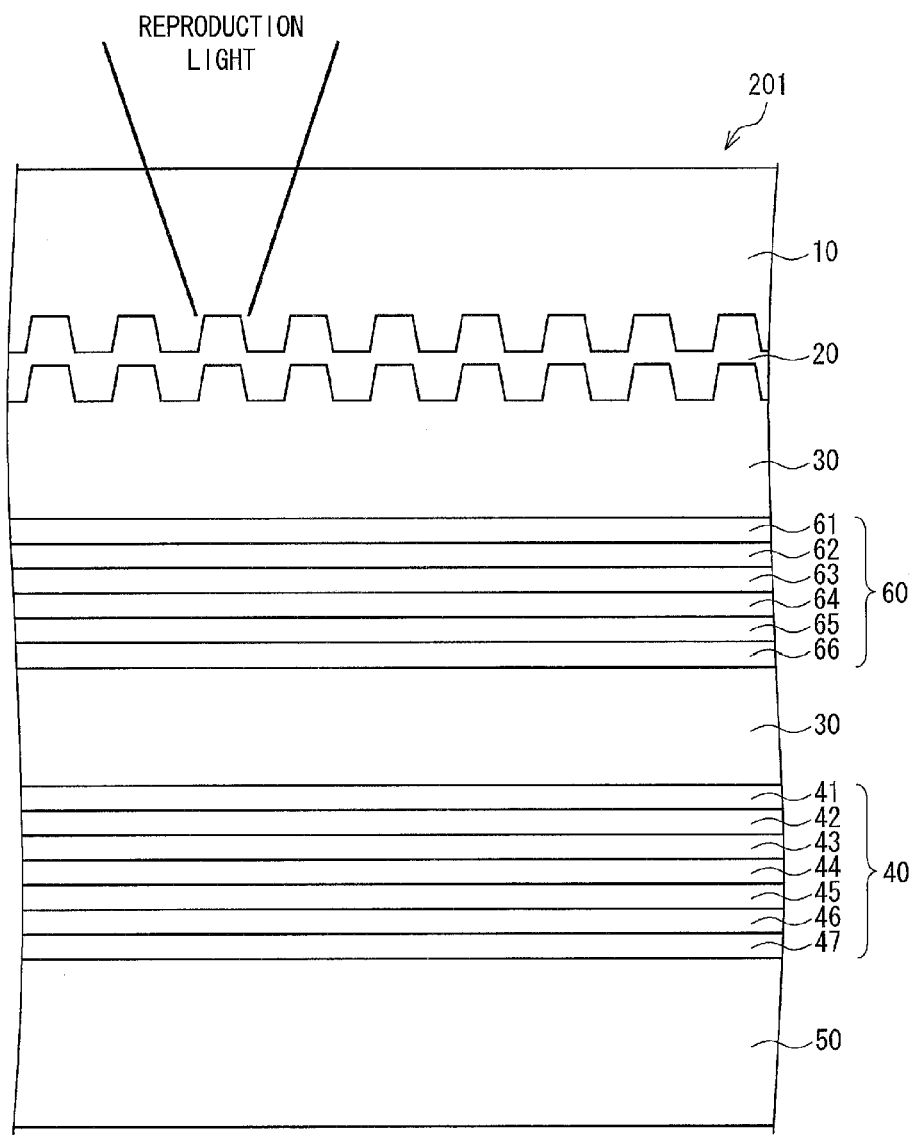
FIG. 7 is a cross-sectional view schematically illustrating another configuration example of the optical information recording medium.

The optical disc 201 as another example of the present embodiment, as illustrated in FIG. 7, includes in a structure thereof: a light transmitting layer 10; a first information recording layer 20; an intermediate layer 30; a third information recording layer (recordable layer; recording layer) 60; an intermediate layer 30; a second information recording layer 40; and a substrate 50, all stacked on top of one another in that order from the side of the reproduction light incident plane. FIG. 7 is a cross-sectional view schematically illustrating an example configuration of the optical disc 201.

The light transmitting layer 10 is, for example, made of an ultraviolet curing resin and 50 µm in thickness. The light transmitting layer 10 simply needs to be made of a material which has a high transmittance with respect to wavelengths of reproduction light. Specifically, the light transmitting layer 10 may be made of, for example, a polycarbonate film and a transparent adhesive. The light transmitting layer 10 may be provided with, on a surface thereof, a hard coat for surface protection. The thickness of the light transmitting layer 10 may be changed depending on an optical system of an information recording/reproducing device for the optical disc 201. Specifically, the light transmitting layer 10 may be made of a polycarbonate substrate having a thickness of, for example, 0.6 mm. The first information recording layer 20 is a ROM layer. The first information recording layer is made of, for example, aluminum nitride having a refractive index adjusted on the basis of a nitrogen flow rate achieved for film formation, and has a thickness of 15 nm.

The thickness and material of the first information recording layer 20 are not limited to the above, and simply need to, for example, allow the first information recording layer 20 to have a reflectance of not less than 0.4% and not greater than 2.2% with respect to the reproduction light wavelengths. In other words, the first information recording layer 20 simply needs to (i) transmit light having the reproduction light wavelengths and (ii) have a reflectance value which prevents focus pull-in with respect to second reproduction light for reproducing the second information recording layer 40 or the third information recording layer 60 and which allows focus pull-in with respect to first reproduction light for reproducing the first information recording layer 20.

Specifically, the first information recording layer may (i) be made of, other than aluminum nitride mentioned above, a material such as silicon nitride and a dielectric containing aluminum nitride or silicon nitride as a main component, and may (ii) have a multilayer structure.

The intermediate layers 30 are each, for example, made of a transparent ultraviolet curing resin and 25 µm in thickness. The material of the intermediate layers 30 is not limited to that, and may be any material that has a high transmittance with respect to the reproduction light wavelengths. The thickness of the intermediate layers 30 is not limited to the above, either, and simply needs to be a suitable thickness which allows the individual recording layers (in the present embodiment, the first information recording layer 20, the second information recording layer 40, and the third information recording layer 60) to be separated from one another and which causes no interlayer cross talk. The intermediate layers 30 may each further have a multilayer structure.

The intermediate layer 30 between the first information recording layer 20 and the third information recording layer 60 includes, on a surface thereof which faces the first information recording layer 20, prepits formed of projections and depressions corresponding to information recorded as shapes in the first information recording layer 20.

The intermediate layer 30 between the second information recording layer 40 and the third information recording layer 60 includes grooves on a surface thereof which faces the third information recording layer 60. This intermediate layer 30 may include, in addition to the grooves, prepits formed of projections and depressions corresponding to information recorded as shapes in the third information recording layer 60. In this case, an area of the third information recording layer 60 on which the prepits are provided is an area on which information is only readable. In other words, the third information recording layer 60 may include both an RE area and a ROM area.

For application of the present invention, however, the ROM area is preferably as narrow in range as possible in comparison to the RE area.

The second information recording layer 40 is an RE layer, and includes, for example, seven layers of thin films. The seven layers of thin films are: a first protective film 41 (for example, a film made of ZnS—SiO$_2$ and 35 nm in thickness); a second protective film 42 (for example, a film made of ZrO and 5 nm in thickness); a recording layer 43 (for example, a film made of GeTe—Sb$_2$Te$_3$ and 10 nm in thickness); a third protective film (for example, a film made of ZrO and 5 nm in thickness); a fourth protective film 45 (for example, a film made of ZnS—SiO$_2$ and 35 nm in thickness); a fifth protective film 46 (for example, a film made of ZrO and 5 nm in thickness); and a reflective film 47 (for example, a film made of APC (AgPdCu) and 20 nm in thickness), all stacked on top of one another in that order from a side from which reproduction light is incident.

The material and thickness of the second information recording layer 40 and a number of the layers making up the second information recording layer are not limited to the above, and may be any material, thickness, and number that allow the second information recording layer to serve as an RE layer.

The third information recording layer 60 is an RE layer, and includes, for example, six layers of thin films. The six layers of thin films are: a first protective film 61 (for example, a film made of ZnS—SiO$_2$ and 35 nm in thickness); a second protective film 62 (for example, a film made of ZrO and 5 nm in thickness); a recording layer 63 (for example, a film made of GeTe—Sb$_2$Te$_3$ and 6 nm in thickness); a third protective film 64 (for example, a film made of ZrO and 5 nm in thickness); a semi-transparent film 65 (for example, a film made of APC (AgPdCu) and 20 nm in thickness); and a transmittance adjustment film 66 (for example, a film made of TiO$_2$ and 19 nm in thickness), all stacked on top of one another in that order from the side from which reproduction light is incident.

The material and thickness of the second information recording layer 40 and a number of the layers making up the second information recording layer are not limited to the above, and may be any material, thickness, and number that allow the second information recording layer to serve as an RE layer having a transmittance of approximately 60% with respect to the reproduction light wavelengths.

The substrate 50 is, for example, made of a polycarbonate and 1.1 mm in thickness. The material, size, and thickness of the substrate 50 are not limited to the above. The substrate is simply required to (i) include grooves on a surface thereof and (ii) have a predetermined strength sufficient for the substrate to serve as such. Specifically, the substrate 50 may be made of a material such as a polyolefin resin and a metal. The substrate 50 may further have a multilayer structure.

In addition to the grooves, the substrate 50 may include, on a surface thereof, prepits formed of projections and depressions corresponding to information recorded as shapes in the second information recording layer 40. In this case, an area of the second information recording layer 40 on which the prepits are provided is an area on which information is only readable. In other words, the second information recording layer 40 may include both an RE area and a ROM area.

For application of the present invention, however, the ROM area is preferably as narrow in range as possible in comparison to the RE area.

The optical disc 201 is not limited to the above arrangement, and may be arranged such that any of its RE layers is replaced with an R layer.

The optical disc 200 and the optical disc 201 are each not limited to a two-layer or three-layer structure, and may each be an optical information recording medium including an additional recording layer.

The optical disc 200 (as well as the optical disc 201) preferably satisfies the following formula:

$$0.004 < \frac{(n_0^2 + n_1^2)(n_1^2 + n^2) - 4n_0 n_1^2 n + (n_0^2 - n_1^2)(n_1^2 - n^2)\cos(4\pi n_1 d/\lambda)}{(n_0^2 + n_1^2)(n_1^2 + n^2) + 4n_0 n_1^2 n + (n_0^2 - n_1^2)(n_1^2 - n^2)\cos(4\pi n_1 d/\lambda)} \le 0.022 \quad \text{[Math. 1]}$$

where $\lambda$ is a reproduction light wavelength; d is the thickness of the first information recording layer 20; and n0, n1, and n are respective refractive indices of the light transmitting layer 10, the first information recording layer 20, and the intermediate layer 30.

The above formula is preferably satisfied because as disclosed in Non Patent Literature 1, the reflectance of the first information recording layer with respect to a reproduction light wavelength can be represented by the above formula, where $\lambda$ is a reproduction light wavelength; d is the thickness of the first information recording layer 20; and n0, n1, and n are respective refractive indices of the light transmitting layer 10, the first information recording layer 20, and the intermediate layer 30.

The above formula can specify a structure for obtaining a reflectance of the first information recording layer 20 with respect to a reproduction light wavelength.

The optical disc 200 (as well as the optical disc 201) preferably includes a first information recording layer 20 which is made of a dielectric having a refractive index of not less than 1.75 and not greater than 2.06.

The light transmitting layer 10 and the intermediate layers 30 are each typically made of a resin having a refractive index of approximately 1.5. The first information recording layer 20 preferably has a thickness of approximately 15 nm in view of (i) reproduction durability and (ii) a cost increase due to an increase in film formation time which increase arises from an increase in film thickness. In consideration of the these two limitations attributed to actual production, the refractive index of the first information recording layer 20 is calculated, from the formula disclosed in Non Patent Literature 1, to be greater than 1.75 and not greater than 2.06.

EXAMPLES

Figure 8:
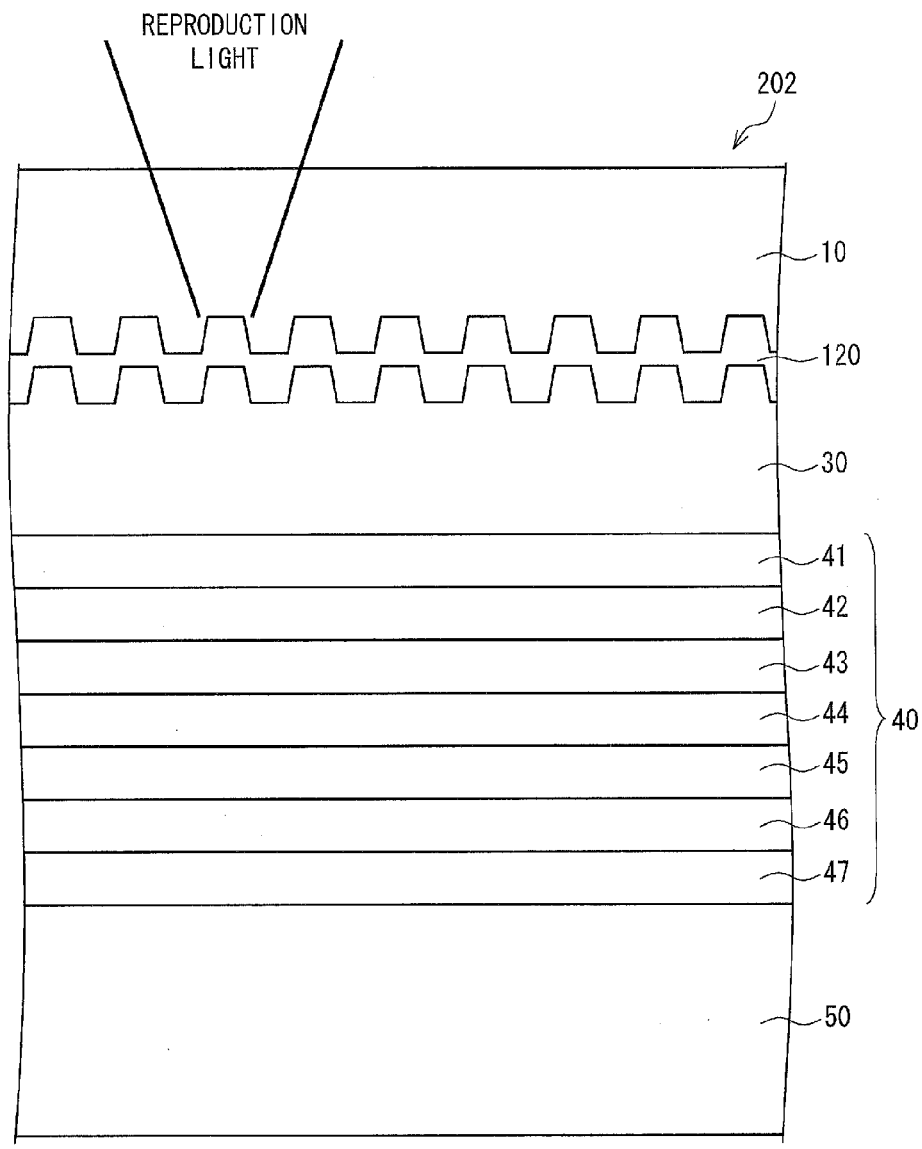
FIG. 8 is a cross-sectional view schematically illustrating a configuration of an optical information recording medium, which is Comparative Example 1 with respect to the optical information recording medium shown in FIGS. 6 and 7.

The optical disc 200 illustrated in FIG. 6 was prepared as Example 1, whereas an optical disc 202 illustrated in FIG. 8 was prepared as Comparative Example 1 to be compared with Example 1. The following describes their respective structures with reference to FIGS. 6 and 8. FIG. 8 is a cross-sectional view schematically illustrating a configuration of the optical disc 202 serving as Comparative Example 1 to be compared with the optical disc 200 prepared as Example 1.

The optical disc 200 according to Example 1, as illustrated in FIG. 6, was configured to include, in a structure thereof: a light transmitting layer 10; a first information recording layer 20; an intermediate layer 30; a second information recording layer 40; and a substrate 50, all stacked on top of one another in that order from the side of the reproduction light incident plane.

The light transmitting layer 10 was made of an ultraviolet curing resin (having a refractive index of 1.50 with respect to reproduction light wavelengths) and 75 μm in thickness.

The first information recording layer 20 was a ROM layer. The first information recording layer was made of aluminum nitride (having a refractive index of 2.01 with respect to the reproduction light wavelengths) having a refractive index adjusted on the basis of a nitrogen flow rate achieved for film formation, and had a thickness of nm. The aluminum nitride, of which the first information recording layer 20 was made, was deposited by sputtering into a film on a surface of the intermediate layer 30.

The intermediate layer 30 was made of a transparent ultraviolet curing resin (having a refractive index of 1.50 with respect to the reproduction light wavelengths) and 25 μm in thickness. The intermediate layer 30 was configured to include prepits on a surface thereof which faced the first information recording layer 20. By a 2P method (photo polymerization method) the prepits were formed of projections and depressions corresponding to information recorded as shapes in the first information recording layer 20. The 2P method is a technique that (i) fills a space between a flat plate and a base panel with an ultraviolet curing resin, (ii) cures the ultraviolet curing resin by ultraviolet irradiation, and then (iii) detaches the base panel so as to transfer projections and depressions of the base panel onto the flat plate.

The second information recording layer 40 was an RE layer, and was configured to include seven layers of thin films deposited by sputtering. Specifically, the seven layers of thin films were: a first protective film 41 (made of ZnS—$SiO_2$ and 35 nm in thickness); a second protective film 42 (made of ZrO and 5 nm in thickness); a recording layer 43 (made of GeTe—$Sb_2Te_3$ and 10 nm in thickness); a third protective film 44 (made of ZrO and 5 nm in thickness); a fourth protective film 45 (made of ZnS—$SiO_2$ and 35 nm in thickness); a fifth protective film 46 (made of ZrO and 5 nm in thickness); and a reflective film 47 (made of APC (AgPdCu) and 20 nm in thickness), all stacked on top of one another in that order from a side from which reproduction light was incident.

The substrate 50 was a disk-shaped substrate which (i) was made of a polycarbonate, which (ii) had a diameter of 120 mm and a thickness of 1.1 mm, and which (iii) included grooves.

The optical disc 202 as Comparative Example 1, as illustrated in FIG. 8, was configured to include, in a structure thereof: a light transmitting layer 10; a first information recording layer (read only layer; recording layer) 120; an intermediate layer 30; a second information recording layer 40; and a substrate 50, all stacked on top of one another in that order from the side of the reproduction light incident plane. The first information recording layer 120 of the optical disc 202 was made of conventionally used metal semi-transparent film of APC (AgPdCu) and 5 nm in thickness. The other layers (namely, the light transmitting layer 10, the intermediate layer 30, the second information recording layer 40, and the substrate 50) were identical to respective equivalents of Example 1.

The first information recording layer 20 of Example had a transmittance of 95%, whereas the first information recording layer 120 of Comparative Example 1 had a transmittance of 80%. The first information recording layer 20 of Example 1 had a reflectance of 1.8% with respect to the reproduction light wavelengths, and the second information recording layer 40 of Example 1 had a return light ratio of 13.5%. The first information recording layer 120 of Comparative Example had a reflectance of 8% with respect to the reproduction light wavelengths, and the second information recording layer 40 of Comparative Example 1 had a return light ratio of 9.6%.

Example 1 and Comparative Example 1 then each measured, with use of a disc tester (ODU-1000; produced by Pulstec Industrial Co., Ltd.) which (i) was configured to include: a semiconductor laser capable of emitting laser light having a wavelength of 406 nm; and an optical system having a N.A. (aperture ratio) of 0.85 and which (ii) was commonly used as a BD (blu-ray disc) tester, S-characteristics detected when a number of recording layers was counted at an initial stage of reproduction. (a) through (c) of FIG. 9 illustrate results of the measurement.

Figure 9:
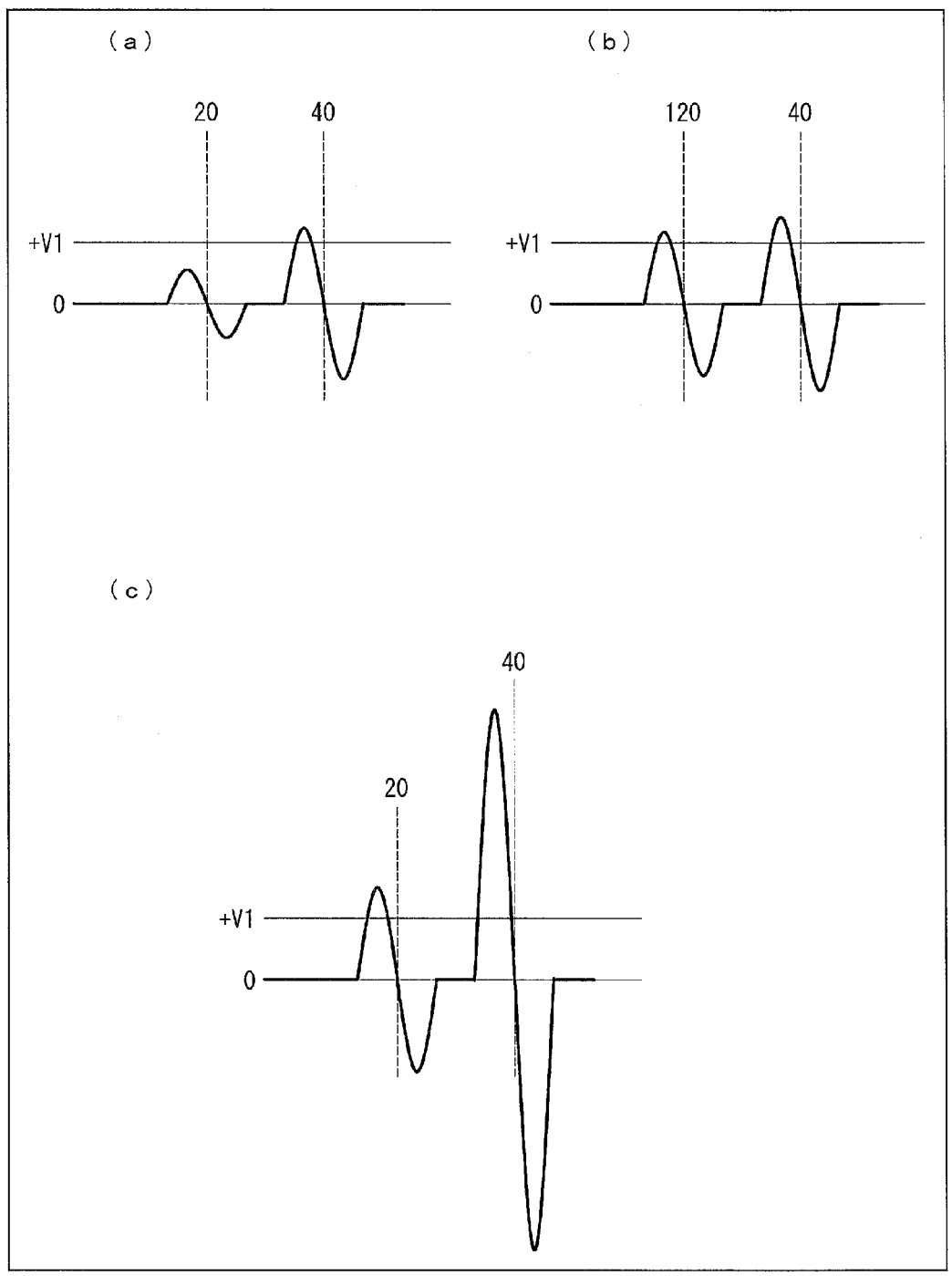
FIG. 9 is a schematic view illustrating results of S-characteristics measurement carried out with reproduction laser power of 0.7 mW on (i) the optical information recording medium of Example 1 shown in FIGS. 6 and 7 and the optical information recording medium of Comparative Example 1 shown in FIG. 8. (a) of FIG. 9 illustrates S-characteristics obtained by measuring the optical information recording medium of Example 1 (b) of FIG. 9 illustrates S-characteristics obtained by measuring the optical information recording medium of Comparative Example 1. (c) of FIG. 9 illustrates S-characteristics obtained by measuring, with reproduction laser power of 1.0 mW, the optical information recording medium of Example 1 shown in FIGS. 6 and 7.

(a) and (b) of FIG. 9 are each a graph illustrating an S-characteristic obtained by irradiating the respective optical discs 200 and 202 with laser light having an intensity set to 0.7 mW for reproducing an RE layer, which intensity is a maximum reproduction laser power for a BD information recording/reproducing device under the current standard.

(a) of FIG. 9 illustrates the S-characteristic obtained by the measurement for the optical disc 200 of Example 1. (b) of FIG. 9 is the S-characteristic obtained by the measurement for the optical disc 202 of Comparative Example 1. (c) of FIG. 9 illustrates an S-characteristic obtained by irradiating the optical disc 200 as Example 1 with laser light having an intensity set to 1.0 mW for reproducing a ROM layer.

As illustrated in (a) of FIG. 9, the S-characteristic of the first information recording layer 20 of Example 1 had a measured value of 186 mV, which does not exceed a reference voltage +V1 (230 mV) that allows the disc tester to focus. As such, (a) of FIG. 9 indicates that the first information recording layer 20 cannot be recognized as a recording layer by an information recording/reproducing device (that is, an information recording/reproducing device which is based on the conventional standard and which cannot handle the first information recording layer 20) that counts the number of recording layers with use of laser light having an intensity of 0.7 mW, which is the maximum reproduction laser power for a BD information recording/reproducing device under the current standard.

As such, an information recording/reproducing device based on the conventional standard cannot, of course, focus on the first information recording layer 20. No focus was achieved in an attempt to focus on the first information recording layer 20 during an actual measurement involving the above-mentioned versatile disc tester that can handle various optical information recording media as compared to a consumer disc information recording/reproducing device generally commercially available. The reference voltage +V1 was a value set as a value which allowed the ODU-1000 to reproduce and evaluate information recorded on a two-layer information recording medium.

In contrast, as illustrated in (b) of FIG. 9, the S-characteristic of the first information recording layer 120 of Comparative Example 1 had a measured value of 847 mV, which exceeded the reference voltage +V1 (230 mV). As such, (b) of FIG. 9 indicates that the first information recording layer 120 can be recognized as a recording layer by an information recording/reproducing device (that is, an information recording/reproducing device which is based on the conventional standard and which cannot handle the first information recording layer 120) that counts the number of recording layers with use of laser light having an intensity of 0.7 mW, which is the maximum reproduction laser power for BD information recording/reproducing devices under the conventional standard.

The above results indicate the following: as compared to Comparative Example 1, the first information recording layer 20 of Example 1 has an extremely low possibility to be recognized by an information recording/reproducing device under the conventional standard when it counts the number of recording layers with use of laser light having an intensity of 0.7 mW, which is the maximum reproduction laser power for the BD information recording/reproducing devices under the conventional standard. In other words, since the first information recording layer 20 cannot be focused on by a disc tester which is more versatile than a commonly used information recording/reproducing device, the first information recording layer substantially cannot be recognized by an information recording/reproducing device based on the conventional standard.

There is, on the other hand, a high possibility for the first information recording layer 120 of Comparative Example 1 to be recognized by an conventional standard information recording/reproducing device when it counts the number of recording layers with use of laser light having an intensity of 0.7 mW, which is the maximum reproduction laser power for a BD information recording/reproducing device under the current standard. This is because a commonly used conventional standard information recording/reproducing device can presently handle up to two recording layers. An conventional standard information recording/reproducing device may, however, cause a reproduction defect in recognizing the first information recording layer 120, which is a recording layer unidentifiable to the conventional standard information recording/reproducing device.

As illustrated in (c) of FIG. 9, the S-characteristic of the first information recording layer 20 of Example 1 had a measured value of 274 mV, which exceeds the reference voltage +V1 (230 mV). As such, (c) of FIG. 9 indicates that the first information recording layer 20 can be recognized as a recording layer by an information recording/reproducing device (that is, a new-standard information recording/reproducing device which can handle the first information recording layer 20) that counts the number of recording layers with laser light having an intensity of 1.0 mW, which is an intensity for reproducing the first information recording layer 20. In other words, a new-standard information recording/reproducing device can, of course, focus on the first information recording layer 20 and reproduce information from the first information recording layer 20. An actual measurement confirmed, with an attempt to focus on the first information recording layer 20, that a new-standard information recording/reproducing device could focus on the first information recording layer.

As illustrated in (a) and (c) of FIG. 9, the S-characteristics of the second information recording layer 40 of Example 1 had respective measured values of 1438 mV and 2105 mV, each of which exceeds the reference voltage +V1 (230 mV). As such, an information recording/reproducing device, regardless of whether it is based on a new standard or an conventional standard, (that is, both an conventional standard information recording/reproducing device and a new-standard information recording/reproducing device) can focus on the second information recording layer 40, and can thus record and reproduce information in and from the second information recording layer 40.

As described above, the optical disc 200, even in a case where information thereon is reproduced by an conventional standard information recording/reproducing device, causes no defective reproduction in the conventional standard information recording/reproducing device unlike in Comparative Example 1, and allows information to be recorded in and reproduced from the second information recording layer 40. A new-standard information recording/reproducing device can reproduce even information recorded in the first information recording layer 20. As such, the optical disc 200 has successfully increased a recording capacity while maintaining a limit value of a recording capacity of the second information recording layer 40. This description about the optical disc 200 applies also to the optical disc 201.

A commonly used information recording/reproducing device can focus on an information recording layer to a limitative extent which, as described above, depends on an S-characteristic and thus depends basically on an amount of reflected light. A plurality of samples were measured with use of the above disc tester for respective focus upper limits for reflectance with respect to different reproduction laser powers. (a) of FIG. 10 illustrates results of the measurement.

Figure 10:
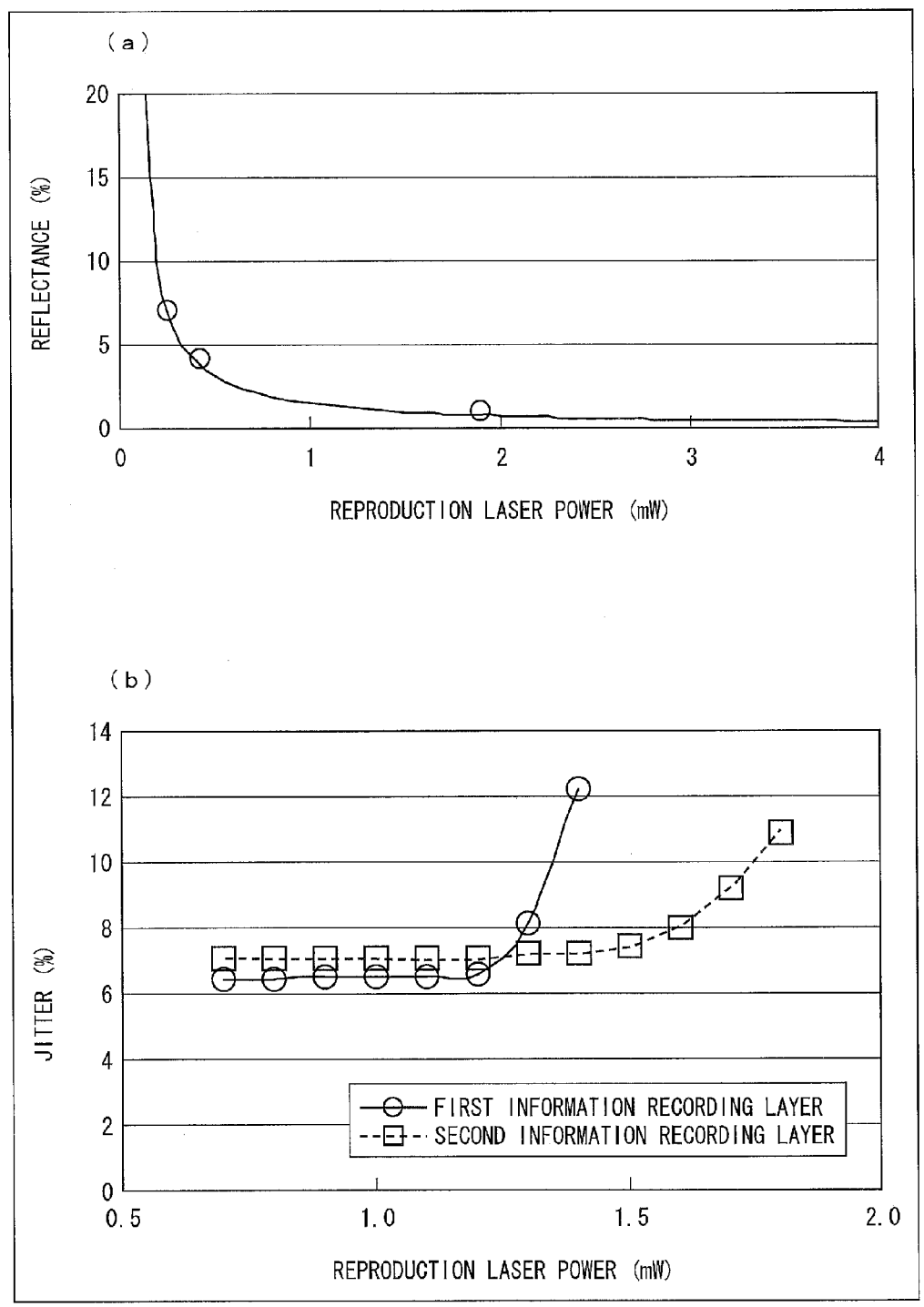
FIG. 10 is a view illustrating (i) a relation between reflectance and reproduction laser power and (ii) a relation between jitter and reproduction laser power. (a) of FIG. 10 illustrates reproduction laser power dependency of a maximum reflectance at which focus cannot be achieved. (b) of FIG. 10 illustrates reproduction laser power dependency of jitter on a rewritable optical information recording medium having a two-layer structure.

(a) of FIG. 10 indicates that at 0.7 mW, which is the maximum reproduction laser power for a BD information recording/reproducing device under the current standard, a reflectance of 2.2% is an upper limit value for a reflectance with which a recording layer cannot be focused on (that is, cannot be recognized).

Since a reproduction laser power likely varies depending on a BD information recording/reproducing device, the maximum reproduction laser power may actually be approximately 20% higher (0.84 mW). The results illustrated in (a) of FIG. 10 indicate that even in such a case (that is, at the reproduction laser power of 0.84 mW), the upper limit value of a reflectance with which a recording layer cannot be focused on (that is, cannot be recognized) is 1.8%.

The optical disc 200 and the optical disc 201 each include RE layers (namely, the second information recording layer 40 and the third information recording layer 60). As such, when the number of recording layers is counted, the RE layers may each receive focused emission of reproduction light serving to reproduce information from the first information recording layer 20 and having a high laser power.

The number of recording layers is typically counted in the lead-in area. In view of this, a reflectance of a lead-in area of a currently commercially available single-layer BD-RE was measured with use of a disc tester (DDU-1000; produced by Pulstec Industrial Co., Ltd.) including: a semiconductor laser capable of (i) increasing a reproduction laser power further than the above disc tester and (ii) emitting laser light having a wavelength of 405 nm; and an optical system having an N.A. (aperture ratio) of 0.85.

First, the reflectance of the lead-in area was measured at 0.35 mW, which is a reproduction laser power for a single-layer BD. Next, the lead-in area was irradiated with laser light having a higher reproduction laser power. Then, the reproduction laser power was switched back to 0.35 mW and the reflectance of the lead-in area was measured again. As a result, a reproduction laser power which causes degradation in an RE layer (that is, a decrease in the reflectance of the lead-in area) was measured.

The above measurement demonstrated that while a reproduction laser power of up to 3.5 mW does not change the reflectance, a reproduction laser power of 4.0 mW decreases the reflectance by 5% (that is, degrades an RE layer). In other words, in a case where the number of recording layers is counted with use of laser light having a laser power higher than 3.5 mW, the lead-in area of the RE layer may be degraded. Since the results illustrated in (a) of FIG. 10 indicate that the upper limit value of a reflectance with which a recording layer cannot be focused on at 3.5 mW is 0.4%, the above measurement indicates that the first information recording layer 20 needs to have a reflectance of greater than 0.4%.

When information is reproduced from the optical disc 200 or the optical disc 201, a recording layer may become out of focus as a result of a physical impact. In such a case, reproduction light for reproducing information from the first information recording layer 20 may be emitted to an information recording section in the information recording area of an RE layer (namely, the second information recording layer 40 or the third information recording layer 60). In view of this, reproduction light was emitted to an information recording section in a currently commercially available two-layer RE-BD so that a measurement was made of a reproduction laser power which degrades recorded information. This measurement was made with use of the above disc tester (ODU-1000) and involved, as an index of degradation in recorded information, jitter, which is commonly used as an index of quality of a reproduction signal. (b) of FIG. 10 illustrates results of this measurement.

(b) of FIG. 10 indicates that (i) in a case where the reproduction laser power is higher than 1.2 mW, the jitter sharply increases for a first information recording layer (RE layer) of the two-layer RE-BD (that is, the RE layer is degraded), and that in other words (ii) 1.2 mW is an upper limit value of a reproduction laser power which causes no degradation in information recorded in an RE layer.

The results illustrated in (a) of FIG. 10 indicate that 1.2% is the upper limit value of a reflectance with which a recording layer cannot be focused on at the reproduction laser power of 1.2 mW. It follows that it is possible, with a reflectance of greater than 1.2%, to focus on a recording layer even at a reproduction laser power of not greater than 1.2 mW.

As such, a reflectance of the first information recording layer 20 of each of the optical discs 200 and 201 with respect to the reproduction light wavelengths simply needs to be greater than 0.4% and not greater than 2.2%, or preferably greater than 1.2% and not greater than 1.8%.

Measurements using either of the above two disc testers produce identical results, provided that the reproduction light wavelengths fall within a range of blue laser wavelengths.

A commonly used information recording/reproducing device recognizes a recording layer in a case where an S-characteristic detected from the recording layer has a measured value that exceeds a predetermined reference voltage. When the information recording/reproducing device has recognized a recording layer, it focuses on the recognized recording layer. As such, it is possible to reproduce information from the recording layer. The following describes how a recording layer can be focused on and information can be reproduced from the recording layer in accordance with results of detecting an S-characteristic.

Figure 11:
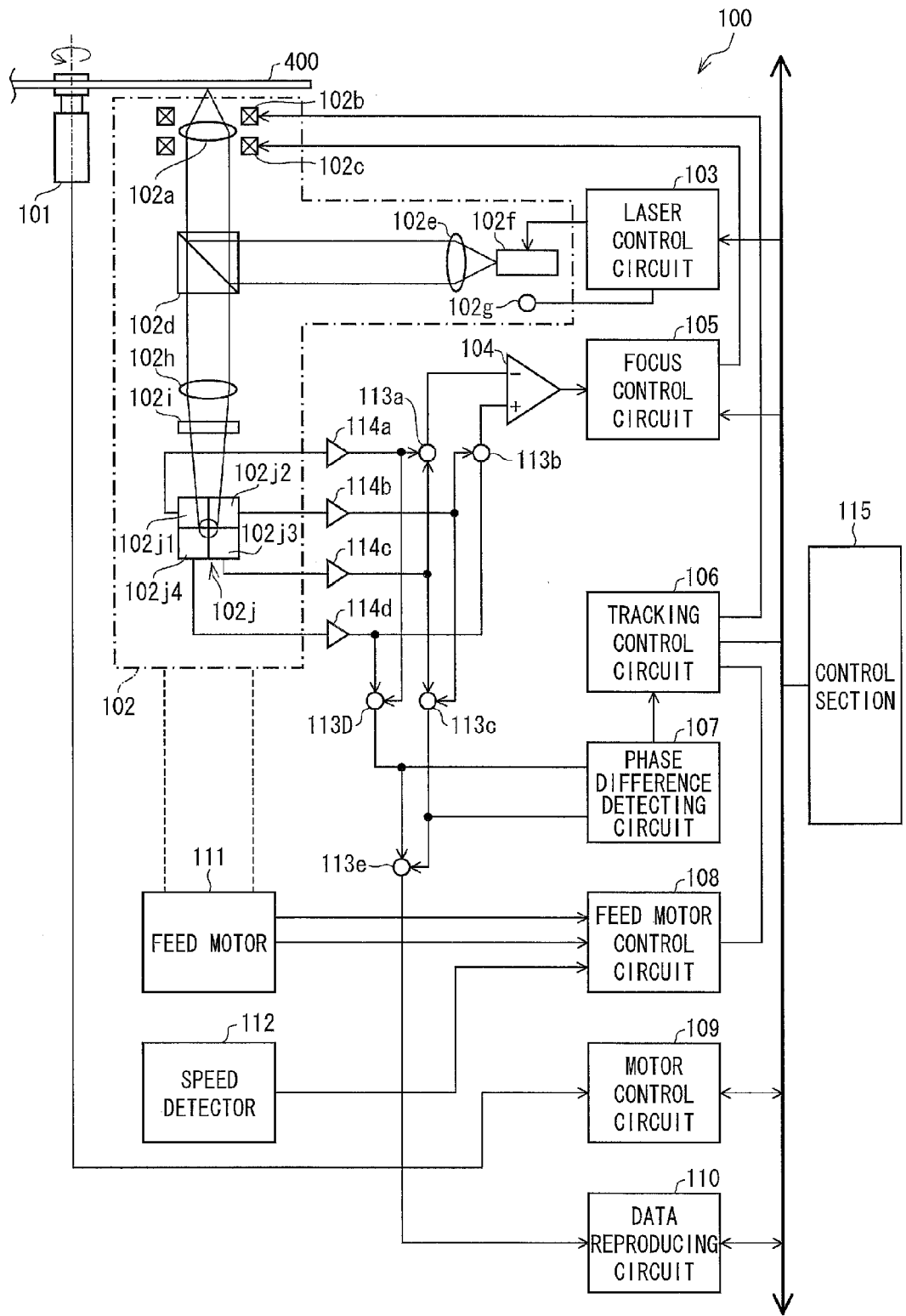
FIG. 11 is an explanatory view illustrating an example of a reproducing system for reproducing a conventional multilayer optical information recording medium.

The description below first deals with a reproducing system (information recording/reproducing device; information recording device) 100 for reproducing a common multilayer optical information recording medium. With reference to FIG. 11, the description below deals with a configuration of the reproducing system 100 which reproduces information from, for example, a four-layer optical disc 400 illustrated in FIG. 12.

As illustrated in FIG. 11, the reproducing system 100 includes a disc drive motor 101, which drives a disk-shaped optical disc 400 (see FIG. 12 for its schematic cross-sectional structure) to rotate at a predetermined velocity. The disc drive motor 101 is controlled by a motor control circuit 109. Information on the optical disc 400 being driven to rotate as above is read by an optical pickup 102.

The optical pickup 102 is arranged to be capable of being moved in a radial direction of the optical disc 400 by a driving force of a feed motor 111. The feed motor 111 is controlled by a feed motor control circuit 108. The feed motor 111 is arranged such that its rotation velocity is detected by a velocity detector 112. The velocity detector 112 supplies a result of the detection to the feed motor control circuit 108 in the form of a velocity signal.

The optical pickup 102 includes an objective lens 102*a*, which is supported in such a manner as to be capable of moving in a focus direction (optical axis direction) and a tracking direction (radial direction of the optical disc 400).

The objective lens 102*a* is controlled for its position along the focus direction as a result of a focus control signal, generated by a focus control circuit 105, being supplied to a focus drive coil 102*c*. Similarly, the objective lens 102*a* is controlled for its position along the tracking direction as a result of a tracking control signal, generated by a tracking control circuit 106, being supplied to a tracking drive coil 102*b*.

The reproducing system includes a laser control circuit 103, which drives a semiconductor laser oscillator 102*f* in the optical pickup 102 so that the semiconductor laser oscillator 102*f* generates laser light. The optical pickup further includes a light intensity detector 102*g*, which detects an amount of laser light generated by the semiconductor laser oscillator 102*f* and which feeds back a result of the detection to the laser control circuit 103. With this arrangement, the laser control circuit 103 can control the amount of the laser light, which the semiconductor laser oscillator 102*f* is caused to generate, so that the amount is kept constant.

The laser light generated by the semiconductor laser oscillator 102*f* passes through a collimator lens 102*e* and is curved by a half prism 102*d* at the right angle. The laser light is then focused by the objective lens 102*a* on a recording layer of the optical disc 400. This recording layer of the optical disc 400 refers to one of a first information recording layer A, a second information recording layer B, a third information recording layer C, and a fourth information recording layer D all illustrated in FIG. 12. The first information recording layer A, the second information recording layer B, the third information recording layer C, and the fourth information recording layer D are each a ROM layer, which includes a APC (AgPdCu) film that (i) is formed over prepits formed of projections and depressions corresponding to information, that (ii) has a fixed shape, and that allows only reading out of information.

Light reflected by the optical disc 400 travels through the objective lens 102*a* in a direction opposite to the traveling direction of the above laser light, and passes through the half prism 102*d* in a straight direction. The reflected light then passes through a condensing lens 102*h* and a cylindrical lens 102*i* to be received by a photoelectric transfer device 102*j*. The photoelectric transfer device 102*j* includes four photodetectors 102*j*1 through 102*j*4 each of which generates an electric signal in correspondence with an amount of light received. In a case of this photoelectric transfer device 102*j*, (i) a direction in which the photodetectors 102*j*1 and 102*j*2 are arranged and (ii) a direction in which the photodetectors 102*j*3 and 102*j*4 are arranged correspond to the tracking direction of the optical disc 400. Similarly, (i) a direction in which the photodetectors 102*j*1 and 102*j*4 are arranged and (ii) a direction in which the photodetectors 102*j*2 and 102*j*3 are arranged correspond to a tangential direction of the optical disc 400.

The photodetector 102*j*1 supplies an electric signal via an amplifier circuit 114*a* to a first terminal of each of addition circuits 113*a* and 113*d*. The photodetector 102*j*2 supplies an electric signal via an amplifier circuit 114*b* to a first terminal of each of addition circuits 113*b* and 113*c*. The photodetector 102*j*3 supplies an electric signal via an amplifier circuit 114*c* to a second terminal of each of the addition circuits 113*a* and 113*c*. The photodetector 102*j*4 supplies an electric signal via an amplifier circuit 114*d* to a second terminal of each of the addition circuits 113*b* and 113*d*.

The addition circuit 113*a* supplies an output signal to an inverting input terminal—of a differential amplifier circuit 104, whereas the addition circuit 113*b* supplies an output signal to a non-inverting input terminal + of the differential amplifier circuit 104. The differential amplifier circuit 104 calculates a difference between the respective output signals of the addition circuits 113a and 113b so as to generate a focus error signal and supply it to the focus control circuit 105. The focus control circuit 105 generates a focus control signal for the focus drive coil 102c so that the focus error signal supplied has a 0 level. As such, focus servo is carried out with respect to the objective lens 102a.

Figure 13:
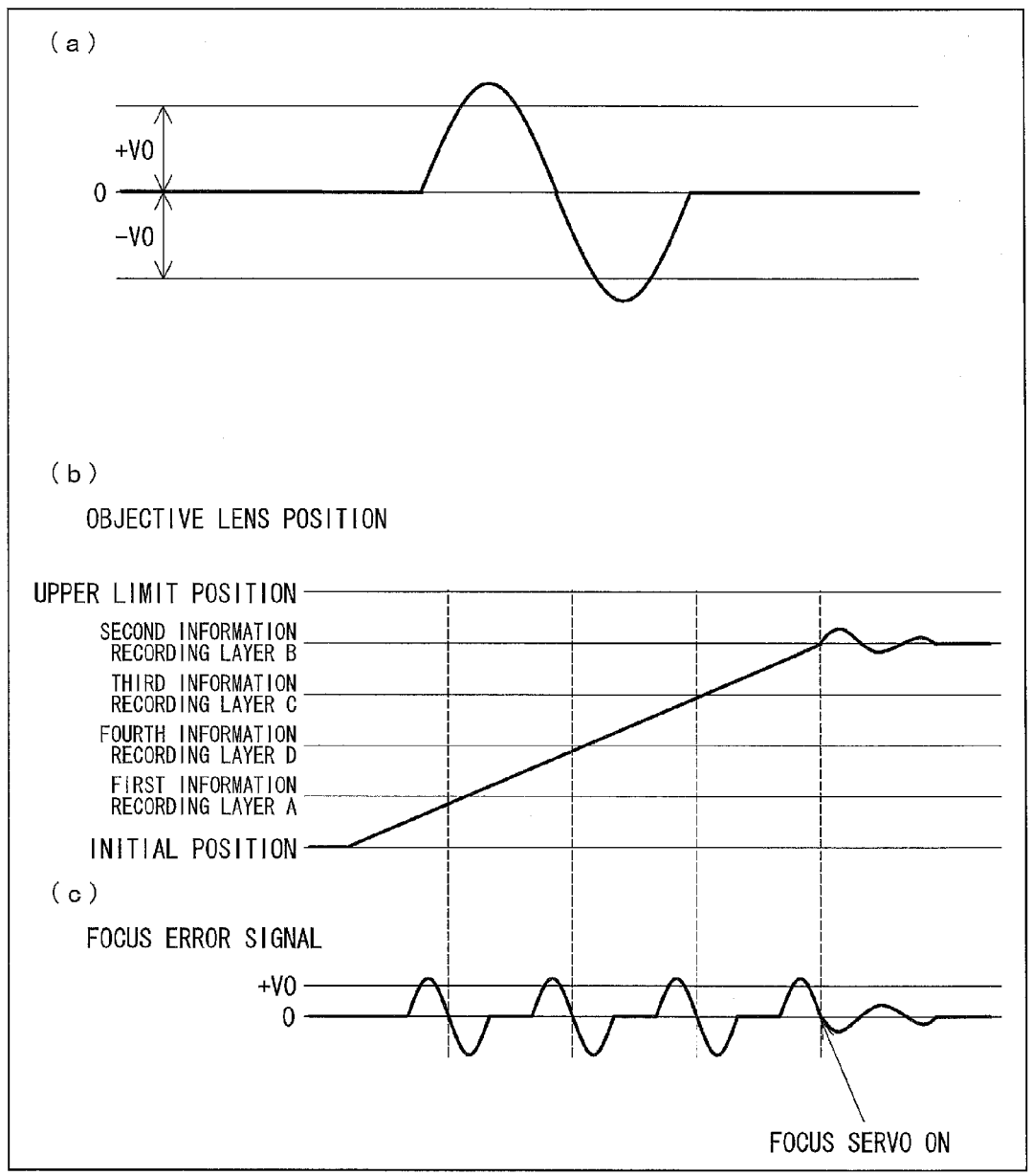
FIG. 13 is an explanatory view illustrating (i) S-characteristics in the reproducing system shown in FIG. 9, (ii) how a position of an objective lens is moved when a focus searching process is carried out on the second information recording layer shown in FIG. 12 by the reproducing system, and (iii) a focus error signal. (a) of FIG. 13 illustrates S-characteristics in the reproducing system. (b) of FIG. 13 illustrates how a position of an objective lens is moved when a focus searching process is carried out on the second information recording layer shown in FIG. 12 by the reproducing system. (c) of FIG. 13 illustrates a relation between the position of the objective lens and a focus error signal.

The focus error signal outputted by the differential amplifier circuit 104, as illustrated in (a) of FIG. 13, has an S-characteristic in a case where a focus searching process (that is, a process of counting the number of recording layers) is carried out while a position at which the objective lens 102a condenses laser light is sequentially moved from an initial position in a focus direction.

Figure 12:
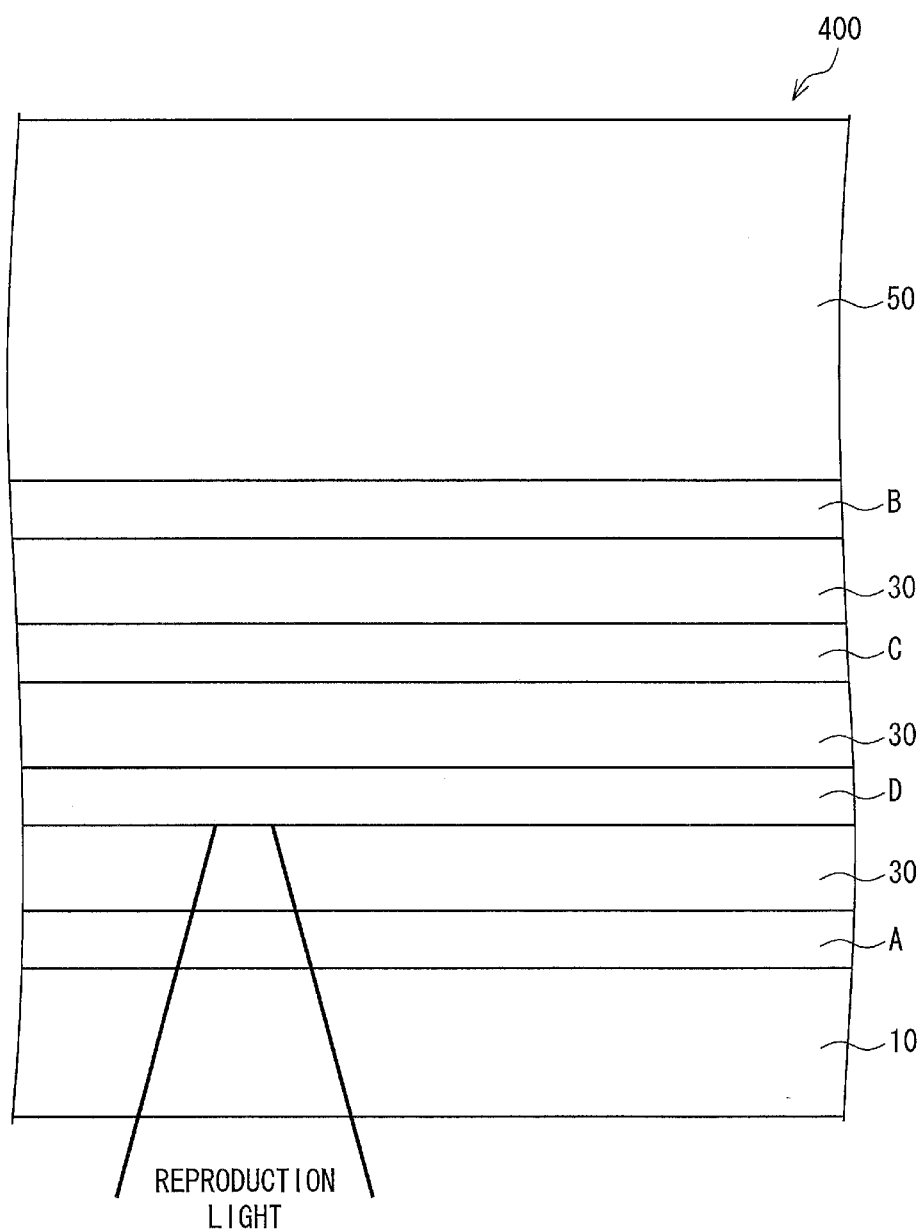
FIG. 12 is a cross-sectional view illustrating a conventional multilayer optical information recording medium, which has a four-layer structure.

Specifically, in a case where the focus searching process is carried out, the focus error signal exhibits the S-characteristic as illustrated in (a) of FIG. 13 each time the position at which the objective lens 102a condenses laser light passes through a recording layer illustrated in FIG. 12 (namely, the first information recording layer A, the fourth information recording layer D, the third information recording layer C, or the second information recording layer B). The above initial position refers to a position at which the objective lens 102a is located before it focuses. The initial position is, in FIG. 11, normally a position below the first information recording layer A of the optical disc 400 which position is the farthest away from the optical disc 400 in the optical axis direction.

When, for example, starting reproduction of the optical disc 400, the reproducing system 100 first causes the semiconductor laser oscillator 102f in the optical pickup 102 to generate reproduction light corresponding to a single-layer optical information recording medium.

The reproducing system then moves, upward (in FIG. 11) from the initial position until a drive upper limit position, the position at which the objective lens 102a condenses laser light. The reproducing system 100 thus counts how many times the focus error signal has exceeded the predetermined reference voltage +V0, and consequently recognizes the number of recording layers in the optical disc 400.

The reproducing system 100 next changes a reproduction light power in accordance with the number of recording layers included in the optical disc 400. With use of the reproduction light power as changed above, the reproducing system 100 then moves, downward (in FIG. 11) from the above drive upper limit position until the initial position, the position at which the objective lens 102a condenses laser light. The reproducing system, during the above movement, changes a gain of an amplifier in, for example, the focus control circuit 105 so as to achieve a suitable value for a voltage of a focus error signal detected from a recording layer that is to be initially subjected to a focus searching process.

Next, the reproducing system 100, in an example case of carrying out a focus searching process with respect to the second information recording layer B, (i) counts the number of instances in which the focus error signal has exceeded the predetermined reference voltage +V0, and after counting four such instances, (ii) sets the focus servo in an ON state at a time point at which the focus error signal first achieves 0 level (that is, a central level of a focus servo operation). This ends the focus searching process by the reproducing system 100 with respect to the second information recording layer B.

(b) and (c) of FIG. 13 illustrate (i) transition of a position of the objective lens and (ii) a focus error signal, respectively, for a case in which the reproducing system 100 carries out a focus searching process with respect to the second information recording layer 40 described above. (b) of FIG. 13 is a graph illustrating the transition of the position of the objective lens. (c) of FIG. 13 indicates the focus error signal.

In a case of layer-jumping from, for example, the fourth information recording layer D to the second information recording layer B, the reproducing system 100 (i) temporarily switches the focus servo to an OFF state, and (ii) sequentially moves, from the fourth information recording layer D to the second information recording layer 40, the position at which the objective lens 102a condenses laser light. The reproducing system 100 then (i) counts the number of instances in which the focus error signal outputted from the differential amplifier circuit 104 has exceeded the predetermined reference voltage +V0, and after counting two such instances, (ii) sets the focus servo in the ON state at a time point at which the focus error signal first achieves 0 level (that is, the central level of a focus servo operation). This ends the layer jumping process. The layer jumping process, which is a process substantially identical to the focus searching process, is not illustrated in a drawing.

When the above focus searching processes have been carried out, a phase difference detection circuit 107 detects a phase difference between (i) a sum of respective output signals of the photodetectors 102j1 and 102j4 in the photoelectric transfer device 102j and (ii) a sum of respective output signals of the photodetectors 102j2 and 102j3 in the photoelectric transfer device. The phase difference detection circuit 107 thus supplies a result of the detection to the tracking control circuit 106 in the form of a tracking error signal.

The tracking control circuit 106, on the basis of a supplied tracking error signal, generates a tracking control signal to be supplied to the tracking drive coil 102b, and thus carries out tracking servo with respect to the objective lens 102a. The reproducing system 100 reproduces information from the optical disc 400 in a state in which the above tracking servo is being carried out. The addition circuits 113c and 113d output respective electric signals, which are summed by an addition circuit 113e. The sum is then converted by a data reproduction circuit (data reproduction control means) 110 into a digital signal.

The laser control circuit 103, the focus control circuit 105, the tracking control circuit 106, the motor control circuit 109, and the data reproduction circuit 110 all included in the reproducing system 100 are controlled by a control section 115. The control section 115 is accompanied by a memory (not shown in FIG. 11; corresponding to a below-described memory 116 in FIGS. 15 and 16) which stores information on recording and reproduction of the optical disc 400 loaded in the reproducing system 100. The control section 115 controls the above circuits on the basis of that information.

The focus error signal in the reproducing system 100 has a voltage value which increases with an increase in reflectance of a recording layer.

Figure 14:
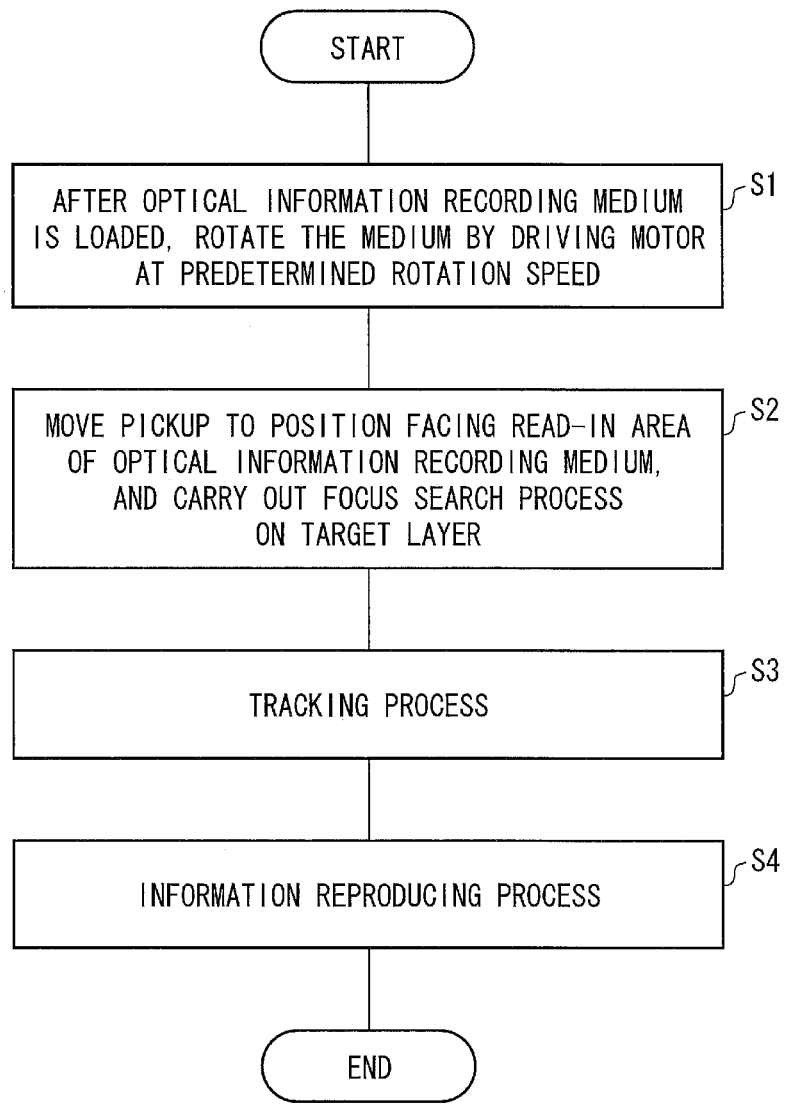
FIG. 14 is a flowchart illustrating a flow of processes carried out in the reproducing system.

The following description deals with a flow of a process carried out by the reproducing system 100, which reproduces a common multilayer optical information recording medium (in the description below, an optical disc 400). FIG. 14 is a flowchart indicative of the flow of the process carried out by the reproducing system 100 that reproduces the multilayer optical information recording medium.

First, after an optical disc 400 is loaded in the reproducing system 100, the disc drive motor 101 rotates the optical disc 400 at a predetermined rotation rate (S1). Next, the control section 115 (i) moves the optical pickup 102 to a position at which the optical pickup faces a lead-in area of the optical disc 400, and (ii) allows a focus searching process to be carried out with respect to a desired layer (S2). This layer refers, in the optical disc 400, to one of the first information recording layer A, the second information recording layer B, the third information recording layer C, and the fourth information recording layer D. The tracking control circuit 106 then carries out a tracking process (S3). The reproducing system 100 thereafter carries out an information reproducing process (S4).

The above description indicates that it is all on the basis of an S-characteristic obtained from a recording layer that the reproducing system 100 recognizes such a recording layer and focuses on an individual recording layer. Since the above reproducing system 100 for reproducing a multilayer optical information recording medium is used in an information recording/reproducing device, such an information recording/reproducing device can determine, by measuring an S-characteristic of each recording layer, whether the information recording/reproducing device (i) recognizes any recording layer and (ii) can reproduce information therefrom.

[5. Information Recording Medium as Embodiment of Present Invention]

The above description deals with basic information about an information recording medium and information recording/reproducing device to each of which the present invention is applied.

Here, with reference to FIG. 1 through 7, the description below now deals with a case of applying the present invention to the optical disc 200 and optical disc 201.

First, the optical disc 200, as illustrated in FIG. 6, includes in a structure thereof: a light transmitting layer 10; a first information recording layer 20; an intermediate layer 30; a second information recording layer 40; and a substrate 50, all stacked on top of one another in that order from the side of the reproduction light incident plane.

Further, as illustrated in FIG. 1, (i) the first information recording layer 20 includes, allotted thereto, a first information recording area 20A and a third information recording area 20B each as a ROM area, and (ii) the second information recording layer 40 includes, allotted thereto, a content recording area 40A and an invalidation information recording area 40B each as an R or RE area.

Since the first information recording layer 20 and the third information recording area 20B are each a ROM area, the first information recording layer 20 (that is, a single ROM layer) as a single recording layer includes, in the description below, an information recording area including two divisional information recording areas.

The optical disc 201, as illustrated in FIG. 7, includes in a structure thereof: a light transmitting layer 10; a first information recording layer 20; an intermediate layer 30; a third information recording layer (recordable layer; recording layer) 60; an intermediate layer 30; a second information recording layer 40; and a substrate 50, all stacked on top of one another in that order from the side of the reproduction light incident plane.

The first information recording area 20A and the third information recording area 20B each refer to a range in the first information recording layer 20 which range extends in a medium surface direction (that is, an in-plane direction of a surface on which reproduction light is incident) and which range is provided with a single film or multilayer film each formed of, for example, a reflective film or recording film so as to serve as a recording layer.

The content recording area 40A and the invalidation information recording area 40B each refer to a range in a recording layer other than the first information recording layer 20 which range extends in the medium surface direction and which range is provided with a single film or multilayer film each formed of, for example, a reflective film or recording film so as to serve as a recording layer.

The second and subsequent information recording layers are so numerically sequenced from a side of the substrate 50. Specifically, (i) the third information recording layer 60 is present between the first information recording layer 20 and the second information recording layer 40, and (ii) a fourth information recording layer (not shown) is present between the first information recording layer 20 and the third information recording layer 60.

The first information recording area 20A, the third information recording area 20B, the content recording area 40A, and the invalidation information recording area 40B may, needless to say, be arranged in a manner different from the above-described manner for the optical disc 200, the optical disc 201 or the like.

However, as described above, (i) the first information recording area 20A and the third information recording area 20B are preferably located in a ROM area, and (ii) the content recording area 40A and the invalidation information recording area 40B are preferably located in an R or RE area.

As such, (i) the first information recording area 20A and the third information recording area 20B are allotted (not shown) to the first information recording layer 20, whereas (ii) the content recording area 40A and the invalidation information recording area 40B are allotted (not shown) to the second information recording layer 40 and/or the third information recording layer 60.

As in the optical disc 200, the optical disc 201 includes the third information recording area 20B at a position which is located further inward along a radius of the optical disc from the first information recording area 20A of the first information recording layer 20.

As described above, in both the optical disc 200 and the optical disc 201, (i) the first information recording area 20A and the third information recording area 20B are preferably allotted to a ROM area, and (ii) the content recording area 40A and the invalidation information recording area 40B are preferably allotted to an R area or RE area.

This is because the content recording area 40A needs to record a TV program P (or a 3D video including right eye video information items R1 through R4 . . . and left eye video preparation complementary information items L1 through L4 . . . which are alternately arranged), and thus needs to be allotted to an R area or RE area.

Further, the invalidation information recording area 40B needs to record invalidation information, and thus needs to be allotted to an R area or RE area.

On the other hand, since the first information recording area 20A and the third information recording area 20B are allotted to a ROM area, it is possible to prevent a misoperation of erroneously overwriting the above 3D conversion complementary information, decompressing process software, recording presetting information, 3D conversion data arrangement information, and 3D conversion authorization key with other data.

A ROM area is, for example, an area on which (i) information is recorded with use of a train of embossed prepits or (ii) information is recorded with use of a laser.

With the above configuration, there is an advantage on a side of a manufacturer of the optical discs 200 and 201 that 3D conversion complementary information, decompressing process software, recording presetting information, 3D conversion data arrangement information and the like can be changed easily during production of the optical discs.

The following describes another embodiment of the optical discs 200 and 201.

First, the optical disc 200 in this form, as illustrated in FIG. 6, also includes in a structure thereof: a light transmitting layer 10; a first information recording layer 20; an intermediate layer 30; a second information recording layer 40; and a substrate 50, all stacked on top of one another in that order from the side of the reproduction light incident plane.

Further, as illustrated in FIG. 4, (i) the first information recording layer 20 includes, allotted thereto, a first information recording area 20A and a third information recording area 20B each as a ROM area, and (ii) the second information recording layer 40 includes, allotted thereto, a 3D conversion complementary information recording space 40C and a 2D video recording space 40D each as an R or RE area.

Since the first information recording area 20A and the third information recording area 20B are each a ROM area, the first information recording layer 20 (that is, a single ROM layer) as a single recording layer includes, in the description below, an information recording area including two divisional information recording areas.

The optical disc 201 in this form, as illustrated in FIG. 7, also includes in a structure thereof: a light transmitting layer 10; a first information recording layer 20; an intermediate layer 30; a third information recording layer (recordable layer; recording layer) 60; an intermediate layer 30; a second information recording layer 40; and a substrate 50, all stacked on top of one another in that order from the side of the reproduction light incident plane.

The first information recording area 20A and the third information recording area 20B each refer to a range in the first information recording layer 20 which range extends in a medium surface direction (that is, an in-plane direction of a surface on which reproduction light is incident) and which range is provided with a single film or multilayer film each formed of, for example, a reflective film or recording film so as to serve as a recording layer.

The 3D conversion complementary information recording space 40C and the 2D video recording space 40D each refer to a range in a recording layer other than the first information recording layer 20 which range extends in the medium surface direction and which range is provided with a single film or multilayer film each formed of, for example, a reflective film or recording film so as to serve as a recording layer.

The second and subsequent information recording layers are so numerically sequenced from a side of the substrate 50. Specifically, (i) the third information recording layer 60 is present between the first information recording layer 20 and the second information recording layer 40, and (ii) a fourth information recording layer (not shown) is present between the first information recording layer 20 and the third information recording layer 60.

The first information recording area 20A, the third information recording area 20B, the 3D conversion complementary information recording space 40C, and the 2D video recording space 40D may, needless to say, be arranged in a manner different from the above-described manner for the optical disc 200, the optical disc 201 or the like.

However, as described above, (i) the first information recording area 20A and the third information recording area 20B are preferably located in a ROM area, and (ii) the 3D conversion complementary information recording space 40C and the 2D video recording space 40D are preferably located in an R or RE area.

As such, (i) the first information recording area 20A and the third information recording area 20B are allotted (not shown) to the first information recording layer 20, whereas (ii) the 3D conversion complementary information recording space 40C and the 2D video recording space 40D are allotted (not shown) to the second information recording layer 40 and/or the third information recording layer 60.

As in the optical disc 200, the optical disc 201 includes the third information recording area 20B at a position which is located (i) further outward along the radius of the optical disc from the lead-in area and (ii) further inward along the radius of the optical disc from the first information recording area 20A of the first information recording layer 20.

As described above, in both the optical disc 200 and the optical disc 201, (i) the first information recording area 20A and the third information recording area 20B are preferably allotted to a ROM area, and (ii) the 3D conversion complementary information recording space 40C and the 2D video recording space 40D are preferably allotted to an R area or RE area.

This is because the 3D conversion complementary information recording space 40C and/or the 2D video recording space 40D, as illustrated in FIG. 5, needs to record 3D conversion complementary information, that is, left eye video information items L1' through L4'... (or a 3D video including right eye video preparation complementary information items R1' through R4'... and left eye video information items L1' through L4'... which are alternately arranged), and thus needs to be allotted to an R area or RE area.

On the other hand, since the first information recording area 20A and the third information recording area 20B are allotted to a ROM area, it is possible to prevent a misoperation of erroneously overwriting the above 2D video content P', download information, decompressing process software, 3D conversion data arrangement information, and 3D conversion authorization key with other data.

With the above configuration, there is an advantage on a side of a manufacturer of the optical discs 200 and 201 that a 2D video content P', download information, decompressing process software, 3D conversion data arrangement information, a 3D conversion authorization key and the like can be changed easily during production of the optical discs.

[6. Information Recording/Reproducing Device in Accordance with One Embodiment of Present Invention (part I)]

Figure 15:
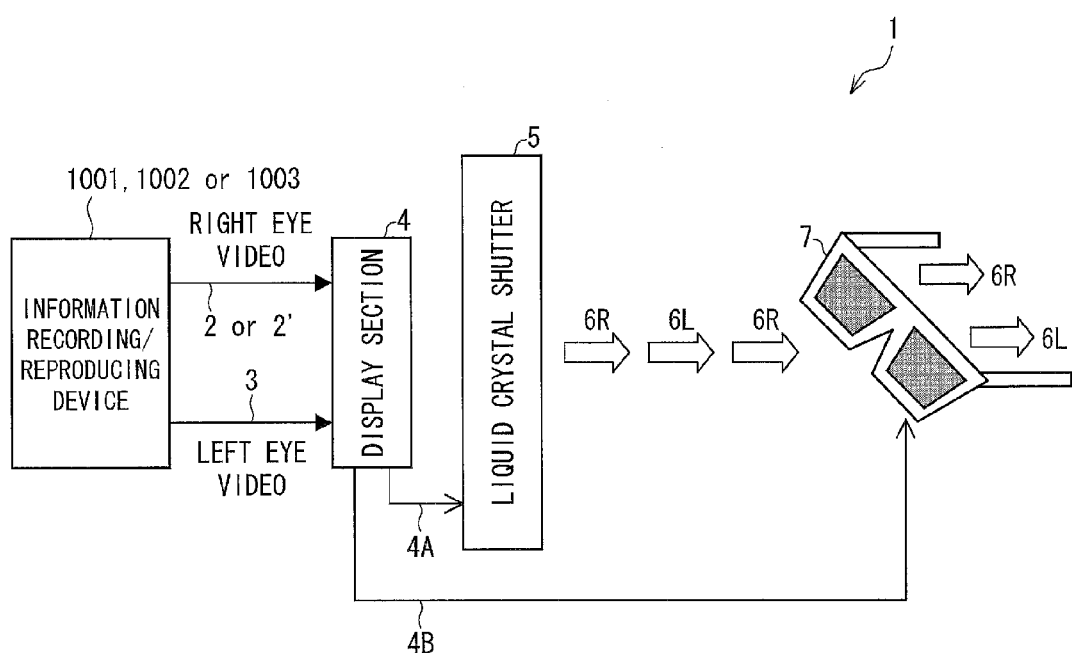
FIG. 15 is a schematic view illustrating an information recording/reproducing device in accordance with an embodiment of the present invention.
Figure 16:
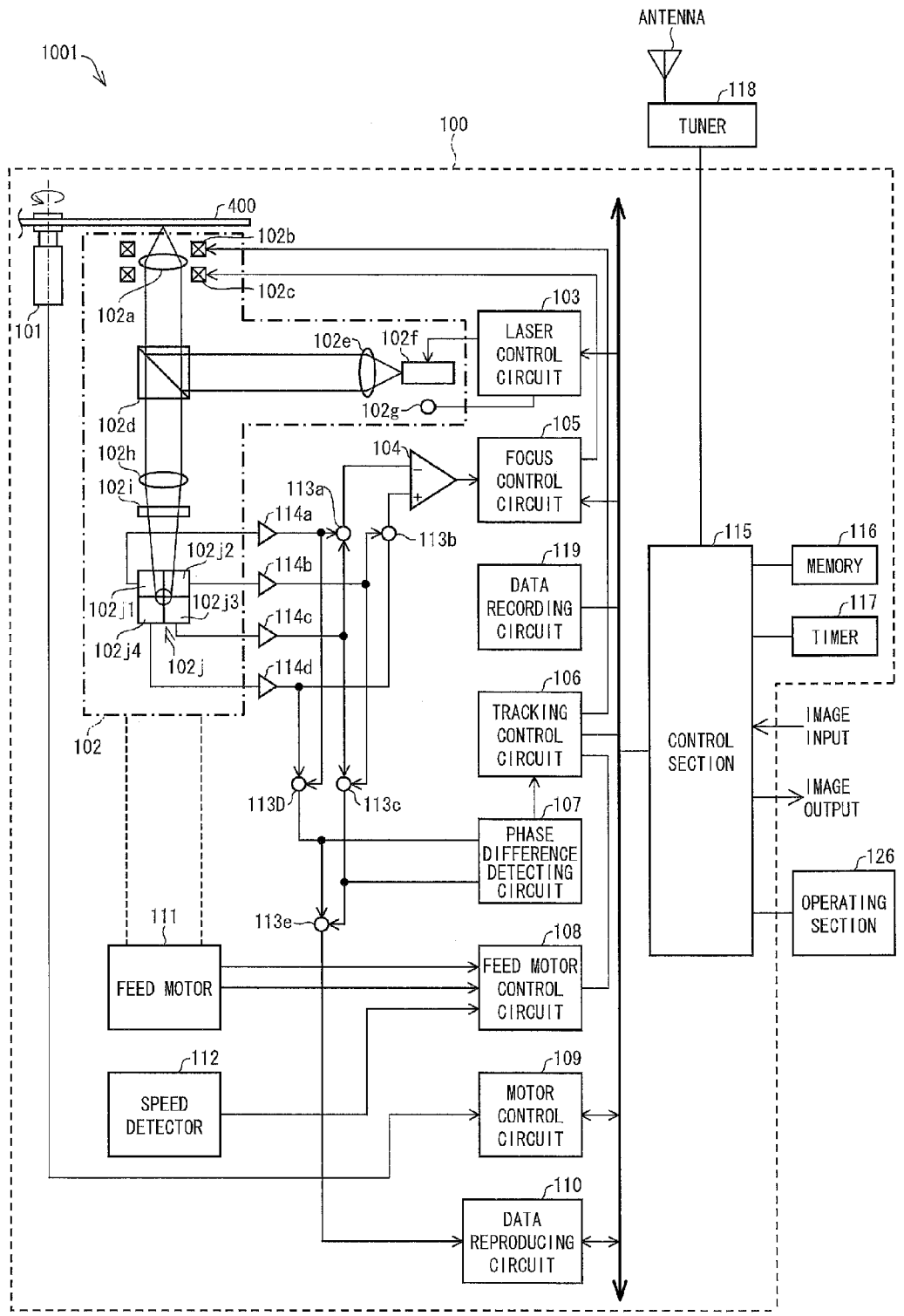
FIG. 16 is a block diagram illustrating a configuration example of main parts of the information recording/reproducing device.
Figure 17:
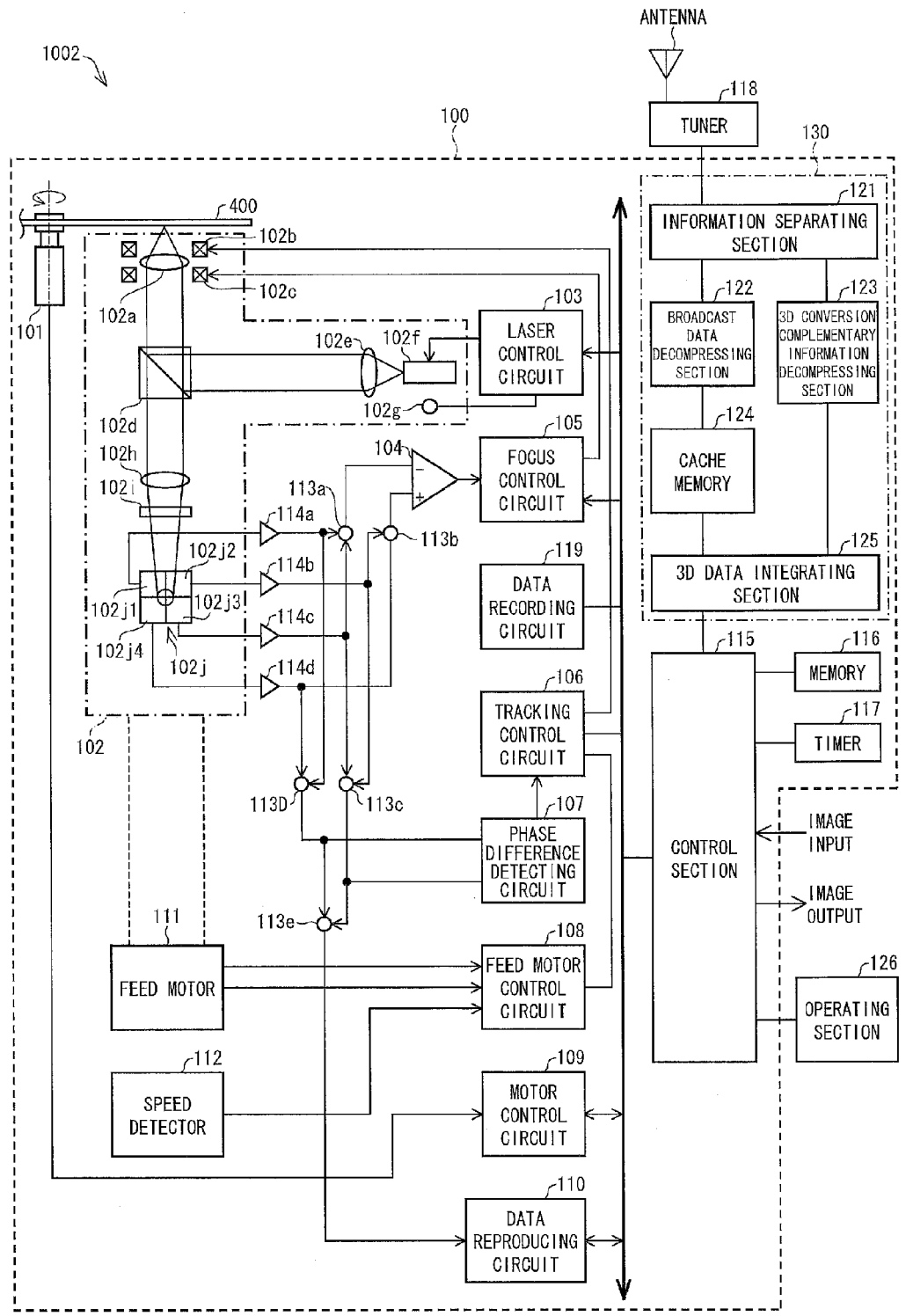
FIG. 17 is a block diagram illustrating another configuration example of main parts of the information recording/reproducing device.

Next, the following description deals with an arrangement of a 3D video viewing system 1 with reference to FIGS. 15 through 17. The 3D video viewing system 1 corresponds to an information recording/reproducing device in accordance with one embodiment of the present invention.

An information recording/reproducing device 1001 and an information recording/reproducing device 1002, both of which will be described later, have the same arrangement as that of a reproducing system 100 described above, and details of such a basic arrangement are omitted here, appropriately.

The 3D video viewing system 1 includes the information recording/reproducing device 1001 (or the information recording/reproducing device 1002), a display section 4, a cable 4A (or a cable 4B), a liquid crystal shutter 5, and polarized glasses 7 (see FIG. 15).

The information recording/reproducing device 1001 (or the information recording/reproducing device 1002) (i) outputs, as a right eye video, a TV program video (broadcast content, two-dimensional video) 2 of a plurality of frames, which is obtained from a TV program P, and (ii) outputs, as a left eye video, a +α moving image (complementary information) 3 of a plurality of frames, which is obtained from 3D conversion complementary information described above. The +α moving image is used to convert the TV program video 2 into a 3D video.

The TV program video 2 and the +α moving image, outputted from the information recording/reproducing device 1001 (or the information recording/reproducing device 1002), are both supplied to the display section 4, and the display section 4 reproduces a 3D video on the basis of the TV program video 2 and the +α moving image 3. The display section 4 is constituted by a TV, a projector, or the like.

The liquid crystal shutter 5 is constituted by liquid crystal or the like, and can carry out switching between two sorts of transparent polarized light.

The polarized glasses 7 include two liquid crystal shutters (or two different polarizers), which are provided for a right eye and a left eye, respectively, so that a right eye video (broadcast content, two-dimensional video) 6R and a left eye video (complementary information) 6L can be viewed. The right eye video 6R is obtained from the TV program video 2. The left eye video 6L is obtained from the +α moving image 3. The right eye video 6R and the left eye video 6L, obtained via the liquid crystal shutter 5, are arranged in a predetermined order of the plurality of frames.

The 3D video viewing system 1 illustrated in FIG. 15 projects video information of the left eye video 6L and video information of the right eye video 6R to the left and to the right, respectively, so as to allow, by taking advantage of a parallax difference of human eyes, a human to sense visually the video information as a 3D video.

Next, the following description deals with an outline of an operation of the 3D video viewing system 1.

First, the information recording/reproducing device 1001 (or the information recording/reproducing device 1002) caches (temporarily stores) the TV program video 2 serving as the right eye video and the +α moving image 3 serving as the left eye video, and supplies the TV program video 2 and the +α moving image 3 to the display section 4.

Here, in a case where an information interface between the information recording/reproducing device 1001 (or the information recording/reproducing device 1002) and the display section 4 is of an analogue type, information transmission should be carried out for the left eye video and the right eye video, independently. Meanwhile, in a case of a digital interface such as an HDMI (high-definition multimedia interface), it is possible to carry out serial transmission so that the left eye video and the right eye video are transmitted serially and alternately.

Further, it is possible that (i) the information recording/ reproducing device 1001 (or the information recording/reproducing device 1002) compresses such data, and supplies the data thus compressed to a TV, and (ii) the TV unpacks (decompresses) the data thus received.

Furthermore, in a case of a normal TV, the right eye video 6R and the left eye video 6L are displayed alternately every field. Meanwhile, in a case where a TV employing a double scanning display is used as the display section 4, it is possible to eliminate a problem (such as generation of a flicker) in distributing the right eye video 6R and the left eye video 6L to the right and the left every field. In this case, it is possible to reproduce a 3D video smoothly.

The liquid crystal shutter 5 which is constituted by liquid crystal or the like and can carry out switching between two sorts of transparent polarized light (see FIG. 15). By controlling the liquid crystal shutter 5, it is possible to change, every field, a polarization angle of light. For example, it is possible to cause (i) the right eye video 6R to be vertically polarized and (ii) the left eye video 6L to be horizontally polarized.

In this case, the polarized glasses 7 can be such that different polarizers (a vertical polarizer and a horizontal polarizer) are merely attached to a right glass and a left glass, respectively. That is, it is unnecessary to provide the cable 4B, via which a field synchronization signal is supplied from the display section 4 to the polarized glasses 7. The synchronization signal corresponds to timing at which the display section 4 controls the liquid crystal shutter 5 via the cable 4A.

On the other hand, in a case where the liquid crystal shutter 5 is not used, it is necessary to attach the liquid crystal shutters to the polarized glasses 7. In this case, the cable 4B for supplying the field synchronization signal is necessary.

The arrangement in which the liquid crystal shutters are attached to the polarized glasses 7 does not use polarized light. For this reason, this arrangement can reduces an influence on a 3D video due to a change in an angle of the polarized glasses 7 (in a case where, for example, a user's head is inclined).

Next, the following description deals with an outline of a main function of the 3D video viewing system 1 with reference to (a) and (b) of FIG. 2, and FIGS. 16 and 17.

A main reproducing function (reproducing process) of the 3D video viewing system 1 is as described below.

Here, the TV program P has been already recorded on a content recording area 40A of an optical disc 200 or an optical disc 201.

First, in a case where the TV program P is recorded on the content recording area 40A, the information recording/reproducing device 1001 reads out (i) complementary information L1 through L4 . . . for preparing a left eye video, related to the TV program P, from a first information recording area 20A, and (ii) 3D conversion data arrangement information from a third information recording area 20B. Then, the information recording/reproducing device 1001 stores the complementary information L1 through L4 . . . for preparing the left eye video and the 3D conversion data arrangement information in a memory (temporary recording section) 116 (temporary recording step) (see FIG. 16).

After that, the information recording/reproducing device 1001 reads out, from the memory 116, (i) right eye video information R1 through R4 . . . recorded on the content recording area 40A and (ii) the complementary information L1 through L4 . . . for preparing the left eye video and the 3D conversion data arrangement information. Then, the information recording/reproducing device 1001 arranges and synchronizes, in accordance with the 3D conversion data arrangement information, the right eye video information R1 through R4 . . . and the complementary information L1 through L4 . . . for preparing the left eye video, so that the right eye video information R1 through R4 . . . and the complementary information L1 through L4 . . . for preparing the left eye video are reproducible as a 3D video. The information recording/reproducing device 1001 thus reproduces the 3D video (reproducing step).

In the above example, the 3D video is reproduced and displayed. Note, however, that the display section 4 of the 3D video viewing system 1 has such a function that, in a case where a set of the TV program video 2 and the +α moving image 3 for 1 frame is inputted sequentially, the display section 4 can display a 3D video for the 1 frame.

Accordingly, it is possible to view a 3D video by reading out, from the optical disc 200 or the optical disc 201, the complementary information L1 through L4 . . . for preparing the left eye video and the right eye video information R1 through R4 . . . .

Next, the following description deals with a main recording function (recording method) of the 3D video viewing system 1.

Here, the following explanation is made on a premise that (i) decompression process software for unpacking (decompressing) the compressed complementary information L1 through L4 . . . for preparing the left eye video described above has been recorded on the third information recording area 20B of the optical disc 200 or the optical disc 201, and (ii) the 3D video viewing system 1 receives the TV program P which is externally supplied, converts the TV program P into a 3D video, and records the 3D video (recording method).

The information recording/reproducing device 1002, first separates, out of the TV program P which is externally supplied, (i) the right eye video information R1 through R4 . . . and (ii) the compressed complementary information L1 through L4 . . . for preparing the left eye video (information separation step) (see FIG. 17).

The right eye video information R1 through R4 . . . may be either compressed or not compressed. According to the present embodiment, the complementary information L1 through L4 . . . for preparing the left eye video is compressed.

Next, the right eye video information R1 through R4 . . . thus separated is stored in a cache memory 124 (in a case where the right eye video information R1 through R4 . . . is compressed, the right eye video information R1 through R4 . . . is stored after being decompressed by a broadcast decompressing section 122), so as to adjust a difference in decompressing time period between the right eye video information R1 through R4 . . . and the complementary information L1 through L4 . . . for preparing the left eye video (temporary storing step).

Simultaneously, the compressed complementary information L1 through L4 . . . for preparing the left eye video thus separated is decompressed by use of the decompressing process software which has been recorded on the third information recording area 20B in advance and also stored in a 3D conversion complementary information decompressing section 123 (an internal memory of the 3D conversion complementary information decompressing section 123 (not illustrated), or the memory 116) in advance (decompressing step).

Then, a 3D data integrating section 125 (i) reproduces, in accordance with the 3D conversion data arrangement information, the right eye video information R1 through R4 . . . from the cache memory 124 in synchronization with the complementary information L1 through L4 . . . for preparing the left eye video, and (ii) arranges and integrates the right eye video information R1 through R4 . . . and the complementary information L1 through L4 . . . for preparing the left eye video so that the right eye video information R1 through R4 . . . and the complementary information L1 through L4 . . . for preparing the left eye video are reproducible as a 3D video (integrating step). After that, the 3D data integrating section 125 records, on the content recording area 40A, the right eye video information R1 through R4 and the complementary information L1 through L4 . . . for preparing the left eye video thus integrated (recording step).

With the arrangement, it is possible to (i) arrange (a) the right eye video information R1 through R4 . . . , separated from the TV program P which is externally supplied and (b) the complementary information L1 through L4 . . . for preparing the left eye video, which is obtained in such a manner that the compressed complementary information L1 through L4 . . . is separated from the TV program P which is externally supplied, and then is decompressed by use of the decompressing process program recorded on the third information recording area 20B in advance, so that the right eye video information R1 through R4 . . . and the complementary information L1 through L4 . . . for preparing the left eye video are reproducible as a 3D video, and (ii) record, on the content recording area 40A, the right eye video information R1 through R4 . . . and the complementary information L1 through L4 . . . for preparing the left eye video thus arranged.

Next, the following description deals with another recording function of the 3D video viewing system 1.

First, the information recording/reproducing device 1001 stores, in the memory 116, (i) the TV program P received from a tuner 118 and (ii) the 3D conversion data arrangement information read out from the third information recording area 20B (see FIG. 16).

Then, the information recording/reproducing device 1001 reads out the 3D conversion data arrangement information from the memory 116. After that, in order to make it easy to reproduce a 3D video, the information recording/reproducing device 1001 records, in accordance with the 3D conversion data arrangement information, the right eye video information R1 through R4 . . . constituting the TV program P on the content recording area 40A in such a manner that recording spaces E1 through E4 . . . are inserted in respective positions between adjacent pieces R1 through R4 . . . of the right eye video information (see (a) of FIG. 2).

Next, the information recording/reproducing device 1001 reads out the complementary information L1 through L4 . . . for preparing the left eye video, recorded on the first information recording area 20A, and stores the complementary information L1 through L4 . . . for preparing the left eye video in the memory 116.

Then, the information recording/reproducing device 1001 reads out, from the memory 116, the complementary information L1 through L4 . . . for preparing the left eye video and the 3D conversion data arrangement information. After that, the information recording/reproducing device 1001 inserts the complementary information L1 through L4 . . . for preparing the left eye video into corresponding recording spaces E1 through E4 . . . in accordance with the 3D conversion data arrangement information (see (b) of FIG. 2), and records data thus obtained on the content recording area 40A.

Each of the functions described above can be realized by use of a reproducing process program or a recording process program, which are used to cause a control section 115 (computer) to execute each of the functions described above. These programs can be stored, for example, in the memory 116 or an externally-attached hard disk (provided inside the information recording/reproducing device 1001).

With the arrangement, it is possible to cause the control section 115 to realize each of the functions described above by (i) reading out the reproducing process program or the recording process program, stored in the information recording/reproducing device 1001, and (ii) causing the control section 115 to read the program thus read out.

Further, the complementary information for preparing the left eye video, recorded on the first information recording area 20A, is not necessarily actual video data, and may be difference information with respect to the TV program P (right eye video information).

Next, in a case where presetting information is recorded on the third information recording area 20B of the optical disc 200 or the optical disc 201, the 3D video viewing system 1 can record, in accordance with the presetting information, the right eye video information R1 through R4 . . . on the content recording area 40A.

With the arrangement, if it is inconvenient for a user to preset the recording of the TV program P in advance, the user can cause the TV program P to be automatically recorded on the optical disc 200 or the optical disc 201 by only putting the optical disc 200 or the optical disc 201 in the information recording/reproducing device 1001 or the information recording/reproducing device 1002 before the TV program P is broadcasted.

Further, in a case where invalidation information is recorded on an invalidation information recording area 40B of the optical disc 200 or the optical disc 201, the 3D video viewing system 1 can (i) determine that the presetting information corresponding to the invalidation information is nullified, and (ii) cancel the recording of the TV program P corresponding to the presetting information on the content recording area 40A.

With the arrangement, in a case where the TV program P which is planned to be recorded by use of the presetting information has content which is not in accordance with user's expectation, it is possible to prevent such a TV program P from being recorded on the optical disc 200 or the optical disc 201 by recording the invalidation information on the optical disc 200 or the optical disc 201. That is, it is possible to enhance convenience of the user of the 3D video viewing system 1.

Further, the 3D video viewing system 1 can be arranged such that, only in a case where it is confirmed that a 3D conversion permission key is recorded on the third information recording area 20B of the optical disc 200 or the optical disc 201, (i) the TV program P for which 3D conversion is permitted by the 3D conversion permission key and the 3D conversion complementary information related to the TV program P are arranged so as to be reproducible as a 3D video, and (ii) the TV program P and the 3D conversion complementary information thus arranged are recorded on the content recording area 40A.

Alternatively, the 3D video viewing system 1 can be arranged such that (i) the right eye video information R1 through R4 . . . and the compressed complementary information L1 through L4 . . . for preparing the left eye video are separated from the TV program P which is externally supplied, and (ii) the right eye video information R1 through R4 . . . thus separated and the complementary information L1 through L4 . . . for preparing the left eye video which is obtained by decompressing the compressed complementary information L1 through L4 . . . for preparing the left eye video thus separated, are arranged so as to be reproducible as a 3D video, and (iii) the right eye video information R1 through R4 . . . and the complementary information L1 through L4 . . . for preparing the left eye video are recorded on the content recording area 40A.

With the arrangement, whether or not the 3D conversion of the TV program P is permitted is determined by use of the 3D conversion permission key which has been recorded on the optical disc 200 or the optical disc 201 in advance. Accordingly, it is possible to disallow the 3D conversion of the TV program P corresponding to an information recording medium in which a valid 3D conversion permission key is not recorded.

In other words, the 3D conversion permission key which has been recorded on the optical disc 200 corresponds to information indicating that the 3D conversion of the TV program P which is externally supplied is permitted, that is, information which assures the user of the 3D conversion of the TV program P.

Accordingly, in a case where the 3D conversion permission key has been recorded on the third information recording area 20B of the optical disc 200, it is possible for the user to carry out the 3D conversion of the TV program P at ease without worrying about a copyright of the TV program P or rights neighboring on the copyright of the TV program P.

Moreover, the 3D conversion complementary information recorded on the first information recording area 20A of the optical disc 200, in which the 3D conversion permission key has been recorded on the third information recording area 20B, assures that the TV program P is created by a rightful broadcast station or the like. It is therefore possible to carry out the 3D conversion of the TV program P in a way to satisfy user's preference as long as permitted by a service provided by the broadcast station, distribution site, or the like.

Next, the following description deals with arrangements of and detailed operations of the information recording/reproducing device 1001 and the information recording/reproducing device 1002 with reference to FIGS. 15 through 19. Each of the information recording/reproducing device 1001 and the information recording/reproducing device 1002 serves as a main part of the 3D video viewing system 1.

First, the information recording/reproducing device 1001 includes a memory 116, a timer 117, a tuner 118, a data recording circuit 119, and an operation section 126, in addition to an arrangement of a reproducing system 100 (see FIG. 16).

Meanwhile, the information recording/reproducing device 1002 includes a 3D conversion unit (3 dimensional unit) 130 in addition to the arrangement of the information recording/reproducing device 1001 (see FIG. 17). The 3D conversion unit 130 includes an information separating section (information separating means) 121, a broadcast data decompressing section 122, a 3D conversion complementary information decompressing section (decompressing means) 123, a cache memory 124, and a 3D data integrating section 125.

Figure 18:
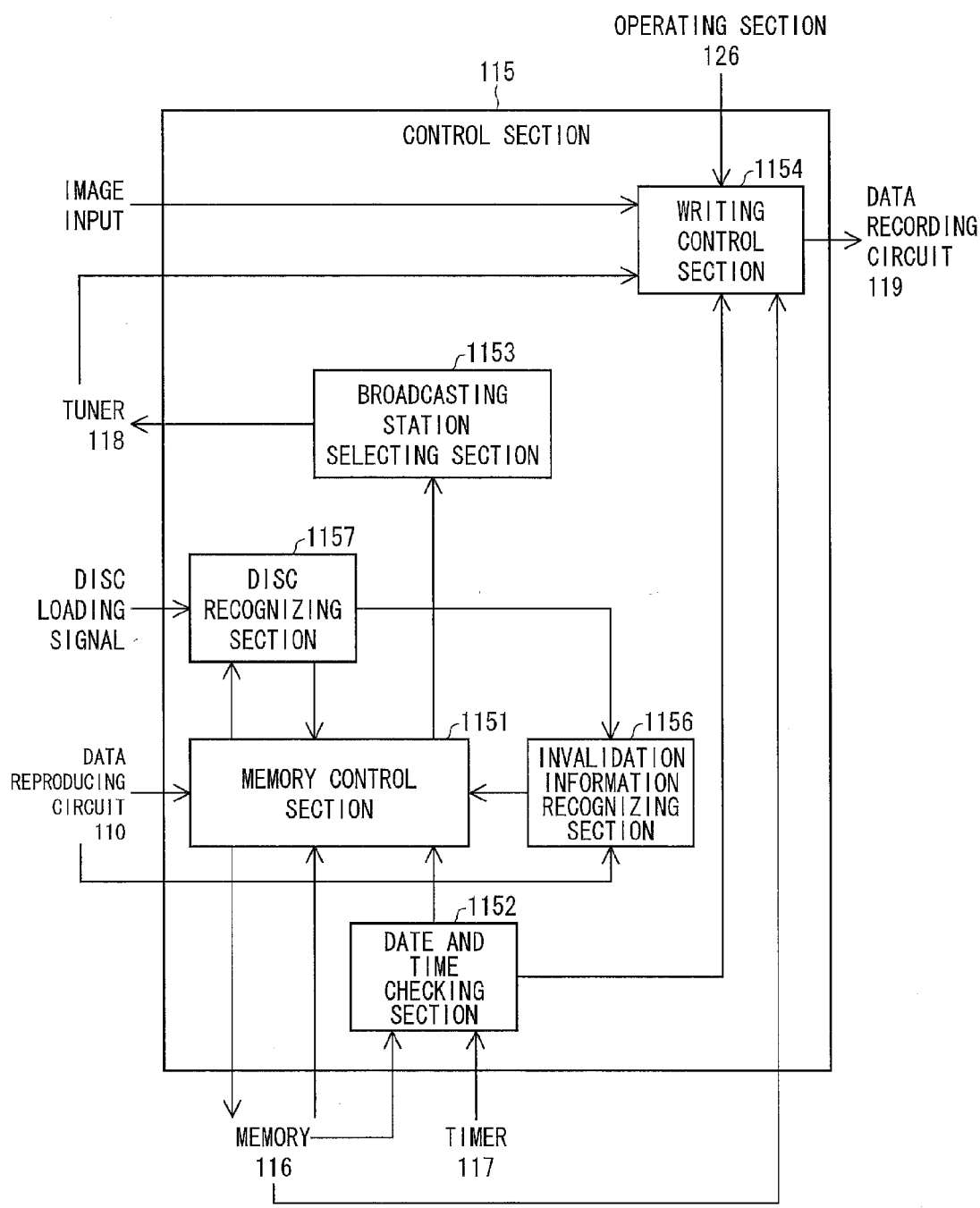
FIG. 18 is a block diagram illustrating a configuration example of a control section, which is encompassed in the main parts of the information recording/reproducing device.

Further, the control section 115 of the information recording/reproducing device 1001 (or the information recording/reproducing device 1002) includes a memory control section (memory control means, reproduction control section) 1151, a date-and-time checking section 1152, a broadcast station selecting section 1153, a writing control section (recording control means) 1154, an invalidation information recognizing section 1156, and a disc recognizing section 1157 (see FIG. 18).

For the sake of simple explanation, the following description is made on a premise that the optical disc 200 is loaded to the information recording/reproducing device 1001 or the information recording/reproducing device 1002. Further, other components of the reproducing system 100 are the same as the components described above, and therefore their explanations are omitted here.

First, the information separating section 121 illustrated in FIG. 17 separates, from the TV program P received from the tuner 118, (i) the (compressed) right eye video information R1 through R4 . . . and (ii) the compressed complementary information L1 through L4 . . . for preparing the left eye video. The TV program P further includes the 3D conversion permission key described above. The information separation section 121 can separate the 3D conversion permission key from the TV program P, and temporarily store the 3D conversion permission key in an authentication condition recording section 1159.

Next, in a case where the right eye video information R1 through R4 . . . , separated by the information separating section 121, has been compressed, the broadcast data decompressing section 122 decompresses the right eye video information R1 through R4 . . . , and causes the cache memory 124 to store temporarily the right eye video information R1 through R4 . . . thus decompressed.

Then, the 3D conversion complementary decompressing section 123 decompresses the complementary information L1 through L4 . . . for preparing the left eye video.

After that, the 3D data integrating section 125 arranges and integrates the right eye video information R1 through R4 . . . , stored in the cache memory 124 and the complementary information L1 through L4 . . . for preparing the left eye video, received from the 3D conversion complementary information decompressing section 123, so that the right eye video information R1 through R4 . . . and the complementary information L1 through L4 . . . for preparing the left eye video are reproducible as a 3D video. Then, the 3D data integrating section 125 transmits, to the control section 115, the right eye video information R1 through R4 . . . and the complementary information L1 through L4 . . . for preparing the left eye video.

The 3D conversion unit 130 includes the cache memory 124 as described above. In a case where the right eye video information R1 through R4 . . . , separated by the information separating section 121, has been decompressed, the 3D conversion unit 130 decompresses the right eye video information R1 through R4, and causes the cache memory 124 to store temporarily the right eye video information R1 through R4 . . . .

With the arrangement, the 3D data integrating section 125 adjusts a time at which the right eye video information R1 through R4 . . . stored in the cache memory 124 is read out, so as to adjust a time difference between (i) a time when the information separating section 121 outputs the right eye video information R1 through R4 . . . and the (compressed) complementary information L1 through L4 . . . for preparing the left eye video and (ii) a time when the 3D conversion complementary information decompressing section 123 completes decompressing the compressed complementary information L1 through L4 . . . for preparing the left eye video.

In the case of the information recording/reproducing device 1001 which does not includes the 3D data integrating section 125, the right eye video information R1 through R4 . . . is transmitted to the control section 115 via the tuner 118.

Next, the memory control section 1151 illustrated in FIG. 18 controls the memory 116 to store (i) the presetting information related to the TV program P reproduced from the third information recording area 20B of the optical disc 200 and (ii) correspondence relationship information (e.g., a correspondence relationship table (not illustrated)) indicating a correspondence relationship between the presetting information and a medium identification number (an identification number of a disc) (which will be described later) obtained by the disc recognizing section 1157.

Further, the memory control section 1151 controls communication between the memory 116 and other components. For example, the memory control section 1151 reads out the presetting information and the correspondence relationship information thus stored. Further, for example, on receipt of a notification (an invalidation information recognition notification) indicating that the invalidation information is recognized, the memory information deletes the presetting information stored in the memory 116.

Furthermore, the memory control section 1151 reads out (i) the right eye video information R1 through R4 . . . , stored in the memory 116, (ii) the 3D conversion data arrangement information, stored in the memory 116, and (iii) the complementary information L1 through L4 . . . for preparing the left eye video, transmitted from the 3D conversion complementary information decompressing section 123 so as to generate a 3D video. Then, the memory control section 1151 outputs the 3D video to the display section 4.

Next, the date-and-time checking section 1152, which operates with the timer 117, determines whether or not a preset date and time (preset date-and-time information) of the presetting information stored in the memory 116 is identical with information (current date-and-time information) indicating a current date and time extracted from an output signal received from the timer 117. In a case where the preset date and time is identical with the information indicating the current date and time, the date-and-time checking section 1152 notifies, for example, the memory control section 1151 that the preset date and time is identical with the information indicating the current date and time.

On receipt of the notification that the preset date-and-time information and the current date-and-time information are identical with each other, the memory control section 1151 also causes the memory 116 to store temporarily the TV program P (the right eye video information R1 through R4 . . . and/or the complementary information L1 through L4 . . . for preparing the left eye video) received via the tuner 118 or the 3D data integrating section 125.

Next, when the date-and-time checking section 1152 determines that the preset date and time and the current date and time are identical with each other (or several minutes before such determination), the broadcast station selecting section 1153 causes the tuner 118 to operate and adjust a reception frequency and the like on the basis of broadcast station location information (e.g., a reception frequency) of the presetting information stored in the memory 116, which broadcast station location information indicates a location of the broadcast station which will broadcast the TV program P for which the recording is preset. With the arrangement, the TV program P can be received from the broadcast station.

Next, the writing control section 1154 reads out the right eye video information R1 through R4 . . . , the complementary information L1 through L4 . . . for preparing the left eye video, and the 3D conversion data arrangement information, each of which is temporarily stored in the memory 116. Further, the writing control section 1154 arranges the right eye video information R1 through R4 . . . and the complementary information L1 through L4 . . . for preparing the left eye video in accordance with the 3D conversion data arrangement information, as illustrated in (b) of FIG. 2, and transmits the right eye video information R1 through R4 . . . and the complementary information L1 through L4 . . . for preparing the left eye video thus arranged to the control section 115 or the data recording circuit 119.

Moreover, in a case where an instruction to cancel the recording is inputted via the operation section 126, the writing control section 1154 drives the data recording circuit 119 or the like to record the invalidation information on the invalidation information recording area 40B of the optical disc 200, so as to control writing of data on the optical disc 200, for example. Further, the operation of the writing control section 1154 is not limited to the operation described above. In a case where other input information is externally supplied (e.g., information received from a camcorder), the writing control section transmits the input information to the data recording circuit 119.

The invalidation information recognizing section 1156 controls, as to the "invalidation information", communication or the like between the invalidation information recognizing section 1156 and other components. For example, in a case where the invalidation information recognizing section 1156 does not recognize the invalidation information, the invalidation information recognizing section 1156 drives the memory control section 1151 (or transmits, to the memory control section 1151, a notification indicating that the invalidation information is not recognized) to carry out various processes such as reception of the TV program P from the broadcast station. In a case where the invalidation information recognizing section 1156 recognizes the invalidation information, the invalidation information recognizing section 1156 transmits, to the memory control section 1151, the notification (the invalidation information recognition notification) indicating that the invalidation information is recognized, for example.

The disc recognizing section 1157 recognizes (detects) whether or not the optical disc 200 is loaded to the information recording/reproducing device 1001 or the information recording/reproducing device 1002. In a case where the disc recognizing section 1157 detects the loading of the optical disc 200, the disc recognizing section 1157 drives the memory control section 1151 to (i) obtain the medium identification number from the optical disc 200 or (ii) transmit the medium identification number to the invalidation information recognizing section 1156.

Further, in a case where the invalidation information is recorded on the optical disc 200, the disc recognizing section 1157 transmits the invalidation information to the invalidation information recognizing section 1156, for example. In a case where no invalidation information is recorded on the optical disc 200, the disc recognizing section 1157 directly drives the memory control section 1151 so as to control various processes related to loading/unloading of the optical disc 200.

Figure 19:
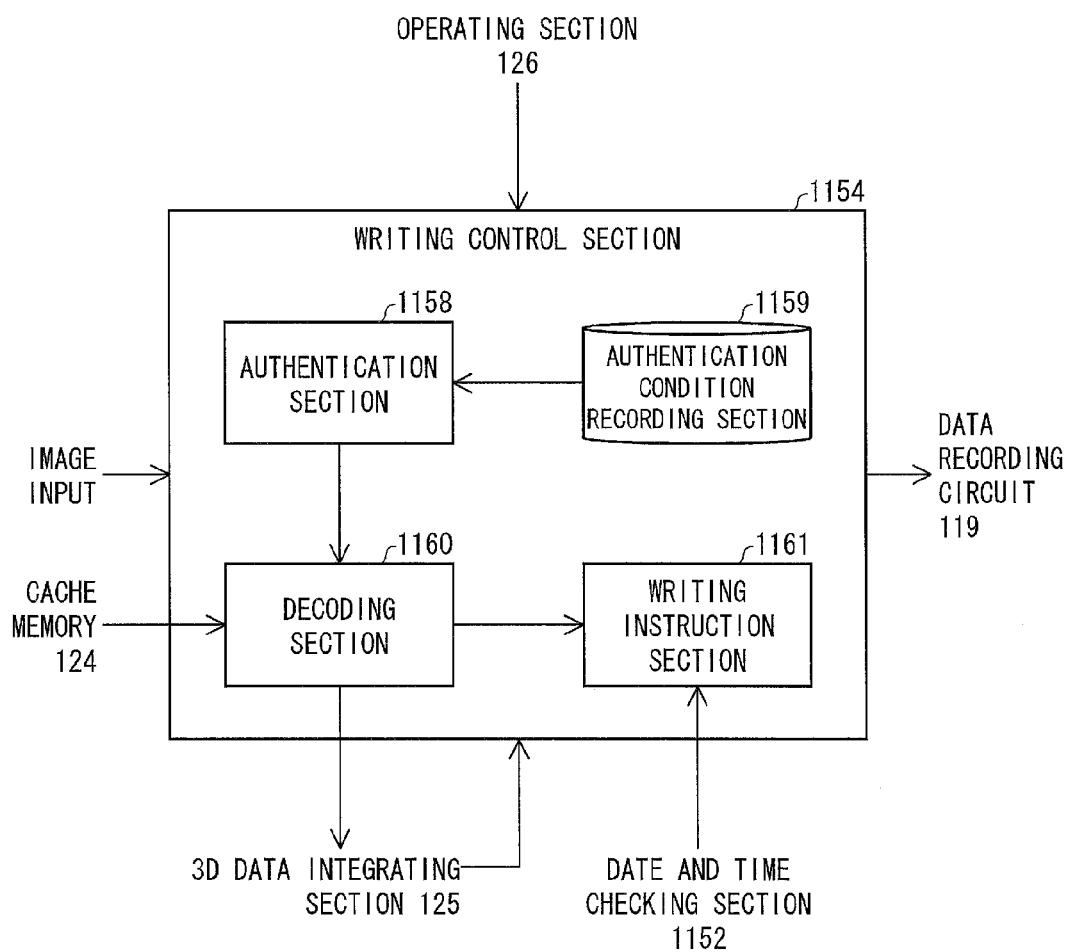
FIG. 19 is a block diagram illustrating a configuration example of a writing control section in the control section.

Next, the following description deals with a case where the writing control section 1154 has an authentication function, with reference to FIG. 19.

In this case, the writing control section 1154 includes an authentication section 1158, an authentication condition recording section 1159, a decoding section 1160, and a writing instruction section 1161.

Further, the TV program P described above includes, as attached information, (i) the 3D conversion permission key, and (ii) the compressed complementary information L1 through L4 . . . for preparing the left eye video. Furthermore, the compressed complementary information L1 through L4 . . . for preparing the left eye video has been also subjected to an encoding process.

The authentication section 1158 reads out the 3D conversion permission key which has been separated from the TV program P by the information separating section 121 and then temporarily stored in the authentication condition recording section 1159 by the information separating section 121. Then, the authentication section 1158 checks whether or not the 3D conversion permission key thus read out is identical with a 3D conversion permission key recorded on the third information recording area 20B of the optical disc 200, so as to carry out authentication of whether or not the optical disc 200 is an information recording medium for which the 3D conversion of the TV program P is permitted.

According to the present embodiment, a "valid 3D conversion permission key", obtained from a data broadcast corresponding to the TV program P, is stored in the authentication condition recording section 1159. Note, however, that the "valid 3D conversion permission key" is not limited to this, and may be obtained from (i) data of program information corresponding to the TV program P in an electronic program guide (EPG), or (ii) bar code information corresponding to the TV program P, which bar code information is posted on, for example, a magazine on which TV programs are picked up.

Further, it is also possible to have such an arrangement that (i) a user can know the valid 3D conversion permission key when the user buys the optical disc 200 or the optical disc 201, and (ii) in a case where the user inputs the valid 3D conversion permission key via the operation section 126, the 3D conversion of the TV program P is permitted.

Next, in a case where the authentication section 1158 authenticates the optical disc 200 as being the information recording medium for which the 3D conversion of the TV program P is permitted, the decoding section 1160 decodes the encoded complementary information L1 through L4 . . . for preparing the left eye video, which is transmitted from the 3D conversion complementary information decompressing section 123 or is stored in the memory 116. Then, the decoding section 1160 causes the memory 116 to store again the complementary information L1 through L4 . . . for preparing the left eye video thus decoded.

The writing instruction section 1161 instructs the data recording circuit 119 or the like to read out (i) the complementary information L1 through L4 . . . for preparing the left eye video, which has been read out from the memory 116 and then subjected to the decoding carried out by the decoding section 1160, (ii) the right eye video information R1 through R4 . . . , and (iii) the 3D conversion data arrangement information. Then, the writing instruction section 1161 arranges, in accordance with the 3D conversion data arrangement information, the TV program P as illustrated in (b) of FIG. 2, so that the TV program P thus arranged is recorded on the content recording area 40A of the optical disc 200.

Figure 20:
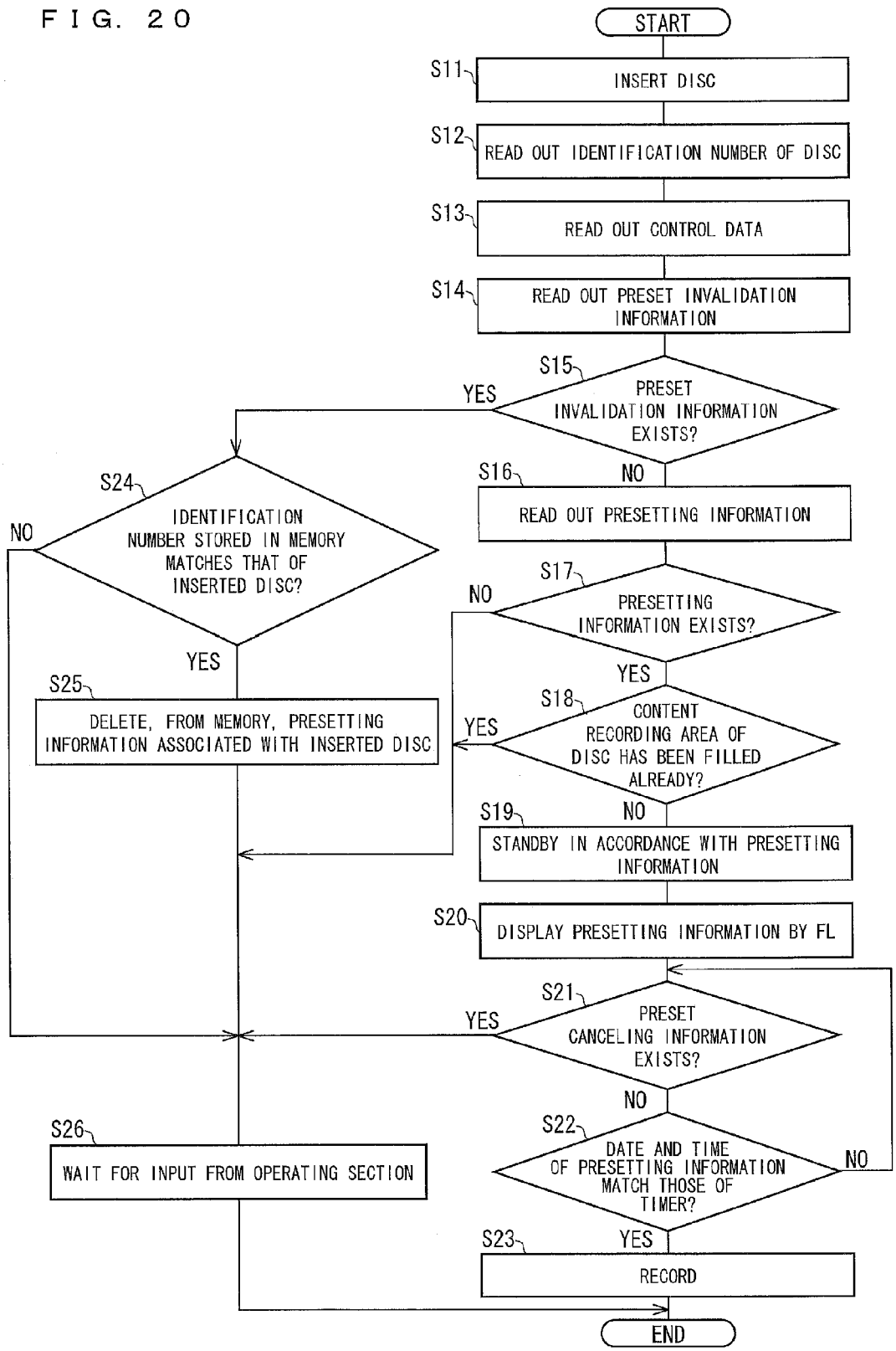
FIG. 20 is a flowchart illustrating an example of a process flow carried out by the information recording/reproducing device.

Next, the following description deals with how the 3D video viewing system 1 carries out a recording operation (storing operation), in accordance with a flowchart of FIG. 20.

In a step S11 (hereinafter, the term "step" is omitted), the user loads the optical disc 200 in the information recording/reproducing device 1001 or the information recording/reproducing device 1002. The process then proceeds to S12.

In S12, in a case where the disc recognizing section 1157 receives an output (disc loading signal) from a disc detecting section (medium detecting means) (not illustrated), the disc recognizing section 1157 transmits, to the memory control section 1151, a "medium detection notification" indicating the loading of the optical disc 200. The process then proceeds to S13. Here, the disc recognizing section 1157 also transmits the "medium detection notification" to the invalidation information recognizing section 1156.

In S13, on receipt of the "medium detection notification" from the disc recognizing section 1157, the memory control section 1151 (i) drives a data reproducing circuit 110 or the like so as to read out control data (an OPC process: information necessary for "a step of Optimum Power Control or a defect management process) from a read-in area of the optical disc 200, and then (ii) causes the memory 116 to store the control data. The process then proceeds to S14.

In S14, on receipt of the "medium detection notification" from the disc recognizing section 1157, the invalidation information recognizing section 1156 drives the data reproducing circuit 110 or the like to read out presetting invalidation information (invalidation information) (in a case where the presetting invalidation information is recorded on the invalidation information recording area 40B of the optical disc 200). Then, the invalidation information recognizing section 1156 notifies the memory control section 1151 of a "presetting canceling notification". The process then proceeds to S15.

In S15, in a case where the invalidation information recognizing section 1156 reads out the presetting invalidation information by driving the data reproducing circuit 110 or the like (YES in S15), the process proceeds to S24.

In S24, the disc recognizing section 1157 drives the data reproducing circuit 110 or the like so as to read out the medium identification information (the identification number of the disc) from the optical disc 200 thus loaded. In a case where the medium identification information thus read out is identical with the medium identification number stored in the memory 116 (YES in S24), the disc recognizing section 1157 notifies the memory control section 1151 of a "medium identical notification". The process then proceeds to S25.

On the other hand, in a case where the medium identification information is not identical with the medium identification number stored in the memory 116 in S24 (NO in S24), the process proceeds to S26. S26 is a step for waiting for an input from the operation section 126. The process then proceeds to "END".

In S25, on receipt of the "medium identical notification" from the disc recognizing section 1157, the memory control section 1151 deletes, from the memory 116, the presetting information corresponding to the optical disc 200 thus loaded, on the basis of the correspondence relationship information (e.g., a correspondence relationship table) indicating a correspondence relationship between the medium identification number stored in the memory 116 and the presetting information. The process then proceeds to S26. S26 is the step for waiting for an input from the operation section 126. The process then proceeds to "END".

Meanwhile, in a case where the invalidation information recognizing section 1156 reads out no presetting information in S15 (NO in S15), the process then proceeds to S16.

In S16, the memory control section 1151 reads out the presetting information recorded on the third information recording area 20B of the optical disc 200, and causes the memory 116 to store the presetting information. The process then proceeds to S17.

In S17, in a case where the memory control section 1151 reads out no presetting information (NO in S17), the process proceeds to S26. S26 is the step for waiting for an input from the operation section 126. The process then proceeds to "END".

On the other hand, in a case where the memory control section 1151 reads out the presetting information (YES in S17), the process proceeds to S18.

In S18, the memory control section 1151 checks whether or not the TV program P corresponding to the presetting information has been already recorded on the content recording area 40A of the optical disc 200.

After that, in a case where the memory control section 1151 determines that the TV program P has been already recorded on the optical disc 200 (YES in S18), the process proceeds to S26. S26 is the step for waiting for an input from the operation section 126. The process then proceeds to "END".

On the other hand, in a case where, in S18, the memory control section 1151 determines that the TV program P has not been recorded on the optical disc 200 yet (NO in S18), the process proceeds to S19.

In S19, the date-and-time checking section 1152 extracts the "current date and time" from the output signal received from the timer 117. In a case where the "current date and time" is before the "preset date and time" included in the presetting information stored in the memory 116, the date-and-time checking section 1152 notifies the memory control section 1151 of a "content obtaining instruction".

On receipt of the "content obtaining instruction", the memory control section 1151 transmits, to the broadcast station selecting section 1153, information (e.g., a frequency of a TV program) indicating a location of a broadcast station which will broadcast the TV program P corresponding to the presetting information, among the presetting information.

On receipt of the information such as the frequency of the TV program, the broadcast station selecting section 1153 adjusts a reception frequency of the tuner 118 to the frequency of the TV program, so as to allow reception of the TV program P from a communication section (communication control means) (not illustrated).

In the case of the information recording/reproducing device 1001, the tuner 118 notifies the writing control section 1154 of a "receivable notification" which indicates that the communication section is turned into a communicable state.

On the other hand, in the case of the information recording/reproducing device 1002, the tuner 118 notifies the information separating section 121 of a "receivable notification" which indicates that the communication section is turned into the communicable state.

Next, in the case of the information recording/reproducing device 1001, on receipt of the "receivable notification" from the tuner 118, the writing control section 1154 is turned into a waiting state (preset waiting state) until the current date and time reaches the preset date and time. The process then proceeds to S20.

In S20, the writing control section 1154 causes the display section (not illustrated) to display (FL: Fluorescent Lighting) the presetting information. The process then proceeds to S21.

In S21, in a case where the user has inputted, via the operation section 126, an instruction to cancel the recording thus preset (YES in S21), the process proceeds to S26. S26 is the step for waiting for an input from the operation section 126. The process then proceeds to "END".

On the other hand, in a case where the user has inputted, via the operation section 126, no instruction to cancel the recording thus preset in S21 (NO in S21), the process proceeds to S22.

In S22, the date-and-time checking section 1152 extracts the "current date and time" from the output signal received from the timer 117. In a case where the "current date and time" is not identical with the "preset date and time" included in the presetting information stored in the memory 116, or in a case where the "current date and time" has not reached several minutes before the "preset date and time" (NO in S22), the process returns to S21.

On the other hand, in S22, in a case where the "current date and time", extracted by the date-and-time checking section 1152 from the output signal received from the timer 117, reaches several minutes before the "preset date and time" included in the presetting information stored in the memory 116, the date-and-time checking section 1152 notifies the memory control section 1151 of a "3D conversion preparation instruction". Next, on receipt of the "3D conversion preparation instruction", the memory control section 1151 drives the data reproducing circuit 110 or the like to read out the 3D conversion data arrangement information and the 3D conversion permission key (in a case where the 3D conversion data arrangement information and the 3D conversion permission key are recorded on the third information recording area 20B of the optical disc 200). Then, the memory control section 1151 causes the memory 116 or the like to store the 3D conversion data arrangement information and the 3D conversion permission key. Further, the memory control section 1151 drives the data reproducing circuit or the like to read out the complementary information L1 through L4 . . . for preparing the left eye video and the decompressing process software (in a case where (i) the complementary information L1 through L4 . . . for preparing the left eye video is recorded on the first information recording area 20A and (ii) the decompressing process software is recorded on the third information recording area 20B). Then, the memory control section 1151 causes the memory 116 or the like to store the complementary information L1 through L4 . . . for preparing the left eye video and the decompressing process software. After that, the memory control section 1151 notifies the date-and-time checking section 1152 of a "3D conversion preparation termination notification".

Next, the date-and-time checking section 1152 extracts the "current date and time" from the output signal received from the timer 117. When the "current date and time" becomes identical with the "preset date and time" included in the presetting information stored in the memory 116, the date-and-time checking section 1152 notifies the writing control section 1154 of a "date-and-time matching notification". The process then proceeds to S23.

In the case of the information recording/reproducing device 1001, S23 is carried out as described below. That is, on receipt of the "date-and-time identical notification" from the date-and-time checking section 1152, the writing control section 1154 causes the tuner 118 to receive the TV program P (the right eye video information R1 through R4 . . . ) corresponding to the presetting information, and causes the memory 116 to store temporarily the right eye video information R1 through R4 . . . .

Meanwhile, in the case of the information recording/reproducing device 1002, the TV program P is transmitted to the information separating section 121 via the tuner 118.

Next, the information separating section 121 separates the TV program P into the (compressed) right eye video information R1 through R4 . . . and the compressed complementary information L1 through L4 . . . for preparing the left eye video. The right eye video information R1 through R4 . . . thus separated is transmitted to the broadcast data decompressing section 122, so as to be decompressed. Then, the right eye video information R1 through R4 . . . thus decompressed is stored in the cache memory 124 so as to adjust a time difference in decompressing time period between the complementary information L1 through L4 . . . for preparing the left eye video and the right eye video information R1 through R4 . . . .

Further, simultaneously, the compressed complementary information L1 through L4 . . . for preparing the left eye video thus separated is transmitted to the 3D conversion complementary information decompressing section 123. The 3D conversion complementary information decompressing section 123 reads out the decompressing process software which has been stored in the memory 116 in advance (or the decompressing process section 123 has been stored in another memory in advance in a case where the 3D conversion complementary information decompressing section 123 includes the another memory), and decompresses the compressed complementary information L1 through L4 . . . for preparing the left eye video. The complementary information L1 through L4 . . . for preparing the left eye video thus decompressed is transmitted to the 3D integrating section (recording control means, arranging means) 125.

Next, the 3D data integrating section 125 arranges and integrates, in accordance with the 3D conversion data arrangement information which has been stored in the memory 116 in advance, (i) the right eye video information R1 through R4 . . . which is reproduced from the cache memory 124 in synchronization with the complementary information L1 through L4 . . . for preparing the left eye video thus decompressed, and (ii) the complementary information L1 through L4 . . . for preparing the left eye video thus decompressed, in a integrated manner, so that the right eye video information R1 through R4 . . . and the complementary information L1 through L4 . . . for preparing the left eye video are reproducible as a 3D video. Then, the 3D data integrating section 125 transmits, to the writing control section 1154, the right eye video information R1 through R4 . . . and the complementary information L1 through L4 . . . for preparing the left eye video thus arranged or causes the memory 116 to store temporarily the right eye video information R1 through R4 . . . and the complementary information L1 through L4 . . . for preparing the left eye video.

As described above, a transfer rate of the TV program P (the main broadcast) is approximately 15 Mbps, and a transfer rate of a data broadcast including the 3D conversion complementary information is approximately 2 Mbps. As a matter of course, compression rates for them are different from each other.

Next, in the case of the information recording/reproducing device 1001, the writing control section 1154 first reads out the right eye video information R1 through R4 . . . and the 3D conversion data arrangement information, each of which is stored in the memory 116. Then, the writing control section 1154 records the right eye video information R1 through R4 . . . on the content recording area 40A of the optical disc 200 so that the recording spaces E1 through E4 . . . are inserted in respective positions between adjacent pieces of the right eye video information R1 through R4 . . . , as illustrated in (a) of FIG. 2.

Next, the writing control section 1154 reads out the complementary information L1 through L4 . . . for preparing the left eye video stored in the memory 116. Then, in accordance with the 3D conversion data arrangement information, the writing control section 1154 inserts pieces of the complementary information L1 through L4 . . . for preparing the left eye video in corresponding recording spaces E1 through E4 . . . , respectively, as illustrated in (b) of FIG. 2. The writing control section 1154 thus records (stores) the right eye video information R1 through R4 . . . and the complementary information L1 through L4 . . . for preparing the left eye video on the content recording area 40A of the optical disc 200. The process then proceeds to "END".

Meanwhile, in the case of the information recording/reproducing device 1002, the writing control section 1154 directly records (stores), on the content recording area 40A of the optical disc 200, the 3D video for which 3D conversion data arrangement has been carried out, as illustrated in (b) of FIG. 2. Note that the 3D video is received from the 3D data integrating section 125 or is stored in the memory 116. The process then proceeds to "END".

According to the present embodiment, the 3D conversion data arrangement information is data used in a process for adjusting, in arranging, alternately, the right eye video information R1 through R4 . . . and the complementary information L1 through L4 . . . for preparing the left eye video, (i) recording start positions and recording end positions of the right eye video information R1 through R4 . . . and (ii) recording start positions and recording end positions of the complementary information L1 through L4 . . . for preparing the left eye video.

In this case, for example, it is possible to have such an arrangement that the recording end position of the right eye video information R1 matches the recording start position of the recording space E1, and the recording start position of the right eye video information R2 matches the recording end position of the recording space E1.

However, in a case where the 3D conversion data arrangement information is 3D conversion data arrangement process software (arrangement process information), the control section 115 reads the 3D conversion data arrangement process software. As a result, the control section 115 causes the 3D conversion data arrangement process software to start up so as to (i) drive the data recording circuit 119 or the like to read out the right eye video information R1 through R4 . . . and the 3D conversion data arrangement information, both of which are stored in the memory 116, (ii) decompress the compressed complementary information L1 through L4 . . . for preparing the left eye video by use of the decompressing process software, (iii) arrange, in accordance with the 3D conversion data arrangement information, the right eye video information R1 through R4 . . . and the complementary information L1 through L4 . . . for preparing the left eye video thus decompressed, as illustrated in (a) and (b) of FIG. 2, and (iv) record (store), on the content recording area 40A of the optical disc 200, the right eye video information R1 through R4 . . . and the complementary information L1 through L4 . . . for preparing the left eye video data thus arranged.

Figure 22:
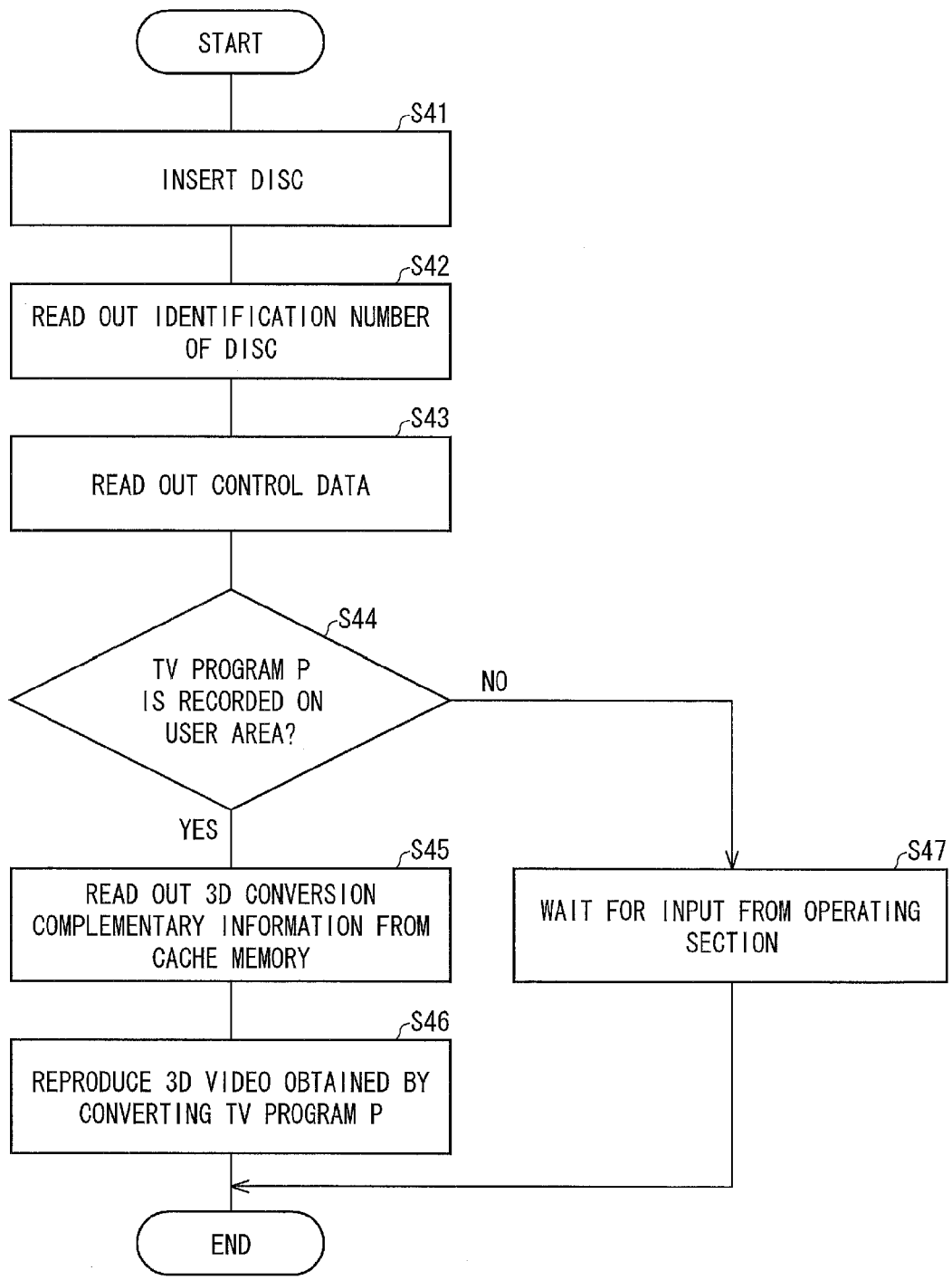
FIG. 22 is a flowchart illustrating yet another example of a process flow carried out by the information recording/reproducing device.

Next, the following description deals with how the 3D video viewing system 1 carries out a reproducing operation with reference to a flowchart of FIG. 22.

First, in a step S41, a user loads the optical disc 200 into the information recording/reproducing device 1001. The process then proceeds to S42.

In S42, when the disc recognizing section 1157 of the information recording/reproducing device 1001 receives an output from the disc detecting section (not illustrated), the disc recognizing section 1157 transmits, to the memory control section 1151, the "medium detection notification" indicating that the optical disc 200 is loaded to the memory control section 1151.

In S43, on receipt of the "medium detection notification" from the disc recognizing section 1157, the memory control section 1151 drives the data reproducing circuit 110 or the like to read out control data from the read-in area of the optical disc 200. Then, the memory control section 1151 causes the memory 116 to store the control data thus read out.

Further, the memory control section 1151 (i) reads out the complementary information L1 through L4 . . . for preparing the left eye video from the first information recording area 20A and (ii) reads out the 3D conversion data arrangement information from the third information recording area 20B. The memory control section 1151 then causes the memory 116 to store the complementary information L1 through L4 . . . for preparing the left eye video and the 3D conversion data arrangement information thus read out. The process then proceeds to S44.

In S44, the memory control section 1151 checks whether or not the TV program P has been already recorded on the content recording area 40A of the optical disc 200.

After that, in a case where the memory control section 1151 determines that the TV program P has been already recorded on the optical disc 200 (YES in S44), the process proceeds to S45.

In S45, the memory control section 1151 reads out, from the memory 116, (i) the right eye video information R1 through R4 . . . , (ii) the complementary information L1 through L4 . . . for preparing the left eye video, and (iii) the 3D conversion data arrangement information. The process then proceeds to S46.

Next, in S46, the memory control section 1151 arranges and synchronizes the right eye video information R1 through R4 . . . and the complementary information L1 through L4 . . . for preparing the left eye video, as illustrated in (b) of FIG. 2. Then, the memory control section 1151 supplies, to the display section 4, the right eye video information R1 through R4 . . . as a TV program video 2 and the complementary information L1 through L4 . . . for preparing the left eye video as a +α moving image 3 so that a 3D video is reproduced. The process then proceeds to "END". It is possible to output the 3D video not to the display section 4 but to an external HDD (hard disk drive).

On the other hand, in a case where the memory control section 1151 determines that the TV program P has not been recorded on the optical disc 200 yet (NO in S44), the process proceeds to S47.

S47 is a step for waiting for an input from the operation section 126. The process then proceeds to "END".

According to the present embodiment, the 3D conversion data arrangement information is data used in the process for adjusting, in arranging alternately the right eye video information R1 through R4 . . . and the complementary information L1 through L4 . . . for preparing the left eye video, (i) the recording start positions and the recording end positions of the right eye video information R1 through R4 . . . and (ii) the recording start positions and the recording end positions of the complementary information L1 through L4 . . . for preparing the left eye video.

However, in a case where the 3D conversion data arrangement information is the 3D conversion data arranging process software, the control section 115 reads the 3D conversion data arranging process software. As a result, the control section 115 causes the 3D conversion data arranging process software to start up so as to (i) drive the memory control section 1151 or the like to read out the right eye video information R1 through R4 . . . , the complementary information L1 through L4 . . . for preparing the left eye video, and the 3D conversion data arrangement information, each of which is stored in the memory 116, and (ii) arrange and synchronize, in accordance with 3D conversion data arranging process software, the right eye video information R1 through R4 . . . and the complementary information L1 through L4 . . . for preparing the left eye video, as illustrated in (b) of FIG. 2. With the operations, the right eye video information R1 through R4 . . . is outputted to the display section 4 as the TV program video 2 and the complementary information L1 through L4 . . . for preparing the left eye video is outputted to the display section 4 as the +α moving image 3, so that a 3D video is reproduced.

Figure 21:
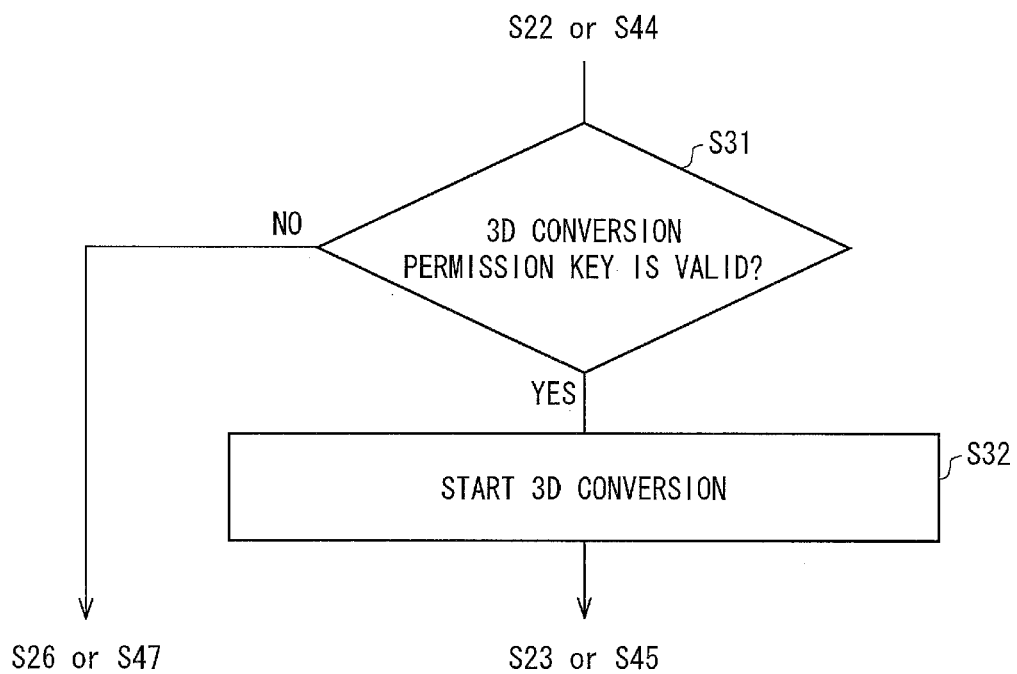
FIG. 21 is a flowchart illustrating another example of a process flow carried out by the information recording/reproducing device.

Next, the following description deals with how the 3D video viewing system 1 carries out an authentication operation with reference to a flowchart of FIG. 21. Here, the complementary information L1 through L4 . . . for preparing the left eye video, recorded on the first information recording area 20A, has been encoded.

First, the process proceeds from S22 or S44 to S31.

In S31, the authentication section 1158 reads out the 3D conversion permission key stored in the memory 116, and checks whether or not the 3D conversion permission key thus read out is identical with a 3D conversion permission key stored in the authentication condition recording section 1159. In a case where the 3D conversion permission key is identical with the one stored in the authentication condition recording section 1159, the authentication section 1158 determines that the 3D conversion permission key thus read out is "valid". In a case where the 3D conversion permission key thus read out is not identical with the one stored in the authentication condition recording section 1159, the authentication section 1158 determines that the 3D conversion permission key thus read out is "invalid".

Here, in a case where the authentication section 1158 determines that the 3D conversion permission key is valid (YES in S31), the authentication section 1158 notifies the decoding section 1160 that the 3D conversion permission key is valid. The process then proceeds to S32.

In S32, the decoding section 1160 (i) reads out the complementary information L1 through L4 . . . for preparing the left eye video stored in the memory 116, (ii) decodes the complementary information L1 through L4 . . . for preparing the left eye video, and (iii) causes the memory 116 to store again the complementary information L1 through L4 . . . for preparing the left eye video thus decoded. Then, the decoding section 1160 notifies the writing instruction section 1161 or the memory control section 1151 that the complementary information L1 through L4 . . . for preparing the left eye video thus decoded is stored in the memory 116.

In S32, the writing instruction section 1161 or the memory control section 1151 reads out the right eye video information R1 through R4 . . . , the complementary information L1 through L4 . . . for preparing the left eye video thus decoded, and the 3D conversion data arrangement information, each of which is stored in the memory 116. Then, the writing instruction section 1161 starts carrying out 3D conversion in accordance with the 3D conversion data arrangement information. The process then proceeds to S23 or S45.

On the other hand, in a case where the authentication section 1158 determines that the 3D conversion permission key is "invalid" in S31 (NO in S31), the process proceeds to S26 or S47.

[7. Information Recording/Reproducing Device of One Embodiment of Present Invention (Part II)]

Figure 23:
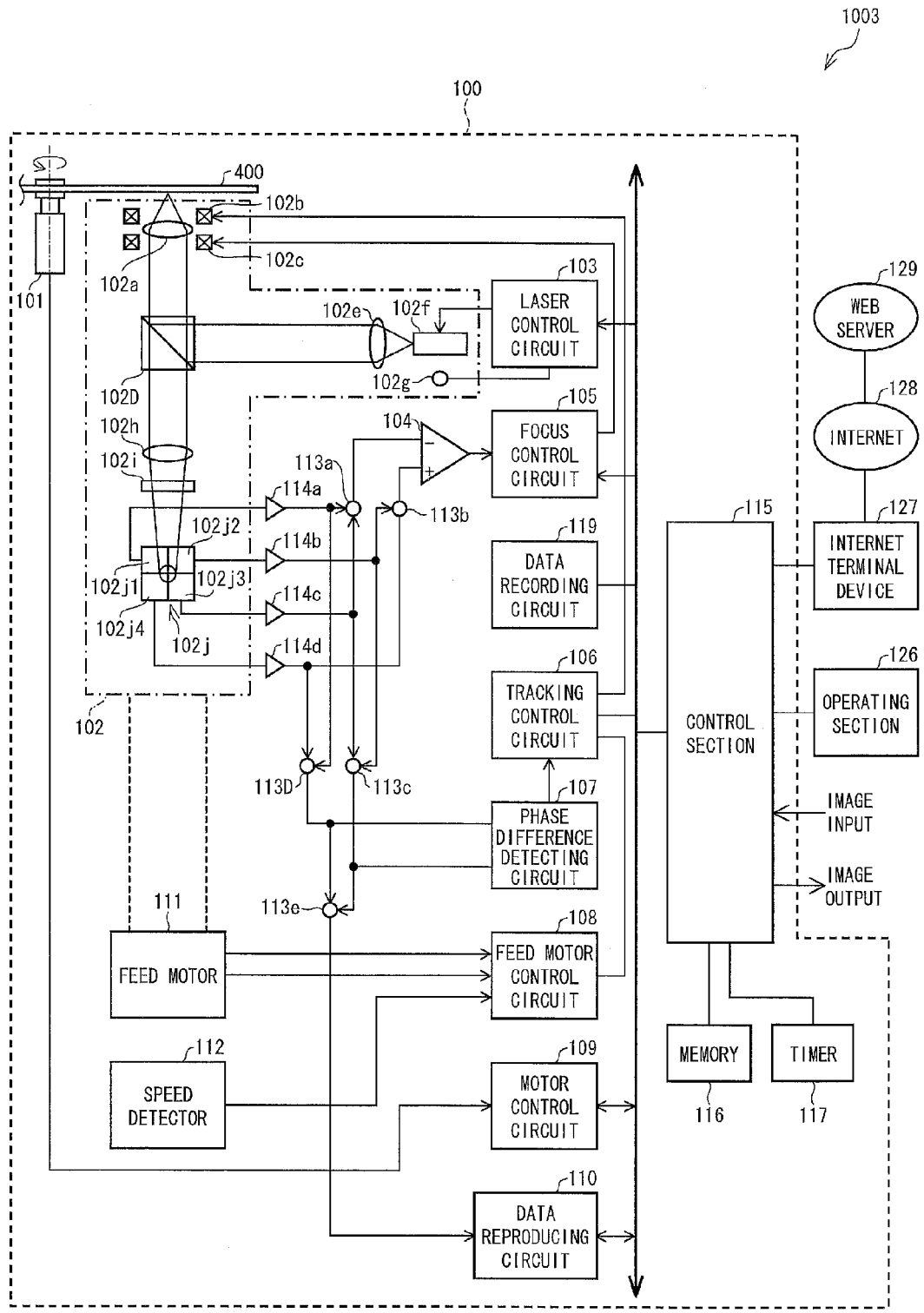
FIG. 23 is a block diagram illustrating yet another configuration example of main parts of the information recording/reproducing device.

Next, the following description deals with another example of an arrangement of a 3D video viewing system 1, with reference to FIGS. 15 and 23. The 3D video viewing system 1 is an information recording/reproducing device in accordance with one embodiment of the present invention.

A basic arrangement of an information recording/reproducing device 1003 described below is identical with that of a reproducing system 100 described above, and therefore explanations of the basic arrangement are omitted in the following description appropriately.

The 3D video viewing system 1 of the present example includes the information recording/reproducing device 1003, a display section 4, a cable 4A (or a cable 4B), a liquid crystal shutter 5, and polarized glasses 7 (see FIG. 15).

The information recording/reproducing device 1003 (i) outputs, as a right eye video, a 2D moving image (video content, two-dimensional video) 2 of a plurality of frames, obtained from a 2D video content P' described above, and (ii) outputs, as a left eye video, a +α moving image (complementary information) 3 of a plurality of frames, which +α moving image 3 is used to cause a 2D moving image 2' obtained from 3D conversion complementary information described above to be converted into a 3D video.

Here, the 2D moving image 2' is a right eye video obtained from the 2D video content P', and corresponds to a reproduced video of complementary information R1' through R4' . . . for preparing the right eye video.

Further, the +α moving image 3 is a left eye video obtained from the 3D conversion complementary information, and is, for example, a reproduced video of left eye video information L1' through L4' . . . .

The information recording/reproducing device 1003 supplies the 2D moving image 2' and the +α moving image 3 to the display section 4 so that the 2D moving image 2' and the +α moving image 3 are reproduced as a 3D video in the display section 4. The display section 4 is constituted by a TV, a projector, or the like.

The liquid crystal shutter 5 is constituted by liquid crystal or the like, and can carry out switching between two sorts of transparent polarized light.

The polarized glasses 7 include two liquid crystal shutters (or two different polarizers), which are provided for a right eye and a left eye, respectively, so that a right eye video (a broadcast content, a two-dimensional video) 6R and a left eye video (complementary information) 6L can be viewed. The right eye video 6R is obtained from the TV program video 2. The left eye video 6L is obtained from the +α moving image 3. The right eye video 6R and the left eye video 6L, obtained via the liquid crystal shutter 5, are arranged in a predetermined order of the plurality of frames.

Here, the right eye video 6R is a component of the 2D moving image 2', and is obtained by, for example, reproducing the complementary information R1' through R4' . . . for preparing the right eye video or the like.

Further, the left eye video 6L is a component of the +α moving image 3, and is obtained by, for example, reproducing the left eye video information L1' through L4' . . . .

The 3D video viewing system 1 illustrated in FIG. 15 allows the user to view a 3D video by taking advantage of an azimuth difference of human's eyes in such a manner that the left eye video 6L and the right eye video 6R are projected to the left glass and the right glass respectively by use of the polarized glasses 7.

As described above, conventionally, a right eye video 6R exclusively sued for a 3D video and a left eye video 6L exclusively used for the 3D video are prepared. Accordingly, two cameras are used in recording these videos so that a video for the right eye and a video for the left eye are recorded, and streamed as the right eye video 6R and the left eye video 6L.

However, each of the frames of the 2D moving image 2' is basically a video recorded by use of one camera. That is, such a frame is either the right eye video 6R or the left eye video 6L.

Accordingly, by carrying out recording by use of another camera at the same time as the recording of the 2D moving image 2', it is possible to obtain the +α moving image 3 for converting the 2D video content P' into a 3D video, irrespective of which one of the right eye video 6R and the left eye video 6L the frame is used.

That is, it is possible for the user to view, as a 3D video, the 2D video content P' by use of the 2D moving image 2' and the +α moving image 3 by taking, in creation of the 2D content P', the 2D moving image 2' and the +α moving image 3 simultaneously.

Next, the following description deals with an outline of an operation of the 3D video viewing system 1 of the present example.

First, the information recording/reproducing device 1003 caches (temporarily stores) the 2D moving image 2' and the +α moving image 3, and supplies the 2D moving image 2' serving as the right eye video and the +α moving image 3 serving as the left eye video to the display section 4.

Here, in a case where an information interface between the information recording/reproducing device 1003 and the display section 4 is of an analogue type, it is necessary to transmit information for the right eye and information for the left eye independently and separately. In a case of a digital interface such as an HDMI (high-definition multimedia interface), it is possible to carry out serial transmission so that the information for the right eye and the information for the left eye are transmitted serially and alternately.

Further, it is possible that (i) the information recording/reproducing device 1003 compresses such information and transmits the information thus compressed to the display section 4, and (ii) the display section 4 unpacks (decompresses) the information.

Furthermore, in a case of a general TV, the right eye video 6R and the left eye video 6L are displayed while which one of the right eye video 6R and the left eye video 6L is displayed is switched with each other every field. In a case where a TV employing a double scanning display is used as the display section 4, it is possible to solve a problem of a flicker or the like, which is generated in distributing the right eye video 6R and the left eye video 6L to the right eye and the left eye in such a manner that which one of the right eye video 6R and the left eye video 6L is displayed is switched with each other every field. That is, it is possible to reproduce a 3D video smoothly.

Moreover, the liquid crystal shutter 5 is constituted by liquid crystal or the like, and can carry out the switching between the two sorts of polarized light (see FIG. 15). It is possible to change, every field, a polarization angle of light by controlling the liquid crystal shutter 5. For example, it is possible to have such an arrangement that (i) the right eye video 6R travels through the liquid crystal shutter 5 so as to be vertically-polarized and (ii) the left eye video 6L travels through the liquid crystal shutter 5 so as to be horizontally-polarized.

In this case, the polarized glasses 7 may be such that different polarizers (a polarizer for vertical polarization and another polarizer for horizontal polarization) are attached to left and right glasses, respectively. With the arrangement, it becomes unnecessary to provide the cable 4B via which a field synchronization signal is supplied from the display section 4 to the polarized glasses 7. The field synchronization signal corresponds to timing when the display section 4 controls the liquid crystal shutter 5 via the cable 4A.

Meanwhile, in a case where the liquid crystal shutter 5 is not used, it is necessary to provide the polarized glasses 7 with a liquid crystal shutter. In this case, it is necessary to provide the cable 4B for a field synchronization signal.

With the arrangement in which the polarized glasses 7 are provided with the liquid crystal shutter, polarized light is not used. For this reason, even if an angle of the polarized glasses 7 is changed (for example, when a user inclines his/her head), such a change in the angle of the polarized glasses 7 has less influence on a 3D video.

Next, the following description deals with an arrangement of the information recording/reproducing device 1003 which is a main part of the 3D video viewing system 1, with reference to FIG. 23.

In addition to the reproducing system 100, the information recording/reproducing device 1003 includes a memory (temporary storing section) 116, a timer 117, a data recording circuit 119, an operation section 126, an Internet terminal device (decompressing process means) 127, the Internet 128, and a web server 129 (see FIG. 23).

Figure 24:
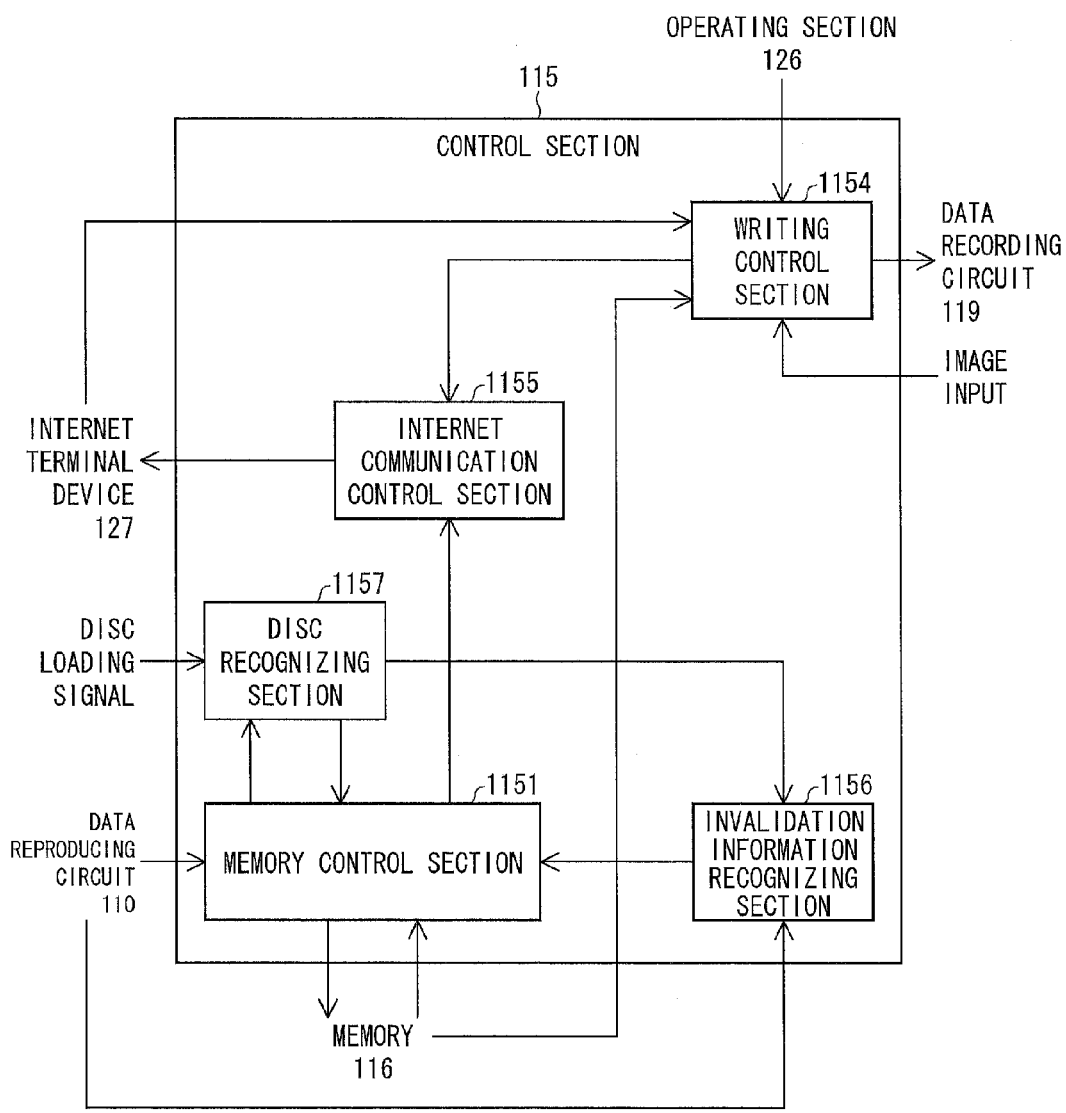
FIG. 24 is a block diagram illustrating a configuration example of a control section, which is encompassed in the main parts of the information recording/reproducing device.

Further, the control section 115 of the information recording/reproducing device 1003 includes a memory control section (memory control means, reproducing control means) 1151, a writing control section (recording control means) 1154, an invalidation information recognizing section 1156, a disc recognizing section 1157, and an Internet communication control section 1155 (see FIG. 24).

The memory control section 1151 causes the memory 116 to store (i) download information or the like, reproduced from the optical disc 200, (ii) a medium identification number (medium identification information: an identification number of a disc) obtained by the disc recognizing section 1157 (which will be described later), and (iii) control data, for example.

Here, it is possible to (i) generate correspondence relationship information or the like (e.g., a correspondence table) indicating a correspondence relationship between the medium identification number and the download information, and (ii) cause the memory 116 to store the correspondence relationship information.

Further, the memory control section 1151 reads out the download information, the correspondence relationship information, or the like, thus stored. Then, the memory control section 1151 controls transmission of data or the like between the memory 116 and other components. For example, the memory control section 1151 transmits the download information thus read out to the Internet communication control section 1155, or eliminates the download information stored in the memory 116 on receipt of a notification (invalidation information recognizing notification) indicating that the invalidation information recognizing section 1156 (which will be described later) recognizes invalidation information.

Furthermore, the memory control section 1151 carries out the following control: (i) reading out the 2D video content P' recorded on the first information recording area 20A and causing the memory 116 to store the 2D video content P', and (ii) reading out the 3D conversion data arrangement information, the decompressing process software, the 3D conversion permission key, or the like, each of which is recorded on the third information recording area 20B, and causing the memory 116 to store such information or software thus read out.

Moreover, the memory control section 1151 has such a function that, in a case where the 3D conversion complementary information is recorded on a 3D conversion complementary information recording space 40C of the optical disc 200, the memory control section 1151 (I) reads out the complementary information R1' through R4' . . . for preparing the right eye video and the 3D conversion data arrangement information, each of which is stored in the memory 116, (II) reads out the left eye video information L1' through L4' . . . recorded on the 3D conversion complementary information recording space 40C, (III) generates a 3D video, and (IV) outputs the 3D video thus generated to the display section 4.

The writing control section 1154 drives the data recording circuit 119 or the like so as to record, on the optical disc 200, the 3D conversion complementary information received from the Internet terminal device 127.

Here, in a case where an instruction to carry out downloading is inputted via the operation section 126, the writing control section 1154 receives the 3D conversion complementary information from the web server 129 in such a manner that the writing control section 1154 drives the Internet communication control section 1155 to establish, via the Internet 128, a connection between the web server 129 and the information recording/reproducing device 1003, for example.

Further, the writing control section 1154 controls writing of data (i.e., the 3D conversion complementary information thus received) in the optical disc 200.

Furthermore, in a case where an instruction to cancel the recording is inputted via the operation section 126, the writing control section 1154 carries out control of writing data in the optical disc 200 in such a manner that, for example, the writing control section 1154 drives the data recording circuit 119 or the like to record the invalidation information on the invalidation information recording area (not illustrated) of a second information recording layer 40 of the optical disc 200.

Moreover, the writing control section 1154 also carries out such control that the writing control section 1154 drives the data recording circuit 119 or the like to record, in accordance with the 3D conversion data arrangement information, the 3D conversion complementary information (i.e., the left eye video information L1' through L4' . . . ) received from the Internet terminal device 127 so that 2D video recording spaces 40D are inserted in respective positions between adjacent pieces of the left eye video information L1' through L4' . . . , as illustrated in (a) of FIG. 5.

Further, the writing control section 1154 carries out such control that, after the left eye video information L1' through L4' . . . is recorded on the 3D conversion complementary information recording spaces 40C, the writing control section 1154 inserts and records, in accordance with the 3D conversion data arrangement information, pieces of the complementary information R1' through R4' . . . for preparing the right eye video in corresponding 2D video recording spaces 40D, respectively, as illustrated in (b) of FIG. 5.

The Internet communication control section 1155 receives the download information from the memory control section 1151, and drives the Internet (decompressing process means) terminal device 127. Then, the Internet communication control section 1155 controls transmission of content or the like on the Internet between the information recording/reproducing device 1003 and the web server 129 in such a manner that, for example, the Internet communication control section 1155 instructs, on the basis of the download information, transmits, the Internet terminal device 127 to download the 3D conversion data arrangement information from the web server 129.

In a case where the invalidation information recognizing section 1156 does not recognize the invalidation information, the invalidation information recognizing section 1156 drives the memory control section 1151 (or notifies the memory control section 1151 that the invalidation information recognizing section 1156 does not recognize the invalidation information) to carry out various processes such as a process for making a connection with the Internet. In a case where the invalidation information recognizing section 1156 recognizes the invalidation information, the invalidation information recognizing section 1156 transmits, to the memory control section 1151, a notification (the invalidation information recognizing notification) indicating that the invalidation information recognizing section 1156 recognizes the invalidation information, for example, so as to control transmission of data related to the "invalidation information" between the memory control section 1151 and other components.

The disc recognizing section 1157 recognizes (detects) whether or not the optical disc 200 is loaded to the information recording/reproducing device 1003.

Then, in a case where the disc recognizing section 1157 determines that the optical disc 200 is loaded, the disc recognizing section 1157 drives the memory control section 1151 to obtain the medium identification number from the optical disc 200.

Further, the disc recognizing section 1157 transmits the medium identification number to the invalidation information recognizing section 1156. In a case where the invalidation information is recorded on the optical disc 200, the disc recognizing section 1157 transmits the invalidation information to the invalidation information recognizing section 1156.

Furthermore, in a case where the invalidation information is not recorded on the optical disc 200, the disc recognizing section 1157 drives the memory control section 1151 to control various processes related to the loading/unloading of the optical disc 200.

The Internet terminal device 127 establishes a connection between the web server 129 and the information recording/reproducing device 1003 via the Internet 128.

Further, in a case where the connection is established, the Internet terminal device 127 causes a display section of the Internet terminal device 127 to display "START DOWNLOAD?" (a message urging a user to input a download instruction).

Furthermore, the Internet terminal device 127 transmits, to the writing control section 1154, the 3D conversion complementary information downloaded from the web server 129, so as to control communication between the information recording/reproducing device 1003 and the web server 129 via the Internet 128 (such as transmission of a content).

Moreover, in a case where the 3D conversion complementary information obtained via the Internet 128 is compressed, the Internet terminal device 127 instructs the information recording/reproducing device 1003 to transmit, to the Internet terminal device 127, the decompressing process software read out from the optical disc 200. It is possible to have such an arrangement that the Internet terminal device 127 receives the decompressing process software from the information recording/reproducing device 1003 in advance, and causes a memory or the like, provided inside the Internet terminal device 127, to store the decompressing process software in advance.

After that, the Internet terminal device 127 causes the decompressing process software to start up, so as to decompress the compressed 3D conversion complementary information. Then, the Internet terminal device 127 transmits the 3D conversion complementary information thus decompressed to the information recording/reproducing device 1003.

Figure 25:
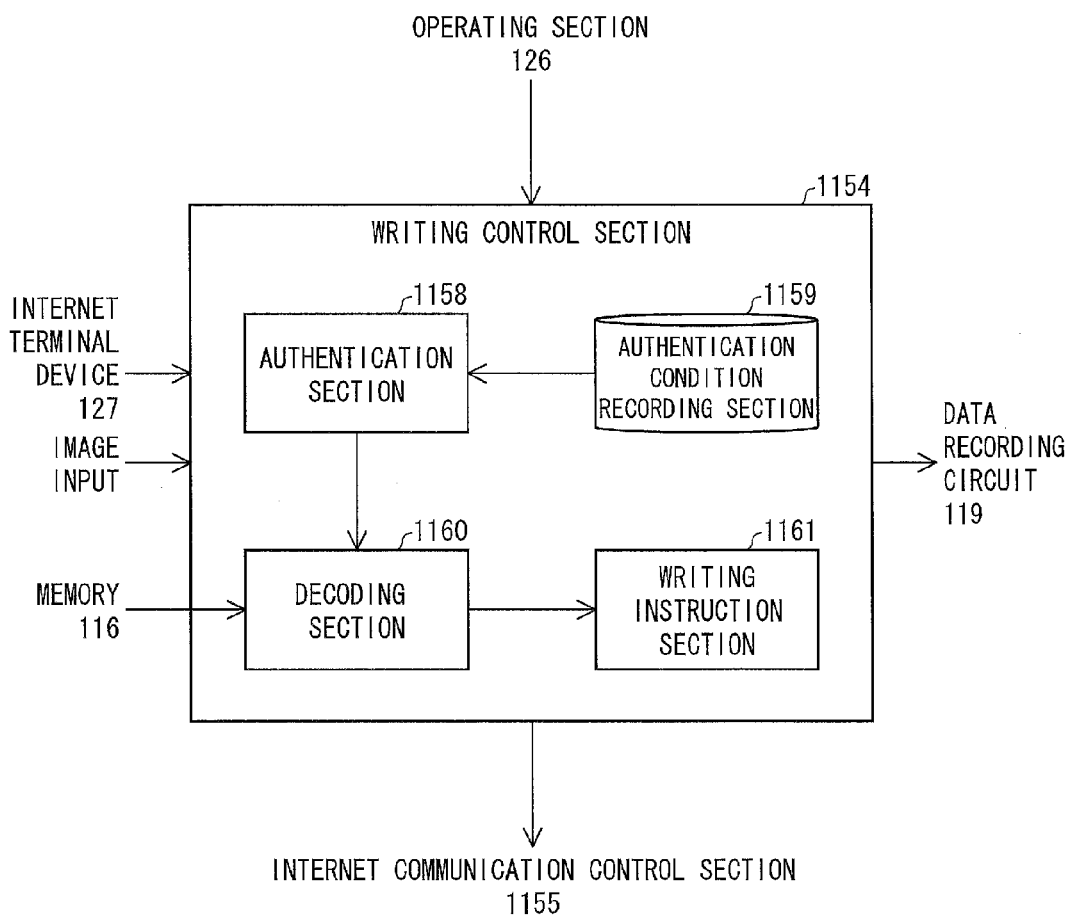
FIG. 25 is a block diagram illustrating a configuration example of a writing control section in the control section.

Next, the following description deals with a case where the writing control section 1154 has an authentication function, with reference to FIG. 25.

In this case, the writing control section 1154 includes an authentication section 1158, an authentication condition recording section 1159, a decoding section 1160, and a writing instruction section 1161.

Further, the 3D conversion complementary information described above includes, as attached information, the 3D conversion permission key and the left eye video information L1' through L4' . . . . Furthermore, the left eye video information L1' through L4' . . . has been subjected to an encoding process.

The authentication section 1158 reads out the 3D conversion permission key which has been received from the Internet terminal device 127 and temporarily stored in the authentication condition recording section 1159. Then, the authentication section 1158 checks whether or not the 3D conversion permission key is identical with a 3D conversion permission key that is recorded on the third information recording area 20B of the optical disc 200, so as to authenticate whether or not the 3D conversion of the 2D video content P' is permitted for the information recording medium.

According to the present embodiment, a "valid 3D conversion permission key", obtained as the attached information of the 3D conversion complementary information, is stored in the authentication condition recording section 1159. However, the "valid 3D conversion permission key" may be obtained from a bar-code information corresponding to the 2D video content P', which is presented with the 2D video content P' on a magazine, for example.

Further, it is possible to have such an arrangement that (i) when a user purchases the optical disc 200 or the optical disc 201, the valid 3D conversion permission key is presented to the user, and (ii) in a case where the user inputs the valid 3D conversion permission key via the operation section 126, the 3D conversion of the 2D video content P' is permitted.

Next, in a case where the authentication section 1158 authenticates that the optical disc 200 is the information recording medium for which the 3D conversion of the 2D video content P' is permitted, the decoding section 1160 decodes the encoded left eye video information L1' through L4' . . . which has been stored in the memory 116, and causes the memory 116 to store again the left eye video information L1' through L4' thus decoded.

The writing instruction section 1161 instructs the data recording circuit 119 or the like to read out (i) the left eye video information L1' through L4' . . . which has been read out from the memory 116 and decoded by the decoding section 1160, (ii) the complementary information R1' through R4' . . . for preparing the right eye video, and (iii) the 3D conversion data arrangement information. Then, the writing instruction section 1161 arranges, in accordance with the 3D conversion data arrangement information, the left eye video information L1' through L4' . . . and the complementary information R1' through R4' . . . for preparing the right eye video, as illustrated in (b) of FIG. 5, so as to record the 2D video content P' on the 3D conversion complementary information recording space 40C of the optical disc 200, for example.

Next, the following description deals with an outline of a main function of the 3D video viewing system 1, with reference to (a) and (b) of FIG. 5, and FIGS. 24 through 27.

A main reproducing function (reproducing method) of the 3D video viewing system 1 is described below.

Here, the 3D conversion complementary information has already been recorded on the 3D conversion complementary information recording space 40C of the optical disc 200 or the optical disc 201.

First, in a case where the 3D conversion complementary information is recorded on the 3D conversion complementary information recording space 40C, the information recording/reproducing device 1003 (i) reads out the 3D conversion complementary information, that is, the left eye video information L1' through L4' . . . related to the 2D video content P', (ii) reads out the 3D conversion data arrangement information from the third information recording area 20B, and (iii) stores causes the memory 116 to store the left eye video information L1' through L4' . . . and the 3D conversion data arrangement information (a temporary recording step) (see FIG. 24).

Next, the information recording/reproducing device 1003 (i) reads out the complementary information R1' through R4' . . . for preparing the right eye video, recorded on the first information recording area 20A, and (ii) reads out the left eye video information L1' through L4' . . . and the 3D conversion data arrangement information, each of which is stored in the memory 116. Then, the information recording/reproducing device 1003 arranges and synchronizes, in accordance with the 3D conversion data arrangement information, the complementary information R1' through R4' . . . for preparing the right eye video thus read out and the left eye video information L1' through L4' . . . thus read out so that the complementary information R1' through R4' . . . for preparing the right eye video and the left eye video information L1' through L4' . . . are reproducible as a 3D video. After that, the information recording/reproducing device 1003 reproduces the 3D video (a reproducing step).

In the above explanation, the 3D video is reproduced and displayed. However, the display section 4 of the 3D video viewing system 1 has such a function that, in a case where a set of the 2D moving image 2' and the +α moving image 3 for 1 frame is inputted sequentially, a 3D image for the 1 frame can be displayed.

Accordingly, it is possible to for the user to view a 3D video by reading out, from the optical disc 200 or the optical disc 201, the left eye video information L1' through L4' . . . and the complementary information R1' through R4' . . . for preparing the right eye video.

Next, the following description deals with a main recording function (recording method) of the 3D video viewing system 1.

Here, the decompressing process software for unpacking (decompressing) the compressed left eye video information L1' through L4' . . . described above is recorded on the third information recording area 20B of the optical disc 200 or the optical disc 201. The 2D video content P' is converted into a 3D video by use of the 3D conversion complementary information which is obtained by the 3D video viewing system 1 from the web server 129 via the Internet 128, and is recorded (a recording method).

The information recording/reproducing device 1003 illustrated in FIG. 23 first obtains the 3D conversion complementary information (left eye video information L1' through L4' . . . ) from the web server 129.

Next, the information recording/reproducing device 1003 decompresses, by use of the decompressing process software which has been recorded on the third information recording area 20B, the left eye video information L1' through L4' . . . thus obtained (a decompressing step).

Then, the information recording/reproducing device 1003 causes the memory (temporary recording memory) 116 to store the left eye video information L1' through L4' . . . thus decompressed (a temporary recording step).

Next, the information recording/reproducing device 1003 reads out the 3D conversion data arrangement information recorded on the third information recording area 20B, and causes the memory 116 to store the 3D conversion data arrangement information.

Then, the information recording/reproducing device 1003 (i) reads out, from the memory 116, the left eye video information L1' through L4' . . . thus decompressed and the 3D conversion data arrangement information, and (ii) reads out the complementary information R1' through R4' . . . for preparing the right eye video from the first information recording area 20A. Then, the information recording/reproducing device 1003 arranges, in accordance with the 3D conversion data arrangement information, the complementary information R1' through R4' . . . for preparing the right eye video and the left eye video information L1' through L4' . . . thus decompressed so that the complementary information R1' through R4' . . . for preparing the right eye video and the left eye video information L1' through L4' . . . are reproducible as a 3D video. After that, the information recording/reproducing device 1003 records, on the 3D conversion complementary information recording space 40C, the complementary information R1' through R4' . . . for preparing the right eye video and the left eye video information L1' through L4' . . . thus arranged (a recording step).

With the operations, it is possible to (i) arrange the 2D video content P' which has been recorded on the first information recording area 20A and the 3D conversion complementary information obtained by decompressing the compressed 3D conversion complementary information so that the 2D video content P' and the 3D conversion complementary information are reproducible as a 3D video, and (ii) record the 2D video content P' and the 3D conversion complementary information thus arranged on the 3D conversion complementary information recording space 40C and on the 2D video recording space 40D.

Next, the following description deals with another recording function of the 3D video viewing system 1.

First, as illustrated in FIG. 23, the Internet terminal device 127 receives the 3D conversion complementary information from the web server 129 via the Internet 128. In a case where the 3D conversion complementary information has been compressed, the Internet terminal device 127 decompresses such compressed 3D conversion complementary information, and transfers the 3D conversion complementary information thus decompressed to the control section 115 of the information recording/reproducing device 1003.

Then, the information recording/reproducing device 1003 causes the memory 116 to store (i) the 3D conversion complementary information received from the Internet terminal device 127 and (ii) the 3D conversion data arrangement information read out from the third information recording area 20B.

Next, the information recording/reproducing device 1003 reads out the 3D conversion data arrangement information from the memory 116. Then, in order to make it easy to reproduce a 3D video, the information recording/reproducing device 1003 records the left eye video information L1' through L4' . . . on the 3D conversion complementary information recording space 40C so that the 2D video recording spaces 40D are provided in respective positions between adjacent pieces of the left eye video information L1' through L4' . . . (as illustrated in (a) of FIG. 5), which constitute the 3D conversion complementary information.

Next, the information recording/reproducing device 1003 reads out the complementary information R1' through R4' . . . for preparing the right eye video, recorded on the first information recording area 20A, and causes the memory 116 to store the complementary information R1' through R4' . . . for preparing the right eye video.

Then, the information recording/reproducing device 1003 reads out the complementary information R1' through R4' . . . for preparing the right eye video and the 3D conversion data arrangement information, each of which is stored in the memory 116. Then, the information recording/reproducing device 1003 inserts pieces of the complementary information R1' through R4' . . . for preparing the right eye video in corresponding 2D video recording spaces 40D, respectively (as illustrated in (b) of FIG. 5), and records data thus obtained.

Each of the functions described above can be realized by use of a reproducing process program or a recording process program for causing the control section 115 (computer) to execute each of the functions. Such programs can be stored, for example, in the memory 116 or in an externally-attached hard disc (provided inside the information recording/reproducing device 1003).

With the arrangement, it is possible to cause the control section 115 to realize each of the functions described above by (i) reading out the reproducing process program or the recording process program stored in the information recording/reproducing device 1003 and (ii) causing the control section 115 to read such a program.

Further, the 3D video viewing system 1 can be arranged such that the 3D conversion complementary information is downloaded and recorded on the 3D conversion complementary information recording space 40C in accordance with the download information recorded on the third information recording area 20B of the optical disc 200.

Furthermore, the 3D video viewing system 1 can be arranged to obtain the download information by an instruction inputted by the user via the operation section 126.

With the arrangement, it is possible to download and record the 3D conversion complementary information on the 3D conversion complementary information recording space 40C of the optical disc 200 in accordance with the download information.

Moreover, the 3D video viewing system 1 can be arranged such that the 3D conversion data arrangement information recorded on the third information recording area 20B of the optical disc 200 is read out.

Further, the 3D video viewing system 1 can be arranged such that (i), by use of the 3D conversion complementary information thus read out, the 2D video content P' read out from the first information recording area 20A and the 3D conversion complementary information are arranged as illustrated in (b) of FIG. 5 so that the 2D video content P' and the 3D conversion complementary information are reproducible as a 3D video, and (ii) the 2D video content P' and the 3D conversion complementary information thus arranged are recorded on the 3D conversion complementary information recording space 40C and on the 2D video recording space 40D.

With the arrangement, it is possible to (i) arrange, by use of the 3D conversion data arrangement information, the 2D video content P' and the 3D conversion complementary information so that the 2D video content P' and the 3D conversion complementary information are reproducible as a 3D video, and (ii) record the 2D video content P' and the 3D conversion complementary information thus arranged on the 3D conversion complementary information recording space 40C and on the 2D video recording space 40D.

Accordingly, in a case where the 2D video content P' and the 3D conversion complementary information are arranged by use of the 3D conversion data arrangement information and recorded, as described above, it is unnecessary, for the purpose of reproducing a 3D video, to read out the 3D conversion complementary information from the 3D conversion complementary information recording space 40C of the optical disc 200, and record temporarily the 3D conversion complementary information thus read out. It is therefore possible to save, for recording data, a capacity of the memory 116 or a hard disc, which attached to the 3D video viewing system 1.

Further, the 3D video viewing system 1 can be arranged such that the compressed 3D conversion complementary information is decompressed by use of the decompressing process software recorded on the third information recording area 20B of the optical disc 200.

With the arrangement, it becomes substantially possible to record easily a 3D video obtained by causing the 2D video content P' (2D video) to be subjected to 3d conversion, in such a manner that (i) the decompressing process software is started up so as to decompress the compressed 3D conversion complementary information related to the 2D video content P', and (ii) the 3D conversion complementary information thus decompressed is recorded on the optical disc 200.

Further, this makes it possible to (i) read out the decompressing process software from the optical disc 200 to decompress the compressed 3D conversion complementary information and (ii) read out the 2D video content P' related to the compressed 3D conversion complementary information. It becomes therefore possible for the user to view a 3D video into which the 2D video content P' (2D video) is converted.

Furthermore, not the 2D video content P' but the compressed 3D conversion complementary information is delivered. Accordingly, it is possible to (i) convert the 2D video content P' into a 3D video easily, and (ii) record or view the 3D video into which easily, while significantly suppressing an increase in an amount of delivered information due to the 3D conversion. For example, according to an MPEG technique, it is possible to compress, without degradation of image quality, the 3D conversion complementary information by setting a compression rate to be within a range of approximately $1/50$ to approximately $1/200$.

Moreover, the 3D video viewing system 1 can be arranged to check whether or not the valid 3D conversion permission key is recorded on the third information recording area 20B of the optical disc 200 or the optical disc 201.

Further, the 3D video viewing system 1 can be arranged such that, in a case where the 3D conversion permission key is determined as being valid, (i) the 2D video content P' for which the 3D conversion is permitted by the 3D conversion permission key, and the 3D conversion complementary information related to the 2D video content P' are arranged so as to be reproducible as a 3D video, and (ii) the 2D video content P' and the 3D conversion complementary information thus arranged are recorded on the 3D conversion complementary information recording spaces 40C and the 2D video recording spaces 40D.

Furthermore, the 3D video viewing system 1 can be arranged such that, in a case where the 3D conversion complementary information has been compressed, (i) the 2D video content P' for which the 3D conversion is permitted by the 3D conversion permission key, and the left eye video information L1' through L4' . . . which is obtained by decompressing the compressed left eye video information L1' through L4' . . . , are arranged so as to be reproducible as a 3D video, and (ii) the 2D video content P' and the left eye video information L1' through L4' . . . thus arranged are recorded on the 3D conversion complementary information recording space 40C and the 2D video recording space 40D.

With the arrangement, the permission of the 3D conversion of the 2D video content P' is carried out by use of the 3D conversion permission key which has been recorded on the optical disc 200 or the optical disc 201. Accordingly, it is possible to disallow the 3D conversion for the 2D video content P' recorded on the information recording medium on which the valid 3D conversion permission key is not recorded.

For this reason, in a case where the valid 3D conversion permission key is not recorded on the information recording medium, it is possible to prevent the 2D video content P' from being converted into a 3D video by a user in an unauthorized manner. As a result, it is possible to prevent data of the 3D video into which the 2D video content P' is converted from being recorded on the information recording medium in the unauthorized manner. That is, it is possible to improve the security of the 3D video viewing system 1.

Further, the 3D video viewing system 1 can be arranged such that, in a case where the invalidation information is recorded on the invalidation information recording area (not illustrated) of the second information recording layer 40 of the optical disc 200 or the optical disc 201, (i) the download information corresponding to the invalidation information is determined as being invalid, and (ii) recording of the 3D conversion complementary information on the 3D conversion complementary information recording space 40C is cancelled.

With the arrangement, in a case where the 3D conversion complementary information or the 2D video content P' is not required by a user anymore, it is possible to (i) cause the download information to be invalid by use of the invalidation information, and (ii) record another content on the 3D conversion complementary information recording space 40C (and the 2D video recording space 40D), which has been used to record the 3D conversion complementary information thus downloaded.

Accordingly, for example, it is possible to prevent the optical disc 200 from being an optical disc which is completely unnecessary for the user after the user views the 2D content P', that is, an optical disc having an RE area in which a user data recording area cannot be used to record another content.

Figure 26:
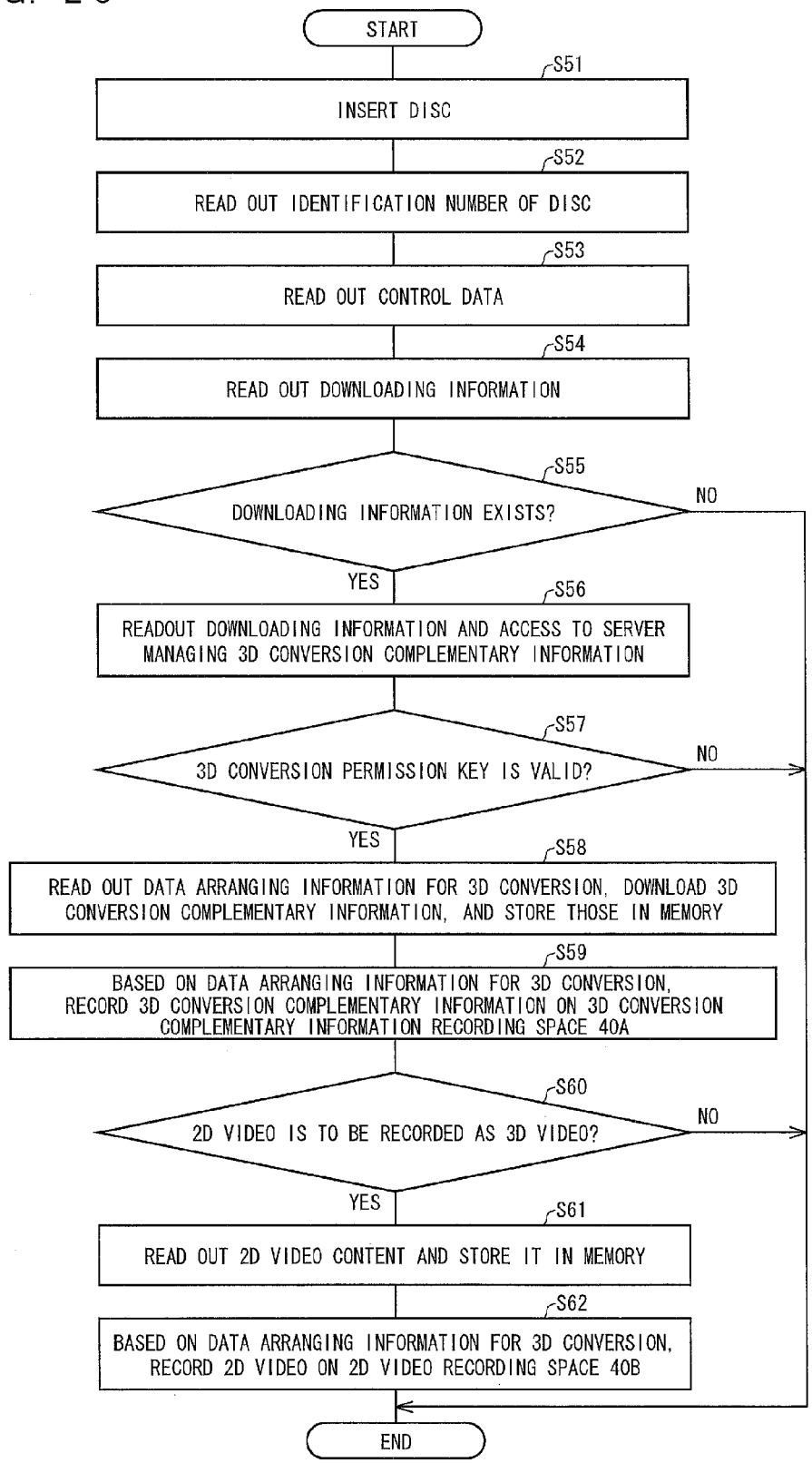
FIG. 26 is a flowchart illustrating an example of a process flow carried out by the information recording/reproducing device.

Next, the following description deals with how the 3D video viewing system 1 carries out a recording operation (storing operation) with reference to a flowchart of FIG. 26.

In a step S51 (hereinafter, the term "step" is omitted), a user loads the optical disc 200 to the information recording/reproducing device 1003. The process then proceeds to S52.

In S52, on receipt of an output (a disc loading signal) from the disc detecting section (medium detecting means) (not illustrated), the disc recognizing section 1157 transmits, to the memory control section 1151, a "medium detection notification" indicating the loading of the optical disc 200.

On receipt of the "medium detection notification" from the disc recognizing section 1157, the memory control section 1151 drives the data reproducing circuit 110 or the like to read the disc identification number out of the read-in area of the optical disc 200. Then, the memory control section 1151 causes the memory 116 to store the disc identification number. The process then proceeds to S53.

In S53, the memory control section 1151 drives the data reproducing circuit 110 or the like so as to read out control data (an OPC process: information necessary for "a step of Optimum Power Control" or a defect management process). Then, the memory control section 1151 causes the memory 116 to store the control data. The process then proceeds to S54.

In S54, the memory control section 1151 drives the data reproducing circuit 110 or the like to reproduce the third information recording area 20B of the optical disc 200, so as to start reading out the download information. The process then proceeds to S55.

In S55, in a case where the download information is recorded on the third information recording area 20B (YES in S55), the process proceeds to S56.

On the other hand, in a case where the download information is not recorded on the third information recording area 20B in S55 (NO in S55), the process proceeds to "END".

Next, in S56, the memory control section 1151 drives the data recording circuit 110 or the like to read out the download information from the third information recording area 20B. Then, the memory control section 1151 transmits the download information thus read out to the Internet communication control section 1155.

It is also possible to add, before the above step, a step in which the memory control section 1151 checks whether or not the invalidation information of the download information is recorded on the aforementioned invalidation information recording area of the second information recording layer 40.

In this case, if the invalidation information is recorded, the memory control section 1151 reads out the download information, and transmits the download information to the Internet communication control section 1155. On the other hand, if the invalidation information is not recorded, the process proceeds to "END".

Next, the Internet communication control section 1155 specifies, on the basis of the download information, a web server to be accessed (here, the web server 129 is specified, for example), and causes the Internet terminal device 127 to establish (access the web server 129) a connection between the Internet terminal device 127 and the web server 129.

Then, when the connection between the Internet terminal device 127 and the web server 129 is established, the Internet communication control section 1155 notifies the memory control section 1151 of the establishment of the connection (a connection establishment notification).

On receipt of the "connection establishment notification" from the Internet communication control section 1155, the memory control section 1151 drives the data reproducing circuit 110 or the like, to read out the 3D conversion permission key recorded on the third information recording area 20B of the optical disc 200.

Here, the valid 3D conversion permission key has been stored in the authentication condition recording section 1159 in advance.

Next, the memory control section 1151 transfers, to the writing control section 1154, the 3D conversion permission key read out from the third information recording area 20B. The process then proceeds to S17.

In S57, the authentication section 1158 of the writing control section 1154 checks whether or not the 3D conversion permission key received from the memory control section 1151 is identical with the valid 3D conversion permission key stored in the authentication condition recording section 1159.

In a case where the 3D conversion permission key is identical with the valid 3D conversion permission key, the authentication section 1158 determines that the 3D conversion permission key is "valid" (YES in S57). The process then proceeds to S58.

On the other hand, in a case where the 3D conversion permission key is not identical with the valid 3D conversion permission key, the authentication section 1158 determines that the 3D conversion permission key is "invalid" (NO in S58). The process then proceeds to "END".

In S58, the authentication section 1158 notifies the Internet communication control section 1155 that the downloading of the 3D conversion complementary information is permitted (a download permission notification).

Next, on receipt of the download permission notification, the Internet communication control section 1155 downloads the 3D conversion complementary information from the web server 129 via the Internet terminal device 127, and transfers the 3D conversion complementary information to the memory control section 1151.

Here, in a case where the 3D conversion complementary information is compressed, the Internet terminal device 127 causing the decompressing process software to start up, so as to decompress the compressed 3D conversion complementary information. After that, the Internet terminal device 127 transfers the 3D conversion complementary information thus decompressed to the memory control section 1151.

Next, the memory control section 1151 causes the memory 116 to store the 3D conversion complementary information received from the Internet terminal device 127. Then, the memory control section 1151 drives the data reproducing circuit 110 or the like to reproduce the third information recording area 20B of the optical disc 200, so as to read out the 3D conversion data arrangement information. After that, the memory control section 1151 causes the memory 116 to store the 3D conversion data arrangement information thus read out, and then notifies the writing control section 1154 of completion of the storing (a storage completion notification). The process then proceeds to S59.

In S59, on receipt of the "storage completion notification" from the memory control section 1151, the writing control section 1154 reads out the 3D conversion complementary information and the 3D conversion data arrangement information, each of which is stored in the memory 116. Here, in a case where the 3D conversion complementary information has been encoded, the decoding section 1160 reads out the 3D conversion complementary information from the memory 116, decodes the 3D conversion complementary information, and causes the memory 116 to store again the 3D conversion complementary information thus decoded.

Next, the writing instruction section 1161 of the writing control section 1154 drives the data recording circuit 119 or the like to record, in accordance with the 3D conversion data arrangement information, on the 3D conversion complementary information recording space 40C, the left eye video information L1' through L4' . . . constituting the 3D conversion complementary information read out from the memory 116, as illustrated in (a) of FIG. 5. The process then proceeds to S60.

In S60, in a case where the 2D video content P' is converted into a 3D video and then is recorded (YES in S60), the process proceeds to S61. On the other hand, in a case where the 2D video content P' is not converted into the 3D video and is not recorded (NO in S60), the process proceeds to "END".

In S61, the writing control section 1154 instructs the memory control section 1151 to drive the data reproducing circuit 110 or the like, so as to read out the 2D video content P' recorded on the first information recording area 20A of the optical disc 200. Then, the writing control section 1154 causes the memory 116 to store the 2D video content P'.

When the 2D video content P' is completely stored in the memory 116, the memory control section 1151 notifies the writing control section 1154 of the completion of the storing (a storage completion notification). The process then proceeds to S62.

In S62, on receipt of the "storage completion notification", the writing control section 1154 reads out, from the memory 116, the 2D video content P' and the 3D conversion data arrangement information. Then, the writing control section 1154 drives the data recording circuit 119 or the like, to record, in accordance with the 3D conversion data arrangement information, on the 2D video recording space 40D, the complementary information R1' through R4' . . . for preparing the right eye video constituting the 2D video content P', as illustrated in (b) of FIG. 5. The process then proceeds to "END".

Next, the following description deals with how a reproducing operation is carried out by the 3D video viewing system 1 with reference to a flowchart of FIG. 27.

First, in a step S71, a user loads the optical disc 200 to the information recording/reproducing device 1003. The process then proceeds to S72.

In S72, on receipt of an output from the disc detecting section (not illustrated), the disc recognizing section 1157 of the image recording/reproducing device 1003 transmits, to the memory control section 1151, the "medium detection notification" indicating the loading of the optical disc 200.

Next, on receipt of the "medium detection notification" from the disc recognizing section 1157, the memory control section 1151 drives the data reproducing circuit 110 or the like to read out the disc identification number from the read-in area of the optical disc 200. Then, the memory control section 1151 causes the memory 116 to store the disc identification number. The process then proceeds to S73.

In S73, the memory control section 1151 drives the data reproducing circuit 110 or the like to read out the control data (the OPC process: information necessary for "a step of Optimum Power Control" or a defect management process) from the read-in area of the optical disc 200. Then the memory control section 1151 causes the memory 116 to store the control data. The process then proceeds to S74.

In S74, the memory control section 1151 checks whether or not the 3D conversion complementary information has been already recorded on the 3D conversion complementary information recording space 40C of the optical disc 200. In a case where the 3D conversion complementary information has been already recorded on the 3D conversion complementary information recording space 40C (YES in S74), the process proceeds to S75.

On the other hand, in a case where the 3D conversion complementary information has not been recorded on the 3D conversion complementary information recording space 40C of the optical disc 200 (NO in S74), the process proceeds to S78. S78 is a step for waiting for an input from the operation section 126. The process then proceeds to "END".

Next, in S75, the memory control section 1151 drives the data reproducing circuit 110 or the like to read out the 3D conversion permission key recorded on the third information recording area 20B of the optical disc 200. Then, the memory control section 1151 transfers the 3D conversion permission key thus read out to the authentication section 1158.

The authentication section 1158 checks whether or not the 3D conversion permission key received from the memory control section 1151 is identical with the "valid 3D conversion permission key" stored in the authentication condition recording section 1159. In a case where the authentication section 1158 determines that the 3D conversion permission key is "valid" (YES in S75, the process proceeds to S76.

On the other hand, in a case where the authentication section 1158 determines that the 3D conversion permission key is "invalid" in S75 (NO in S75), the process proceeds to S78.

Next, in S76, the memory control section 1151 (i) reads out the 2D video content P' from the first information recording area 20A of the optical disc 200, (ii) reads out the 3D conversion data arrangement information from the third information recording area 20B, and (iii) causes the memory 116 to store the 2D video content P' and the 3D conversion data arrangement information thus read out.

Further, the memory control section 1151 reads out the 3D conversion complementary information recorded on the 3D conversion complementary information recording space 40C of the optical disc 200, and causes the memory 116 to store the 3D conversion complementary information thus read out. The process then proceeds to S77.

In S77, the memory control section 1151 reads out, from the memory 116, (i) the complementary information R1' through R4' . . . for preparing the right eye video, constituting the 2D video content P', (ii) the left eye video information L1' through L4' . . . , constituting the 3D conversion complementary information, and (iii) the 3D conversion data arrangement information. Then, the memory controls section 1151 arranges and synchronizes, in accordance with the 3D conversion data arrangement information, the complementary information R1' through R4' . . . for preparing the right eye video and the left eye video information L1' through L4' . . . . After that, the memory control section 1151 outputs a 3D video of these to the display section 4.

The display section 4 outputs (i) the right eye video 6R obtained from the complementary information R1' through R4' . . . for preparing the right eye video and (ii) the left eye video 6L obtained from the left eye video information L1' through L4' . . . , so as to reproduce the 3D video. The process then proceeds to "END".

In the process described above, the memory control section 1151 reads out the 2D video content P' in S76. However, it is also possible to have such an arrangement that the memory control section 1151 does not read out the 2D video content P' in S76.

In this case, in S77, the memory control section 1151 (i) reads out, from the memory 116, the left eye video information L1' through L4' . . . , constituting the 3D conversion complementary information, and the 3D conversion data arrangement information, and (ii) reads out the complementary information R1' through R4' . . . for preparing the right eye video from the first information recording area 20A. Then, the memory control section 1151 arranges and synchronizes, in accordance with the 3D conversion data arrangement information, the complementary information R1' through R4' . . . for preparing the right eye video and the left eye video information L1' through L4' . . . thus read out.

After that, the memory control section 1151 outputs a 3D video of these to the display section 4.

The present invention can also be expressed as described below.

That is, an information recording medium of the present invention can be constituted by a combination disc (a multi-layer optical information recording medium made of a ROM layer and an RE layer (or an R layer)).

Further, a +α moving image (complementary information) can be recorded on the ROM layer, which +α moving image is used to convert a 2D video (which is to be recorded on the RE layer) into a 3D video.

Moreover, a method of using an information recording medium can be as described below.

First, a user records, on the RE layer, a 2D video obtained from a TV broadcast (a broadcast content).

In a case where the user reproduces a 3D video, the +α moving image is reproduced from the ROM layer by use of a 3D information recording/reproducing device, and is stored in a cache (a temporary recording memory).

After that, the RE layer is reproduced, and the 2D video and the +α moving image are combined with each other. Then, the 2D video and the +α moving image thus combined are supplied to a 3D compatible TV.

Further, a TV broadcast is recorded only on a predetermined 2D data area in the RE layer so that the recorded data is in a format with which the 3D video can be easily displayed, that is, the data is recorded ultimately as 2D, +α, 2D, +α . . . (sets of 2D and +α).

Next, the +α moving image of the ROM layer is temporarily stored in a cache or a hard disc, and then, is inserted into a predetermined +α data position in the RE layer. As a result, the data is recorded in the format with which the 3D video can be easily displayed, that is, the data is recorded as 2D, +α, 2D, +α . . . . Recording process software for recording data on the RE layer can be recorded on the ROM layer, or on a predetermined recording medium provided inside the information recording/reproducing device.

Further, it is possible that decompressing process software for decompressing a data broadcast (on a premise that data for converting the TV broadcast into a 3D video is broadcasted as being in a compressed state) is recorded on the ROM layer, which data broadcast is broadcasted at the same time as the TV broadcast (2D video).

Furthermore, although being away from the combination disc, the decompressing process software can be recorded in the information recording/reproducing device. In this case, the reproduction is carried out in a chasing manner, so as to allow the user to view a 3D broadcast substantially.

It is possible that software for converting a 2D video into a pseudo 3D video, or software for converting 2D photo data into a pseudo 3D data for a 3D photo frame has also been recorded on the ROM layer.

Moreover, the present invention can be expressed as described below.

That is, a disc structure (see FIGS. 4 and 15) of an information recording medium of the present invention can have any of the following arrangements.

(1) An RE layer, an intermediate layer made from a transparent resin, a ROM layer, and a cover layer are provided on a substrate in this order.

(2) On a data area of the ROM layer, a +α moving image for converting, into a 3D video, a 2D video of a predetermined TV program to be broadcasted, is recorded.

(3) Presetting information for recording the predetermined TV program on the RE layer can be recorded on the ROM layer.

(4) It is possible that arranging process software has been recorded on the ROM layer. The arranging process software allows the RE layer to have an area with which the predetermined TV program can be easily reproduced as a 3D video. For example, the arranging process software makes it possible to record the 2D video so that positions for recording the +α moving image are inserted, as spaces, into the 2D video. In this case, the 2D video and the +α moving image are ultimately recorded as 2D, +α, 2D, +α . . . .

(5) A 3D conversion permission key which permits a 2D TV broadcast to be converted into a 3D video can be recorded on the ROM layer.

Further, a structure (see FIGS. 15 through 17) of an information recording/reproducing device of the present invention can be as described below.

(1) The information recording/reproducing device includes at least (i) an information recording/reproducing mechanism (a group of recording/reproducing circuits) and (ii) a cache or a hard disc.

(2) The information recording/reproducing device has such a function that, in a case where a recorded TV program is converted into a 3D video and is reproduced, a +α moving image recorded on the ROM layer of the information recording medium is temporarily stored in the cache or the hard disc, and then is supplied to a 3D compatible TV simultaneously with reproduction information received from the RE layer.

(3) Alternatively, the information recording/reproducing device has such a function that (i) in accordance with arranging process software which has been originally recorded on the ROM layer or in the information recording/reproducing device, a TV broadcast is recorded so that +α recording spaces are inserted into the TV broadcast, as a result, (ii) the TV broadcast is recorded in an arrangement with which a 3D video of the TV broadcast can be easily reproduced, after that, (iii) the +α moving image recorded on the ROM layer of the information recording medium is automatically stored in the cache or the hard disc (temporarily), and ultimately, (iv) the +α moving image is recorded on +α recording spaces of the RE layer of the information recording medium.

Moreover, an information recording/reproducing device (3D compatible TV) of the present invention may have such a function that, in a case where a set of a 2D video and a +α moving image for 1 frame are inputted sequentially, a 3D video can be displayed.

Further, basic operations of the 3D compatible TV can be as described below.

(1) A user loads the information recording medium into the information recording/reproducing device which is compatible with the information recording medium.

(2) The information recording/reproducing device reproduces management information of an inner circumference, for example, so as to recognize that no content is recorded on the RE layer.

(3) The information recording/reproducing device reads out presetting information recorded on the ROM layer (in a case where the presetting information is recorded on the ROM layer).

(4) The information recording/reproducing device determines, by use of a clock provided in the information recording/reproducing device, whether or not a current data and time is identical with a data and time of a preset recording.

(5) In a case where the current date and time is not identical with the date and time of the preset recording, the information recording/reproducing device becomes in a preset recording waiting state in accordance with the presetting information.

(6) When the TV broadcast is started, the TV program is recorded on a recording area of the information recording medium in accordance with the presetting information.

(7) In a case where the information recording medium is reproduced after the recording is finished, first, the +α moving image recorded on the ROM layer is temporarily stored in the cache or the hard disc in accordance with user's selection.

(8) After that, a content, which has been recorded on the RE layer of the information recording medium by use of the information recording/reproducing mechanism of the information recording/reproducing device, is reproduced, and simultaneously, the +α moving image stored in the cache or the hard disc is outputted. This makes it possible to output the content and the +α moving image, as a 3D video, to the 3D compatible TV. It is possible to carry out, when the reproduction is carried out, an authentication operation for permitting 3D conversion editing by use of the 3D conversion permission key of the ROM layer.

Furthermore, the 3D compatible TV can carry out the following operations in addition to the aforementioned basic operations.

(A) When the recording (basic operation (6)) is carried out, the 3D compatible TV records, in accordance with the arranging process software which has been originally recorded on the ROM layer or in the information recording/reproducing device, the TV program so that the +α recording spaces are inserted into the TV program, that is, the TV program is to be ultimately recorded in a format with which a 3D video can be easily reproduced. After that, automatically, the +α moving image recorded on the ROM layer of the information recording medium is stored temporarily in the cache or the hard disc, and then is recorded on the +α recording spaces of the RE layer of the information recording medium.

In this case, the basic operations (7) and (8) are unnecessary, and 3D data is outputted by only reproducing the RE layer of the information recording medium (for example, it becomes possible to carry out 3D reproduction by use of only a 3D BD-ROM compatible player).

(B) The aforementioned recording (A) on the RE layer can be carried out in such a manner that (i) the TV broadcast is temporarily stored in the cache or the hard disc, and then, (ii) the +α moving image recorded on the ROM layer is further temporarily stored in the cache or the hard disc, and after that, (iii) the TV program and the +α moving image are arranged and recorded so that so that a 3D video can be outputted easily, i.e., the TV program and the +α moving image are recorded in a format of 2D, +α, 2D, +α . . . .

(C) The presetting information of the basic operation (3) can be inputted by the user.

Further, the present invention can be expressed as described below.

A disc structure (see FIGS. 4 and 15) of an information recording medium of the present invention can be as described below.

(1) An RE layer, an intermediate layer made from a transparent resin, a ROM layer, and a cover layer are provided on a substrate in this order.

(2) Decompressing process software (unpacking process software) is recorded on a data area of the ROM layer. The decompressing process software can decompress (unpack) compressed data of the +α moving image broadcasted as a data broadcast.

(3) A 3D conversion permission key for permitting 3D conversion editing of a 2D TV broadcast can be recorded on the ROM layer.

Furthermore, a structure (see FIGS. 15 through 17) of an information recording/reproducing device of the present invention can be as described below.

(1) The information recording/reproducing device includes at least (i) an information recording/reproducing mechanism and (ii) a cache or a hard disc.

(2) The information recording/reproducing device includes (i) a mechanism for separating a TV broadcast into a main broadcast part and a data broadcast part, and (ii) a route for processing and recording the main broadcast part and route for processing and recording the data broadcast part.

(3) The information recording/reproducing device includes a decompressing process mechanism which (i) at least temporarily stores the decompressing process software reproduced by the information recording/reproducing device and (ii) decompresses externally-supplied compressed data.

(4) The information recording/reproducing device includes a cache in which data, obtained by decompressing the data of the main broadcast part by use of another decompressing mechanism different from the above decompressing mechanism, can be temporarily stored.

(5) The information recording/reproducing device includes a mechanism which (i) arranges and synchronizes data inputted via the aforementioned 2 recording routes so that a format of the data becomes such that a 3D video can be easily reproduced from the data, that is, the format of the data becomes such that 2D, +α, 2D, +α . . . , and (ii) supplies the data thus arranged and synchronized to the information recording/reproducing mechanism.

(6) The information recording/reproducing device has such a function that, when the 3D reproduction is carried out, the data recorded on the RE layer of the information recording medium is reproduced, and is outputted to the information recording/reproducing device (3D compatible TV).

Moreover, an information recording/reproducing device (3D compatible TV) of the present invention can have such a function that, in a case where a set of a 2D video and a +α moving image for 1 frame are inputted sequentially, a 3D video can be displayed.

Furthermore, basic operations of the 3D compatible TV can be as described below.

(1) A user loads an information recording medium into the information recording/reproducing device which is compatible with the information recording medium.

(2) The information recording/reproducing device reproduces management information of an inner circumference so as to recognize that no content is recorded on the RE layer.

(3) The information recording/reproducing device reads out presetting information recorded on the ROM layer (in a case where the presetting information is recorded on the ROM layer).

(4) The information recording/reproducing device determines, by use of a clock provided inside the information recording/reproducing device, whether or not a current date and time is identical with a date and time of a preset recording.

(5) In a case where the current date and time is not identical with the date and time of the preset recording, the information recording/reproducing device becomes in a preset recording waiting state in accordance with the presetting information.

(6) In a case where the current date and time is determined, by use of the clock provided inside the information recoding/reproducing device, as being several minutes before the date and time of the preset recording, the information recording/reproducing device reproduces the ROM layer of the information recording medium, and stores the decompressing process software in the above mechanism (3).

(7) When the TV broadcast is started, the TV broadcast is supplied to the information recording/reproducing device in accordance with the presetting information so as to be recorded on the RE layer of the information recording medium.

(8) The TV broadcast thus supplied is separated into the main broadcast part and the data broadcast part by the above mechanism (2), and these parts thus separated are supplied to corresponding recording process routes, respectively.

(9) The data of the main broadcast part is decompressed by a normal decompressing mechanism (decompressed into a 2D video), and is temporarily stored in the above cache (4) (adjustment of a time difference due to a difference in compression rate between the main broadcast part and the data broadcast part).

(10) The compressed data of the data broadcast part is decompressed by the above mechanism (3) (decompressed into the +α moving image for a 3D video).

(11) After that, the above mechanism (5) supplies 3D video data (2D, +α, 2D, +α . . . ) to the information recording/reproducing mechanism.

(12) The 3D video data supplied to the information recording/reproducing mechanism in the above (11) is recorded on the RE layer of the information recording medium sequentially. When the TV broadcast is finished, the recording is finished.

(13) When a 3D video is reproduced, the RE layer of the information recording medium is reproduced, and the 3D video data is supplied to the 3D compatible TV.

(14) Further, when the recording is carried out with respect to the information recording medium, it is possible to further carry out an authentication operation for permitting 3D conversion editing by use of the 3D conversion permission key recorded on the ROM layer.

Moreover, the 3D compatible TV can carry out the following operations in addition to the aforementioned basic operations.

(A) The decompressing process software recorded in the basic operation (6) can be originally recorded in the information recording/reproducing device in advance.

(B) In the basic operation (11), the 3D video data can be supplied to either an HDD or the 3D compatible TV.

With the operations described above, it becomes possible to view a 3D video of a TV program which cannot be viewed as a 3D video originally. Further, it becomes possible to manufacture a 3D compatible disc based on the TV broadcast (it becomes possible to lend such a disc to others). Furthermore, it is possible to use such a disc in editing the TV program into a 3D video in an authorized manner.

Further, the present invention can be expressed as described below.

That is, an information recording medium of the present invention which is readable to read out various information therefrom, may include a first information recording area on which a first content is recorded in advance, and a second information recording area on which a second content which is two-dimensional video information is recordable, the first content being complementary information for use in converting the second content into a three-dimensional video.

Further, the information recording medium of the present invention may be arranged such that the first information recording area is a read-only area.

Furthermore, the information recording medium of the present invention can be arranged such that information is recorded on the first information recording area, which information is used to arrange and record the first content and the second content on the second information recording area so that the first content and the second content are outputted easily as three-dimensional video information.

Moreover, the information recording medium of the present invention can be arranged such that presetting information for use in recording the second content on the second information recording area is recorded on the first information recording area.

Further, a method of reproducing an information recording medium, of the present invention, includes the steps of: first, causing a temporary recording medium provided in the information recording/reproducing device to store the first content recorded on the first information recording area, in a case where a three-dimensional video is reproduced; and causing (i) the first content outputted from the temporary recording medium and (ii) the second content outputted in such a manner that the second content recorded on the second information recording area is reproduced, to be synchronized with each other, and outputting the first content and the second content thus synchronized to an outside.

Furthermore, an information recording medium recording/reproducing device of the present invention may include a program for carrying out the aforementioned method of reproducing an information recording medium.

Moreover, an information recording medium of the present invention which is readable to read out various information therefrom, may include: a first information recording area on which a first content is recorded in advance; and a second information recording area on which a second content which is a two-dimensional video is recordable, the first content being a program for decompressing complementary information for use in converting a compressed second content into a three-dimensional video.

Further, the information recording medium of the present invention can be arranged such that the first information recording area is a read-only area.

Furthermore, the information recording medium of the present invention can be arranged such that information is recorded on the first information recording area, which information is used to arrange and record the first content and the second content on the second information recording area so that the first content and the second content are easily outputted as three-dimensional video information.

Moreover, a method for recording information on the information recording medium, of the present invention, includes the steps of: separating externally-obtained data into two-dimensional video information and compressed complementary information for converting the two-dimensional information into a three-dimensional video; causing a temporary memory provided in a recording/reproducing device to store the two-dimensional video information; decompressing the compressed complementary information; and causing complementary information thus decompressed and the two-dimensional video information outputted from the temporary medium to be synchronized with each other so that the complementary information and the two-dimensional video information are recorded, on an information medium, in a format with which a three-dimensional video is reproduced easily.

Further, in addition to the arrangement described above, the information recording/reproducing device of the present invention may further include input means for inputting an instruction to cancel a recording preset for recording the broadcast content on the second information area of the broadcast content, the invalidation information being recorded on the second information recording area in a case where the instruction to cancel the recording preset is inputted via the input means.

With the arrangement, in a case where the broadcast content to be recorded based on the presetting information is not in accordance with user's expectation, it is possible to prevent such a broadcast content from being recorded on the information recording medium of the present invention, by recording the invalidation information on the information recording medium of the present invention. Accordingly, it is possible to enhance convenience of the user of the information recording/reproducing device.

Further, in addition to the arrangement described above, the information recording/reproducing device of the present invention may further include a recording section which records, in a case where there are plurality of information recording mediums, (i) the presetting information recorded on the first information recording area of the information recording medium, and (ii) correspondence relationship information indicating a correspondence relationship between the presetting information and the information recording medium, the presetting information corresponding to the information recording medium being deleted from the recording section on the basis of the correspondence relationship information, in a case where the invalidation information is recorded on the second information recording area of the information recording medium.

With the arrangement, the presetting information corresponding to the information recording medium on which the invalidation information is recorded is deleted from the recording section. Accordingly, it is possible to prevent such a malfunction that a broadcast content whose content is not in accordance with user's expectation is accidentally recorded on the information recording medium.

Further, with the arrangement, the information recording/reproducing device of the present invention can ignore (determine as being invalid) the presetting information corresponding to the broadcast content which is not in accordance with user's expectation, which broadcast content is recorded on the information recording medium on which the invalidation information is recorded. Accordingly it is possible to cause the information recording/reproducing device to recognize the second information recording area, on which the broadcast content is to be recorded, as a recording area on which normal recording can be carried out.

It is therefore possible to cause the second information recording area corresponding to the presetting information to record another content.

Moreover, the present invention can be expressed as described below.

That is, an information recording medium of the present invention includes a combination disc (a multi-layer optical disc constituted by a ROM (read-only) layer and an RE (recording/reproducing) layer) (the RE layer can be replaced with an R layer).

A 2D moving image to be recorded on the RE layer is recorded on the ROM layer.

A method of using the information recording medium is as described below. First, a user causes the RE layer to record a +α moving image for a 3D video, which is obtained via the Internet or the like. Then, in a case where the +α moving image is reproduced as a 3D video, an information recording/reproducing device which is compatible with the 3D video is used to reproduce, from the RE layer, the +α moving image for a 3D video, and causes a cache (a temporary memory) to store the +α moving image for a 3D video thus reproduced. After that, the ROM is reproduced, so that the 2D moving image and the +α moving image for a 3D video are combined with each other and are outputted to a 3D compatible TV.

Further, the +α moving image for a 3D video, obtained via the Internet or the like, is recorded on only +α data positions so that the +α moving image for a 3D video is ultimately recorded in such a format that 2D, +α, 2D, +α . . . (a set of 2D and +α for each frame). With this format, it is possible to display the 3D video easily.

Next, the 2D moving image recorded on the ROM layer is temporarily stored in the cache, a hard disc, or the like. Then, the 2D moving image is recorded on 2D moving image data positions of the RE layer so that the 2D moving image is recorded in such a format that 2D, +α, 2D, +α . . . . With this format, it is possible to display a 3D video easily. Software used to record the RE layer can be recorded on the ROM, or can be provided in the information recording/reproducing device (in this case, reproduction can be carried out on a 3D BD-ROM compatible player).

Further, decompressing process software for decompressing the +α moving image for a 3D video can be recorded on the ROM layer. Furthermore, although being away from the combination disc, the decompressing process software can be recorded in the information recording/reproducing device.

Moreover, a disc structure (see FIG. 4) of an information recording medium of the present invention can be as described below.

(1) An RE layer, an intermediate layer made from a transparent resin, a ROM layer, and a cover layer are provided on a substrate in this order.

(2) A 2D moving image to be delivered is recorded on a data area of the ROM layer.

(3) Download information for recording, on the RE layer, the +α moving image for a 3D video, can be recorded on the ROM layer.

(4) Arranging process software can be recorded on the ROM layer, which arranging process software makes it possible to arrange and record the +α moving image for a 3D video on the RE layer so that spaces are inserted, as 2D moving video recording positions, into the +α moving image a 3D video, i.e., in a format of 2D, +α, 2D, +α . . . . With the format, it is possible to reproduce the +α moving image and the 2D moving video as a 3D video easily.

(5) A 3D conversion permission key for permitting editing of a 2D moving image into a 3D video can be recorded on the ROM layer.

Further, a structure (see FIG. 23) of an information recording/reproducing device of the present invention can be as described below.

(1) The information recording/reproducing device includes at least (i) an information recording/reproducing mechanism and (ii) a cache or a hard disc.

(2) The information recording/reproducing device has such a function that, in a case where a recorded 2D moving image is reproduced as a 3D video, the +α moving image recorded on the RE layer of the information recording medium (i) is temporarily stored in the cache or the hard disc, and then (ii) is combined with reproducing information recorded on the ROM layer, and (iii) is outputted to a 3D compatible TV.

(3) Alternatively, the information recording/reproducing device has the following function. That is, in accordance with 3D conversion data arranging process software recorded on the ROM layer or 3D conversion data arranging process software which has been originally recorded in the information recording/reproducing device itself, the information recording/reproducing device arranges 3D conversion complementary information obtained via the Internet or the like so that 2D video recording spaces are inserted into the 3D conversion complementary information, that is, the 3D conversion complementary information is arranged so that a 3D video can be easily displayed ultimately. Then, the information recording/reproducing device records the 3D conversion complementary information thus arranged. After that, automatically, the 2D moving image recorded on the ROM layer of the information recording medium is temporarily stored in the cache or the hard disc, and then is recorded in the 2D video recording spaces of the RE layer of the information recording medium.

Further, a 3D compatible TV related to an information recording/reproducing device of the present invention can have such a function that, in a case where a set of a 2D moving image and a +α moving image for a 3D video, for 1 frame, is inputted sequentially, it is possible to display a 3D video.

Furthermore, basic operations of the information recording/reproducing device of the present invention can be as described below.

(1) A user loads the information recording medium into the information recording/reproducing device.

(2) In accordance with download information which has been obtained via the Internet and recorded on the ROM layer, the information recording/reproducing device makes a connection with a server which manages a +α moving image for converting a 2D video recorded on the ROM layer into a 3D video (in a case where the 2D video is recorded in the ROM layer).

(3) After the connection is made, downloading is started by use of a 3D conversion permission key (an authentication key) recorded on the ROM layer.

(4) In accordance with arrangement information recorded on the ROM layer, the information thus downloaded is recorded on the RE layer so that 2D video recording spaces are inserted into the information thus downloaded, that is, the information thus downloaded is recorded so that a 3D video can be easily reproduced ultimately. After the recording is carried out, the RE layer of the information recording medium is reproduced, so that a 3D video is outputted to the 3D compatible TV.

Further, the information recording/reproducing device of the present invention can carry out the following operations in addition to the basic operations described above.

(A) Only the +α moving image for converting a 2D video into a 3D video is recorded on the RE layer. When the 3D video is reproduced, first, the RE layer is reproduced, so as to store temporarily the +α moving image in the cache or the hard disc. After that, the 2D video recorded on the ROM layer is temporarily stored in the cache or the hard disc. Then, the data stored in the cache is reproduced while the ROM layer is reproduced. Both pieces of data are synchronized so that the pieces of data are arranged such that 2D, +α, 2D, +α . . . (which is a format with which a 3D vide can be reproduced easily). Then, the data thus arranged is outputted to the 3D compatible TV.

(B) The download information for recording the +α moving image on the RE layer can be inputted by a user.

Further, the present invention can be also expressed as described below.

That is, a method of the present invention, for reproducing an information recording medium, which includes a first information area on which a first content which is two-dimensional video information is recorded in advance, and a second information area on which a second content is recordable, the second content being complementary information for converting the first content into a three-dimensional video, includes the steps of: first, causing a temporary recording medium provided in the recording/reproducing device to store the second content recorded on the second information area; and causing the second content outputted from the temporary recording medium and the first content, which is outputted by reproducing the first content recorded on the first information area, to be synchronized with each other, and outputting the first content and the second content thus synchronized to an outside.

Furthermore, an information recording/reproducing device of the present invention can record, inside the information recording/reproducing device itself, a program for causing a computer to carry out each of the steps of the method for reproducing an information recording medium.

With the arrangement, it is possible to use a ROM disc (an information recording medium) to distribute a 3D moving image, which ROM disc originally cannot distribute such a 3D moving image.

Moreover, by downloading the +α moving image for 3D conversion via the Internet, it becomes possible to manufacture a 3D compatible disc (an information recording medium) (that is, it becomes possible to lend others such a 3D compatible disc, for example).

Further, it is possible to edit the 2D moving image recorded on the ROM into a 3D video in an authorized manner.

Lastly, each of blocks of the 3D video viewing system 1 (the information recording/reproducing device 1001, the information recording/reproducing device 1002, and the information recording/reproducing device 1003), particularly, the control section 115, can be constituted by a hardware logic or realized by software by use of a CPU as described below.

That is, the 3D video viewing system 1 (the information recording/reproducing device 1001, the information recording/reproducing device 1002, and the information recording/reproducing device 1003) includes: the CPU (central processing unit) which executes an instruction of a control program realizing each of the functions described above; a ROM in which the program is stored; a RAM (random access memory) which develops the program; a storage device (storage medium), such as a memory, in which the program and various kinds of data are stored; and the like.

Further, the object of the present invention can be achieved in the following manner: (i) a storage medium for computer-readably storing a program code (an execute form program, intermediate code program, or source program) of the 3D video viewing system 1 (the information recording/reproducing device 1001, the information recording/reproducing device 1002, and the information recording/reproducing device 1003), which is software for realizing the aforementioned functions, is provided to the 3D video viewing system 1 (the information recording/reproducing device 1001, the information recording/reproducing device 1002, and the information recording/reproducing device 1003), and (ii) a computer (or a CPU or a MPU (Micro processing unit)) of the 3D video viewing system 1 reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs, MOs, MDs, DVDs, and CD-Rs; cards, such as IC cards (including memory cards) and optical cards; and semiconductor memories, such as mask ROMs, EPROMs, EEPROMs, and flash ROMs.

Further, the 3D video viewing system 1 (the information recording/reproducing device 1001, the information recording/reproducing device 1002, and the information recording/reproducing device 1003) can be made connectable to a communication network, and the program code can be supplied via the communication network. The communication networks are not limited to specific means. Examples of the communication network encompass the Internet, an intranet, an extranet, a LAN, an ISDN, a VAN, a CATV (Cable television Service) communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE 1394 standard, a USB line, a power line, a cable TV line, a telephone line, an ADSL line, and the like, as the transmission medium. Moreover, it is possible to use (i) a wireless line utilizing an infrared ray used in IrDA (Infrared Data Association) and a remote controller, (ii) a wireless line which is in compliance with a Bluetooth standard (registered trademark) or an IEEE802.11 wireless standard, and (iii) a wireless line utilizing an HDR, a mobile phone network, a satellite line, a terrestrial digital network, and the like, as the transmission medium. Note that the present invention can be realized as a computer program encoded in a computer-readable storage medium. The computer program realizes the function of each of means of the information managing apparatus, in a case where the computer-readable storage medium is supplied to a computer and is carried out by the computer.

Moreover, the present invention can be expressed as follows.

The information recording medium according to the present invention may be configured such that the first information recording area is a read-only area.

With this configuration in which the first information recording area is a read-only area, that is, a non-writable area, it is possible to prevent such a misoperation of erroneously overwriting the complementary information (or arrangement process information) with another data.

Moreover, this configuration makes it possible to write information into the information recording medium during the production of a stamper. This makes it possible to perform mass distribution with lower cost and shorter time, compared with a case where information is distributed by means of the information recording medium in which the information is stored after the production of the information recording medium, or with a case the information is distributed via the Internet or the like.

The information recording medium according to the present invention may be configured such that arrangement process information is recorded on the first information recording area in advance, the arrangement process information being information for use in (i) arranging the two-dimensional video content and the complementary information (or complementary information obtained by decompressing the compressed complementary information) such that the two-dimensional video content and the complementary information are reproducible as the three-dimensional video and (ii) recording, on the second information recording area, the two-dimensional video content and the complementary information thus arranged.

With this configuration, it is possible to record, in the second information recording area, the two-dimensional video content and the complementary information arranged by use of the arrangement process information in such an arrangement that the two-dimensional video content and the complementary information can be reproduced as the three-dimensional video easily.

By recording in the secondary information recording area the two-dimensional video content and the complementary information (or complementary information obtained by decompressing the compressed complementary information) thus arranged, the three-dimensional video can be reproduced without the need of reading out and then temporarily storing the complementary information in order to perform the three-dimensional video reproduction. This allows to save recording capacities of a memory or hard disc provided to an information recording/reproducing device for the information recording medium of the present invention.

Here, the "arrangement process" is a process to (i) divide the two-dimensional video content into a plurality of divided pieces thereof in case where there are plural pieces of complementary information, and (ii) insert the plural pieces of complementary information between adjacent divided pieces of the two-dimensional video content in such a manner that complementary information relating to one divided piece of the two-dimensional video content is inserted between the one divided piece and a next divided piece of the two-dimensional video content, which next divided piece follows the one divided piece, thereby arranging the plurality of divided pieces of the two-dimensional video content and the plural pieces of complementary information are arranged alternatively. This kind of process, for example, makes it possible to record a broadcast content in such a way that the broadcast content as it is can be easily reproduced by three-dimensional reproduction.

Moreover, the "arrangement process information" may be data for use in the arrangement process, such as data indicating recording start positions and recording end positions of the respective divided pieces of the two-dimensional video content and the respective pieces of complementary information to be thus alternatively arranged. As one alternative, the "arrangement process information" may be an arrangement process program for performing a process for (i) providing a recording space between the one divided piece and the next divided piece of the two-dimensional video content, and (ii) inserting the piece of the complementary information relating to the one divided piece, thereby making the alternative arrangement of the respective divided pieces of the two-dimensional video content and the respective pieces of the complementary information.

Moreover, the information recording medium according to the present invention may be configured such that presetting information is recorded on the first information recording area in advance, the presetting information being information for use in presetting a recording of the two-dimensional video content on the second information recording area.

With this configuration, for example, presetting information regarding a broadcast content corresponding to the complementary information (or complementary information obtained by decompressing the compressed complementary information) can be stored on the information recording medium in producing the information recording medium. This makes it unnecessary for a user to record on the information recording medium the presetting information for the broadcast content somehow.

Moreover, if the information recording/reproducing device is configured such that it can record the broadcast content by referring to the presetting information when the broadcast content is broadcasted, the broadcast can be recorded the second information recording area, provided that the recording medium is loaded on the information recording/reproducing device. This eliminates the need of user's operation to preset the recording of the broadcast.

Moreover, the information recording medium according to the present invention may be configured such that the second information recording area has an invalidation information recording area on which invalidation information is recordable, the invalidation information being information for use in canceling the recording preset by the presetting information for recording the two-dimensional video content on the second information recording area.

This configuration allows the user to invalidate the presetting information by using the invalidation information if the two-dimensional video content whose recording is preset by the presetting information is one not satisfying the user. This makes it possible to record another content in the recording area spared for the preset recording.

Thus, for example, it is possible to prevent the information recording medium from being such a totally unnecessary information recording medium for the user that stores the present information but is not rewritable with another content after the broadcast of the preset broadcast content.

The "invalidation information" is information for use in canceling the recording preset by the presetting information for recording the two-dimensional video content on the second information recording area. For example, it may be so arranged that the recording of the two-dimensional video content on the second information recording area thus preset by the presetting information will not carried out if the invalidation information is recorded on the information recording medium. As one alternative example, it may be so arranged that, if the invalidation information is recorded on the information recording medium, the recording area spared for the recording preset by the presetting information can be used for recording another content.

As described above, there is a case that converting a general distributed two-dimensional video content into a three-dimensional video falls under editing the two-dimensional video content, or the like act.

Thus, the conversion of a two-dimensional video content into a three-dimensional video is associated with such a subsidiary problem that for example, the conversion of a broadcast content into a three-dimensional video might require precaution not to infringe a copyright, a neighboring right, etc. of the broadcast content.

In view of this, it is necessary to develop a scheme or the like to allow a user to perform the conversion of a two-dimensional video into a three-dimensional video without worrying out a copyright, a neighboring right, etc.

To encounter this problem, the information recording medium according to the present invention may be configured such that permission information is recorded on the first information recording area in advance, the permission information indicating that conversion of the two-dimensional video content into the three-dimensional video is permitted.

With this configuration, the permission information prerecorded in the information recording medium is information to indicate warranty to convert into a three-dimensional video the two-dimensional video content obtained externally via broadcasting, Internet distribution, or the like, that is, information that warrants user's 3D conversion of the two-dimensional video content.

Thus, if the information recording medium in which the permission information prerecorded in the first information recording area is used in converting the two-dimensional video content into three-dimensional video, it is possible for the user to perform the 3D conversion of the two-dimensional video content without worrying out a copyright, a neighboring right, etc.

Moreover, the complementary information recorded on the first information recording area of the information recording medium, in which the permission information has been recorded on the first information recording area, assures that the two-dimensional video content is created by a rightful broadcast station, a distribution site, or the like. It is therefore possible to carry out the 3D conversion of the two-dimensional video content in a way to satisfy user's preference as long as permitted by a service provided by the broadcast station, distribution site, or the like.

The "3D conversion or conversion into a three-dimensional video" is, for example, to reproduce, as a three-dimensional video, a two-dimensional video content (such as broadcast content) and complementary information (or complementary information obtained by decompressing compressed complementary information), or to record such a two-dimensional video content and such complementary information in an arrangement in which they are arranged to be reproducible as a three-dimensional video.

Moreover, examples of "the permission information" encompass a 3D conversion authorization key (encryption key) or information regarding license agreement for authorizing (i) use of the complementary information (or complementary information obtained by decompressing compressed complementary information) or the arrangement process information, or (ii) decompression of the compressed complementary information.

The information recording medium may be configured to further comprise: a substrate; at least one intermediate layer which is provided over the substrate; and a light transmitting layer which is provided over the substrate and is a layer positioned farthest from the substrate, the at least one recording layer being a plurality of recording layers which are provided over the substrate, each of the at least one intermediate layer being provided to intervene adjacent ones of the plurality of recording layers so that the plurality of recording layers are separated from each other, the plurality of recording layers being readable by use of reproduction light, at least one of the plurality of recording layers being a read only layer and at least another one of the plurality of recording layers being a recordable layer, the first information recording area being allotted to the read only layer, and the second information recording area being allotted to the recordable layer.

That is, it is preferable that the information recording medium according to the present invention is a hybrid optical information recording medium described above. In other words, the information recording medium according to the present invention may be configured such that at least one of the plurality of recording layers is a readable layer, and at least one of the others of the plurality of recording layers is a recordable layer, and that layer of the plurality of recording layers which is farthest from the substrate is a transparent layer.

The term "recordable layer" refers to either a layer (R layer) in which information is only additionally recordable or a layer (RE layer) in which information is rewritable.

The expression "only additionally recordable" means that information is readable and recordable, but not erasable.

In the information recording medium according to the present invention with this structure, it is preferable that the first information recording area is allotted to the read only layer, and the second information recording area is allotted to the recordable layer.

This is because the second information recording area for recording a two-dimensional video content obtained externally via broadcasting, Internet distribution, etc. should be allotted to the R layer or RE layer.

Moreover, by allotting the first information recording area to the ROM layer, it is possible to prevent a misoperation of erroneously overwriting the prerecorded complementary information (or arrangement process information) with another data.

Further, it is possible to prerecord the complementary information (or arrangement process information) in producing the information recording medium of the present invention. This makes it unnecessary for a user to record on the information recording medium the complementary information (or arrangement process information) somehow. Further, because the complementary information (or arrangement process information) is stored in the ROM layer, the recordable area in the second information recording area in the R layer and the RE layer can be spared for recording a broadcast content without being reduced by recording the complementary information (or arrangement process information).

The ROM layer is, for example, one on which (i) information is recorded with use of a train of embossed prepits or (ii) information is recorded with use of a laser.

Moreover, this configuration makes it possible to write information into the information recording medium during the production of a stamper. This makes it possible to perform mass distribution with lower cost and shorter time, compared with a case where information is distributed by means of the information recording medium in which the information is stored after the production of the information recording medium, or with a case the information is distributed via the Internet or the like.

Moreover, a method according to the present invention may be a method for reproducing a three-dimensional video by using data recorded on the information recording medium, said method comprising the steps of: carrying out a temporary storing process, in which, in a case where the two-dimensional video content is recorded on the second information recording area, the complementary information, which relates to the two-dimensional video content, is (i) read out from the first information recording area and then (ii) stored in a temporary memory; and carrying out a reproducing process, in which (i) the complementary information is read out from the temporary memory in which the complementary information has been stored in the temporary storing process, and the two-dimensional video content is read out from the second information recording area, (ii) the two-dimensional video content and the complementary information thus read out are arranged and synchronized so as to be reproducible as the three-dimensional video, and then (iii) the two-dimensional video content and the complementary information thus arranged and synchronized are reproduced as the three-dimensional video.

An information recording/reproducing device according to the present invention may be An information recording/reproducing device configured to record a three-dimensional video on and to reproduce the three-dimensional video recorded on the information recording medium, said information recording/reproducing device comprising: memory control means for (i) reading out, from the first information recording area, the complementary information relating to the two-dimensional video content, if the two-dimensional video content is recorded on the second information recording area and (ii) causing a temporary memory to store the complementary information thus read out; and reproduction control means for (i) reading out the complementary information stored in the temporary memory and the two-dimensional video content recorded on the second information recording area, (ii) arranging and synchronizing the two-dimensional video content and the complementary information so as to cause the two-dimensional video content and the complementary information to be reproducible as the three-dimensional video, and (iii) reproducing, as the three-dimensional video, the two-dimensional video content and the complementary information thus arranged and synchronized.

Here, assume that the two-dimensional video content is recorded on the second information recording area.

In this case, the temporary storing process in the method or the memory control means of the structure reads out from the first information recording area the complementary information relating to the 2-dimensional video content, and stores the complementary information in the temporary memory.

Next, the reproducing process of the method or the reproduction control means of the structure reads out (i) the complementary information from the temporary memory in which the complementary information is stored by the temporary storing process or the memory control means, and (ii) the two-dimensional video content from the second information recording area. Then, the reproducing process of the method or the reproduction control means of the structure arranges and synchronizes the two-dimensional video content and the complementary information so as to cause the two-dimensional video content and the complementary information to be reproducible as the three-dimensional video, and (iii) reproducing, as the three-dimensional video, the two-dimensional video content and the complementary information thus arranged and synchronized.

In this way, a three-dimensional video can be viewed by reading out from the information recording medium the complementary information and the 2-dimensional video associated with the complementary information.

A method according to the present invention may be a method for recording information on the information recording medium, said method comprising the steps of: (a) separating the two-dimensional video content and the compressed complementary information from an externally-obtained content; (b) causing a temporary memory to store the two-dimensional video content which has been separated from the externally-obtained content in the step (a); (c) decompressing the compressed complementary information, which has been separated from the externally-obtained content in the step (a), so as to obtain decompressed complementary information; and (d) carrying out a recording process, in which (i) the decompressed complementary information obtained in the step (c) is read out, and the two-dimensional video content is read out from the temporary memory in which the two-dimensional video content has been stored in the step (b) are read out, (ii) the two-dimensional video content and the decompressed complementary information thus read out are arranged so as to be reproducible as the three-dimensional video, and (iii) the two-dimensional video content and the decompressed complementary information, which have thus arranged, are recorded on the second information recording area.

Moreover, an information recording/reproducing device according to the present invention may be an information recording/reproducing device configured to record a three-dimensional video on and to reproduce the three-dimensional video recorded on the information recording medium, said information recording/reproducing device comprising: information separating means for separating the two-dimensional video content and the compressed complementary information from an externally-obtained content that the information recording/reproducing device obtains externally; memory control means for causing a temporary memory to store the two-dimensional video content, which has been separated from the externally-obtained content by the information separating means; decompressing means for decompressing the compressed complementary information, which has been separated from the externally-obtained content by the information separating means, so as to obtain decompressed complementary information; and recording control means for (i) reading out the decompressed complementary information obtained by the decompressing means and the two-dimensional video content stored in the temporary memory, (ii) arranging the two-dimensional video content and the decompressed complementary information, which have been thus read out, such that the two-dimensional video content and the decompressed complementary information are reproducible as a three-dimensional video, and (iii) recording, on the second information recording area, the two-dimensional video content and the decompressed complementary information thus arranged.

Moreover, the three-dimensional-conversion unit according to the present invention may further comprises: memory control means for controlling a predetermined temporary memory to store information, the memory control means controlling the predetermined temporary memory to store the two-dimensional video content which has been separated from the externally-obtained content by the information separating means, and the arranging means adjusting the time difference by adjusting time required for reading out the two-dimensional video content stored in the predetermined temporary memory.

Furthermore, an information recording device may comprises: the three-dimensional-conversion unit; and recording control means for recording, on a predetermined information recording medium, the two-dimensional video content and the decompressed complementary information which have been arranged by the arranging means.

With there method and structures, the step of separating or the information separating means separates the two-dimensional video content and the compressed complementary information from the content obtained externally.

After that, (i) the step of causing a temporary memory to store or (ii) the memory control means causes the temporary memory to store the two-dimensional video content which has been separated from the externally-obtained content in the step of separating or by the information separating means.

Next, the step of decompressing or the decompressing means decompressing the compressed complementary information, which has been separated from the externally-obtained content by the step of separating or the information separating means, so as to obtain decompressed complementary information.

Next, (a) the step of carrying out a recording process or (b) the recording control means (i) reads out the decompressed complementary information obtained by the step of decompressing or decompressing means and the two-dimensional video content stored in the temporary memory by the step of causing the temporary memory to store or the memory control means, (ii) arranges the two-dimensional video content and the decompressed complementary information, which have been thus read out, such that the two-dimensional video content and the decompressed complementary information are reproducible as a three-dimensional video, and (iii) records, on the second information recording area, the two-dimensional video content and the decompressed complementary information thus arranged.

In this way, it is possible to record in the second information recording area the two-dimensional video content and the complementary information arranged in such a way that the two-dimensional video content and the complementary information can be reproduced as a three-dimensional video, the two-dimensional video content having been separated from the content obtained externally and the complementary information having been decompressed from the compressed complementary information separated from the content.

An information recording/reproducing device according to the present invention may be an information recording/reproducing device configured to record data on the information recording medium said information recording/reproducing device is configured to record the two-dimensional video content on the second information recording area based on the presetting information recorded on the first information recording area.

If it is tedious to preset the recording of a two-dimensional video content to be obtained externally via broadcasting, Internet distribution, etc., this configuration makes it possible to automatically create an information recording medium in which the two-dimensional video content is stored, simply by loading the information recording medium to an information recording/reproducing device compatible with the information recording medium, for example.

An information recording/reproducing device according to the present invention may be an information recording/reproducing device configured to record data on an information recording medium recited in claim 8, wherein: in a case where the invalidation information is recorded on the second information recording area, said information recording/reproducing device (i) determines that the presetting information, which is specified by the invalidation information as being invalid, is invalid and (ii) cancels the recording preset by the presetting information for recording the two-dimensional video content on the second information recording area.

If for example, the two-dimensional video content preset to be recorded by obtaining it externally via broadcasting, Internet distribution, etc., is not so interesting as expected by the user, this configuration, in which the invalidation information is stored in the information recording medium of the present invention makes it possible to prevent the information recording medium from storing the two-dimensional video content preset to be recorded by obtaining it externally via broadcasting, Internet distribution, etc.

An information recording/reproducing device according to the present invention may be an information recording/reproducing device configured to record data on the information recording medium, wherein: in a case where the permission information is recorded on the first information recording area, said information recording/reproducing device (i) arranges the two-dimensional video content and the complementary information such that the two-dimensional video content and the complementary information are reproducible as the three-dimensional video and (ii) records, on the second information recording area, the two-dimensional video content and the complementary information thus arranged (or a separated broadcast content or complementary information, the separated broadcast content having been separated from a content obtained externally, and the complementary information having been obtained by decompressing the compressed complementary information separated from the content obtained externally) thus arranged.

With this configuration, the permission information prerecorded in the information recording medium is information to indicate warranty to convert into a three-dimensional video the two-dimensional video content obtained externally via broadcasting, Internet distribution, or the like, that is, information that warrants user's 3D conversion of the two-dimensional video content.

Thus, if the information recording medium in which the permission information prerecorded in the first information recording area is used in converting the two-dimensional video content into three-dimensional video, it is possible for the user to perform the 3D conversion of the two-dimensional video content without worrying out a copyright, a neighboring right, etc.

Moreover, the complementary information recorded on the first information recording area of the information recording medium, in which the permission information has been recorded on the first information recording area, assures that the two-dimensional video content is created by a rightful broadcast station, a distribution site, or the like. It is therefore possible to carry out the 3D conversion of the two-dimensional video content in a way to satisfy user's preference as long as permitted by a service provided by the broadcast station, distribution site, or the like.

Moreover, the information recording medium may be configured such that the first information recording area is a read-only area.

In this configuration, the first information recording area is a read-only area (hereinafter, referred to as ROM area), that is, an area in which writing is not possible. Thus, it is possible to prevent a misoperation of erroneously overwriting the vide content with another data.

In the current circumstances, existing ROM standards are all for two-dimensional videos. Thus, recording a three-dimensional video to the ROM area is out of the ROM standards.

The above configuration, however, makes it possible to record in the ROM area the two-dimensional vide content as it is.

Thus, it is possible to perform 3-D conversion of the two-dimensional video easily to record or view the content as a three-dimensional content within the conventional ROM standards.

Moreover, the present invention does not make it compulsory for users to purchase complementary information to covert a two-dimensional video into a three-dimensional video, which complementary information is not necessary for a user who tends to suffer so-called "3D sickness" for example to feel dizzy in viewing a 3D image. The present invention makes it possible to perform 3-D video mass distribution by making it possible to supply an information recording medium allowing 3D video reproduction with low cost.

Moreover, the information recording medium according to the present invention may be configured such that the recording process information contains download information which is information for use in downloading the complementary information and recording the complementary information thus downloaded on the second information recording area.

An information recording/reproducing device according to the present invention may be an information recording/reproducing device configured to record data on the information recording medium, wherein: said information recording/reproducing device is configured to download the complementary information and to record the complementary information thus downloaded on the second information recording area, based on the download information which is recorded on the first information recording area.

With this configuration, it becomes possible to download the complementary information and to record the complementary information thus downloaded on the second information recording area, based on the download information.

The "download information" may be various information such as (i) information regarding rules of the vide content such as data format, compression format, etc. of the video content, (ii) URL (Uniform Resource Locator) indicating a distributor of the video content.

Moreover, the information recording medium according to the present invention may be configured such that the recording process information contains arrangement process information, which is information for use in (i) arranging the video content and the complementary information such that the video content and the complementary information are reproducible as the three-dimensional video and (ii) recording, on the second information recording area, the video content and the complementary information thus arranged.

An information recording/reproducing device according to the present invention may be an information recording/reproducing device configured to record data on an information recording medium recited in claim 21, wherein: based on the arrangement process information recorded on the first information recording area, said information recording/reproducing device (i) arranges the video content, which has been read out from the first information recording area, and the complementary information, which relates to the video content, such that the video content and the complementary information are reproducible as the three-dimensional video, and (ii) records, on the second information recording area, the video content and the complementary information thus arranged.

With this configuration, it becomes possible to record on the second information recording area the video content and the complementary information arranged based on the arrangement process information in such a way that the video content and the complementary information can be reproduced as a three-dimensional video.

By recording in the secondary information recording area the two-dimensional video content and the complementary information thus arranged, the three-dimensional video can be reproduced without the need of reading out and then temporarily storing the complementary information in order to perform the three-dimensional video reproduction. This allows to save recording capacities of a memory or hard disc provided to an information recording/reproducing device for the information recording medium of the present invention.

Here, the "arrangement process" is a process to (i) divide complementary information into divided pieces of the complementary information, and (ii) insert, between one divided piece and a next divided piece of the complementary information, one information unit of a video content, which information unit corresponds to the one divided piece of the complementary information, thereby to arrange the divided pieces of the complementary information and the information units of the video content alternatively. With such an arrangement process, a two-dimensional video content as it is can be recorded in a way that the two-dimensional video content can be reproduced stereoscopically.

Moreover, the "arrangement process information" may be data for use in the arrangement process, such as data indicating recording start positions and recording end positions of the respective divided pieces of the complementary information and the respective information units of the video content to be thus alternatively arranged. As one alternative, the "arrangement process information" may be an arrangement process program for performing a process for (i) providing a recording space between the one divided piece and the next divided piece of the complementary information, and (ii) inserting the piece of the information unit of the video content, which information unit relates to the one divided piece, thereby making the alternative arrangement of the respective divided pieces of the complementary information and the respective information units of the video content.

The information recording medium according to the present invention may be configured such that the recording process information contains a decompressing program which is a program for use in decompressing the complementary information, if the complementary information has been compressed.

An information recording/reproducing device according to the present invention may be an information recording/reproducing device configured to record data on the information recording medium where: said information recording/reproducing device is configured to decompress the complementary information, which has been compressed, by use of the decompressing program recorded on the first information recording area.

With this configuration, the compressed complementary information relating to the video content is decompressed by using the decompressing program recorded in the first information recording area, thereby making it possible to substantially realize easy 3-D conversion and recording of a three-dimensional video prepared by 3-D conversion of a two-dimensional video content.

Furthermore, with this configuration, it becomes possible to read out the decompressing program from the information recording medium of the present invention, decompress the compressed complementary information, and read out the video content relating to the compressed complementary information. Thus, with this configuration, it becomes possible to view a three-dimensional video prepared by 3-D conversion of a two-dimensional video content.

Further, the decompressed complementary information can be distributable. Thus, with this configuration, the 3-D conversion of a two-dimensional video content into a three-dimensional video to be recorded or viewed can be performed easily, while avoiding a significant increase in distributed information amount associated in 3-D conversion. For example, in case of MPEG, it is possible to compress the complementary information without image quality deterioration, provided that compression rate is kept approximately in a range of 1/50 to 1/200.

Examples of the "compression format" mainly encompass: a JPEG format, which compresses a still image by carrying out DCT for each unit of pixel or pixel block so as to cut off, for example, data of a color change and a high-frequency component; and a MPEG format, which compresses a moving image by carrying out a motion compensation process in a time direction. Examples of the MPEG format encompass, in addition to MPEG1 and MPEG2, MPEG4, which is used as a standard in, for example, H.264, Windows, QuickTime, and DivX.

In a particular case of a 3D video utilizing parallax between a left eye video and a right eye video wherein a video content is for the right eye video and complementary information is for the left eye video, it is preferable to carry out an image compression in the MPEG format with use of information on a difference between the left eye video and the right eye video. With this arrangement, it is possible to increase a 3D video compression ratio. This can significantly suppress the increase in the distributed information amount.

Here, for example, there is a case that converting a video content into a three-dimensional video falls under editing the video content, or the like act.

Thus, the conversion of a video content into a three-dimensional video is associated with such a subsidiary problem that for example, the conversion of a video content into a three-dimensional video might require precaution not to infringe a copyright, a neighboring right, etc. of the video content.

In view of this, it is necessary to develop a scheme or the like to allow a user to perform the conversion of a video into a three-dimensional video without worrying out a copyright, a neighboring right, etc.

To encounter this problem, the information recording medium according to the present invention may be configured such that permission information is recorded on the first information recording area in advance, the permission information indicating that conversion of the two-dimensional video content into the three-dimensional video is permitted.

An information recording/reproducing device according to the present invention may be an information recording/reproducing device configured to record data on the information recording medium wherein: in a case where it is confirmed that the permission information, which is valid, is recorded on the first information recording area, said information recording/reproducing device (i) arranges the video content, which is permitted by the permission information to be converted into the three-dimensional video, and the complementary information, which relates to the video content, such that the video content and the complementary information are reproducible as the three-dimensional video and (ii) records, on the second information recording area, the video content and the complementary information thus arranged.

With this configuration, the permission information prerecorded in the information recording medium is information to indicate warranty to convert into a three-dimensional video the two-dimensional video content obtained externally via broadcasting, Internet distribution, or the like, that is, information that warrants user's 3D conversion of the two-dimensional video content.

Thus, if the information recording medium in which the permission information prerecorded in the first information recording area is used in converting the two-dimensional video content into three-dimensional video, it is possible for the user to perform the 3D conversion of the two-dimensional video content without worrying out a copyright, a neighboring right, etc.

Moreover, the complementary information recorded on the first information recording area of the information recording medium, in which the permission information has been recorded on the first information recording area, assures that the two-dimensional video content is created by a rightful broadcast station, a distribution site, or the like. It is therefore possible to carry out the 3D conversion of the two-dimensional video content in a way to satisfy user's preference as long as permitted by a service provided by the broadcast station, distribution site, or the like.

The "3D conversion or conversion into a three-dimensional video" is, for example, to reproduce, as a three-dimensional video, a video content and complementary information (or complementary information obtained by decompressing compressed complementary information), or to record such a two-dimensional video content and such complementary information in an arrangement in which they are arranged to be reproducible as a three-dimensional video.

Moreover, examples of "the permission information" encompass a 3D conversion authorization key (encryption key) or information regarding license agreement for authorizing (i) use of the complementary information (or complementary information obtained by decompressing compressed complementary information) or the arrangement process information, or (ii) decompression of the compressed complementary information.

The information recording medium according to the present invention may further comprises: a substrate; at least one intermediate layer which is provided over the substrate; and a light transmitting layer which is provided over the substrate and is a layer positioned farthest from the substrate, the at least one recording layer being a plurality of recording layers which are provided over the substrate, each of the at least one intermediate layer being provided to intervene adjacent ones of the plurality of recording layers so that the plurality of recording layers are separated from each other, the plurality of recording layers being readable by use of reproduction light, at least one of the plurality of recording layers being a read only layer and at least another one of the plurality of recording layers being a recordable layer, the first information recording area being allotted to the read only layer, and the second information recording area being allotted to the recordable layer.

Hereinafter, a rewritable information recording area is referred to as an RE area. A read-only information recording area, that is, only readable information recording area is referred to as a ROM area. A information recording area in which information is additionally recordable is referred to as a R area.

It is preferable that the information recording medium according to the present invention is a so-called hybrid optical information recording medium. That is, the information recording medium according to the present invention may be configured such that at least one of the plurality of recording layers is a readable layer, and at least one of the others of the plurality of recording layers is a recordable layer, and that layer of the plurality of recording layers which is farthest from the substrate is a transparent layer. Examples of the "recordable layer" encompass an R layer and an RE layer.

In the information recording medium according to the present invention with this structure, it is preferable that the first information recording area is allotted to the read only layer, and the second information recording area is allotted to the recordable layer.

This is because the second information recording area for recording complementary information and/or a video content read out the first information recording area should be allotted to the R layer or RE layer.

Moreover, by allotting the first information recording area to the ROM layer, it is possible to prevent a misoperation of erroneously overwriting the prerecorded complementary information (or arrangement process information) with another data.

Further, it is possible to prerecord the video content (or recording process information) in producing the information recording medium of the present invention. This makes it unnecessary for a user to record on the information recording medium the video content (or recording process information) somehow. Further, because the video content (or recording process information) is stored in the ROM layer, the recordable area in the second information recording area in the R layer and the RE layer can be spared for recording a broadcast content without being reduced by recording the video content (or recording process information).

The ROM layer is, for example, one on which (i) information is recorded with use of a train of embossed prepits or (ii) information is recorded with use of a laser.

With the above configuration, there is an advantage on a side of a manufacturer of the information recording medium that a video content, recording process information, or permission information and the like can be changed easily during production of the information recording medium. This makes it possible to mass distribute the information recording medium with low cost.

Moreover, a method according to the present invention may be a method for reproducing a three-dimensional video recorded on an information recording medium recited in any one of claims 18 through 24, the method comprising the steps of: carrying out a temporary storing process, in which, in a case where the complementary information is recorded on the second information recording area, the complementary information is (i) read out from the second information recording area and (ii) stored in a temporary memory; and carrying out a reproducing process, in which (i) the complementary information is read out from the temporary memory in which the complementary information has been stored in the temporary storing process, and the video content is read out from the first information recording area, (ii) the video content and the complementary information thus read out are arranged and synchronized so as to be reproducible as the three-dimensional video, and then (iii) the video content and the complementary information thus arranged and synchronized are reproduced as the three-dimensional video.

Moreover, an information recording/reproducing device according to the present invention may be an information recording/reproducing device configured to record a three-dimensional video on and to reproduce the three-dimensional video recorded on an information recording medium recited in any one of claims 18 through 24, said information recording/reproducing device comprising: memory control means for (i) reading out, from the second information recording area, the complementary information, if the complementary information is recorded on the second information recording area, and (ii) causing a temporary memory to store the complementary information thus read out; and reproduction control means for (i) reading out the complementary information stored in the temporary memory and the video content recorded on the first information recording area, (ii) arranging and synchronizing the video content and the complementary information so as to cause the video content and the complementary information to be reproducible as the three-dimensional video, and (iii) reproducing, as the three-dimensional video, the video content and the complementary information thus arranged and synchronized.

Here, the step of carrying out a temporary storing process in the method or the memory control means of the structure (i) reads out, from the second information recording area, the complementary information, if the complementary information is recorded on the second information recording area, and (ii) causes a temporary memory to store the complementary information thus read out.

After that, the step of carrying out a reproducing process in the method or the reproduction control means of the structure (i) reads out the complementary information stored in the temporary memory and the video content recorded on the first information recording area, (ii) arranges and synchronizes the video content and the complementary information so as to cause the video content and the complementary information to be reproducible as the three-dimensional video, and (iii) reproduces, as the three-dimensional video, the video content and the complementary information thus arranged and synchronized.

With these arrangements, it is possible to read out from the information recording medium the complementary information and the video content associated with the complementary information so as to view a three-dimensional video of the video content.

Moreover, an information recording/reproducing device according to the present invention may be an information recording/reproducing device configured to record data on the information recording medium, wherein: said information recording/reproducing device is configured to record the complementary information on the second information recording area based on the recording process information recorded on the first information recording area.

With this configuration, the complementary information for converting a video content into a three-dimensional video can be recorded together with the video content into the second information recording area based on the recording process information in such a manner that the video content and the complementary information are arranged to be reproducible as a three-dimensional video, the recording process information being information for recording the complementary information into the second information recording area.

By configuring such that the video content and the complementary information thus arranged are recorded in the secondary information recording area based on the recording process information, the three-dimensional video can be reproduced without the need of reading out and then temporarily storing the complementary information in order to perform the three-dimensional video reproduction. This allows to save recording capacities of a memory or hard disc provided to an information recording/reproducing device for the information recording medium of the present invention.

A method according to the present invention may be a method for recording a three-dimensional video on the information recording medium, the method comprising the steps of: (a) decompressing the complementary information, if the complementary information has been compressed, so as to obtain decompressed complementary information; (b) causing a temporary memory to store the decompressed complementary information; and (c) carrying out a recording process, in which (i) the decompressed complementary information is read out from the temporary memory in which the decompressed complementary information has been stored in the step (b), and the video content is read out from the first information recording area, (ii) the video content and the decompressed complementary information thus read out are arranged such that the video content and the decompressed complementary information are reproducible as a three-dimensional video, and (iii) the video content and the decompressed complementary information, which have thus arranged, are stored in the second information recording area.

Moreover, an information recording/reproducing device according to the present invention may be an information recording/reproducing device configured to record a three-dimensional video on and to reproduce the three-dimensional video recorded on the information recording medium, said information recording/reproducing device comprising: decompressing means for decompressing the complementary information, if the complementary information has been compressed, so as to obtain decompressed complementary information; memory control means for causing a temporary memory to store the decompressed complementary information; and recording control means for (i) reading out the decompressed complementary information stored in the temporary memory and the video content recorded on the first information recording area, (ii) arranging the video content and the decompressed complementary information, which have been thus read out, such that the video content and the decompressed complementary information are reproducible as the three-dimensional video, and (iii) recording, on the second information recording area, the video content and the decompressed complementary information thus arranged.

According to the method or the structure, the step of decompressing the complementary information or the decompressing means decompresses the compressed complementary information.

After that, (i) the step of causing a temporary memory to store the decompressed complementary information, or (ii) the memory control means causes a temporary memory to store the decompressed complementary information.

After that, (i) the step of carrying out a recording process or (ii) the recording control means performs (i) reading out the decompressed complementary information stored in the temporary memory and the video content recorded on the first information recording area, (ii) arranging the video content and the decompressed complementary information, which have been thus read out, such that the video content and the decompressed complementary information are reproducible as the three-dimensional video, and (iii) recording, on the second information recording area, the video content and the decompressed complementary information thus arranged.

With these arrangements, a video content prerecorded in the first information recording area and the complementary information prepared by decompressing compressed complementary information can be recorded in the second information recording area in such a way that the video content and the complementary information are arranged to be reproducible as a three-dimensional video.

It should be noted that the means, the functions, the processes, the steps, and the operations in the information recording/reproducing device, the method for reproducing, and the method for recording may be realized by means of computer. In such a case, the scope of the present invention encompasses (i) an information processing program for causing a computer to operate as the means, to realize the functions, or to perform the processes, the steps, or the operations, so as to realize the information recording/reproducing device, the method for reproducing, or the method for recording, and (ii) a computer-readable recording medium in which the information processing program is stored.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the complementary information (such as the left-eye video information, +α data) for realizing the 3D conversion may not be actual video data, but may be information on difference to the right-eye video information. In the first place, it is not necessary that the complementary information be information regarding the left-eye video information. It is only required that the complementary information be information for realizing conversion of a two-dimensional video into a three-dimensional video.

INDUSTRIAL APPLICABILITY

The present invention is widely applicable to optical information recording media such as CD-ROM, MO, MD, digital video discs, CD-R, and Blu-Ray, and to information recording/reproducing devices compatible with such an optical information recording medium. Moreover, the present invention is widely applicable to magnetic recording media, which are magnetically recordable, optically or thermally assisted magnetic recording media, which perform magnetic recording with assistance from light or heat, and to information recording/reproducing devices compatible with these magnetic recording media.

REFERENCE SIGNS LIST

1: 3D video viewing system (information recording/reproducing device)
2: TV program video (two-dimensional video content)
2': 2D moving image (video content, two-dimensional video)
3: +α moving image (complementary information)
6R: Right eye video (video content, two-dimensional video content)
6L: Left eye video (complementary information)
10: Light transmitting layer
20: First information recording layer (read only layer, recording layer)
120: First information recording layer (read only layer, recording layer)
20A: First information recording area (read only area)
20B: Third information recording area (first information recording area, read only area)
30: Intermediate layer
40: Second information recording layer (recordable layer, recording layer)
40A: Content recording area (second information recording area)
40B: Invalidation information recording area (second information recording area)
40C: 3D conversion complementary information recording space (second information recording area)
40D: 2D video recording space (second information recording area)
50: Substrate
60: Third information recording layer (recordable layer, recording layer)
200: Optical disc (information recording medium)
201: Optical disc (information recording medium)
100: Reproducing system (information recording/reproducing device)
116: Memory (temporary memory)
121: Information separating section (information separating means)
122: 3D conversion complementary information decompressing section (decompressing means)
124: Cache memory (temporary memory)
125: 3D data integrating section (recording control means, arranging means)
127: Internet terminal device (decompressing means)
130: 3D conversion unit (three-dimensional-conversion unit)
1001: Information recording/reproducing device
1002: Information recording/reproducing device
1003: Information recording/reproducing device
1151: Memory control section (memory control means, reproduction control means)
1154: Writing control section (recording control means)
L1 through L4: Complementary information for preparing left eye video (complementary information)
L1' through L4': left eye video information (complementary information)
P: TV program (two-dimensional video content)
P': 2D video content (video content, two-dimensional video)
R1 through R4: Right eye video information (two-dimensional video content)
R1' through R4': Complementary information for preparing right eye video (video content, two-dimensional video)

The invention claimed is:

1. A non-transitory information recording medium comprising:
    at least one recording layer, which is at least readable to read out information therefrom, the at least one recording layer to which a plurality of information recording areas are allotted,
    the plurality of information recording areas including a first information recording area and a second information recording area,
    the first information recording area being an area on which complimentary information and presetting information are recorded in advance, the complementary information being information for use in converting two-dimensional video content into a three-dimensional video, and the presetting information being information for use in presetting a recording of the two-dimensional video content relating to the complementary information on the second information recording area, and the second information recording area being an area on which the two-dimensional video content relating to the complementary information is recordable.

2. The non-transitory information recording medium as set forth in claim 1, wherein:

the first information recording area is a read-only area.

3. The non-transitory information recording medium as set forth in claim 1, wherein:

an arrangement process information is recorded on the first information recording area in advance, the arrangement process information being information for use in (i) arranging the two-dimensional video content and the complementary information such that the two-dimensional video content and the complementary information are reproducible as the three-dimensional video and (ii) recording, on the second information recording area, the two-dimensional video content and the complementary information thus arranged.

4. The non-transitory information recording medium as set forth in claim 1, wherein:

presetting information is recorded on the first information recording area in advance, the presetting information being information for use in presetting a recording of the two-dimensional video content on the second information recording area.

5. The non-transitory information recording medium as set forth in claim 4, wherein:

the second information recording area has an invalidation information recording area on which invalidation information is recordable, the invalidation information being information for use in canceling the recording preset by the presetting information for recording the two-dimensional video content on the second information recording area.

6. The non-transitory information recording medium as set forth in claim 1, wherein:

permission information is recorded on the first information recording area in advance, the permission information indicating that conversion of the two-dimensional video content into the three-dimensional video is permitted.

7. The non-transitory information recording medium as set forth in claim 1, further comprising:

a substrate;

at least one intermediate layer which is provided over the substrate; and a light transmitting layer which is provided over the substrate and is a layer positioned farthest from the substrate, the at least one recording layer being a plurality of recording layers which are provided over the substrate, each of the at least one intermediate layer being provided to intervene adjacent ones of the plurality of recording layers so that the plurality of recording layers are separated from each other, the plurality of recording layers being readable by use of reproduction light, at least one of the plurality of recording layers being a read only layer and at least another one of the plurality of recording layers being a recordable layer, the first information recording area being allotted to the read only layer, and the second information recording area being allotted to the recordable layer.

8. A method for reproducing a three-dimensional video by using data recorded on the non-transitory information recording medium recited in claim 1, said method comprising the steps of:

carrying out a temporary storing process, in which, in a case where the two-dimensional video content is recorded on the second information recording area, the complementary information, which relates to the two-dimensional video content, is (i) read out from the first information recording area and then (ii) stored in a temporary memory; and carrying out a reproducing process, in which (i) the complementary information is read out from the temporary memory in which the complementary information has been stored in the temporary storing process, and the two-dimensional video content is read out from the second information recording area, (ii) the two-dimensional video content and the complementary information thus read out are arranged and synchronized so as to be reproducible as the three-dimensional video, and then (iii) the two-dimensional video content and the complementary information thus arranged and synchronized are reproduced as the three-dimensional video.

9. An information recording/reproducing device configured to record a three-dimensional video on and to reproduce the three-dimensional video recorded on the non-transitory information recording medium recited in claim 1, said information recording/reproducing device comprising:

a memory control processor configured or programmed to (i) read out, from the first information recording area, the complementary information relating to the two-dimensional video content, if the two-dimensional video content is recorded on the second information recording area and (ii) cause a temporary memory to store the complementary information thus read out; and a reproduction control processor configured or programmed to (i) read out the complementary information stored in the temporary memory and the two-dimensional video content recorded on the second information recording area, (ii) arrange and synchronize the two-dimensional video content and the complementary information so as to cause the two-dimensional video content and the complementary information to be reproducible as the three-dimensional video, and (iii) reproduce, as the three-dimensional video, the two-dimensional video content and the complementary information thus arranged and synchronized.

10. An information recording/reproducing device configured to record data on the non-transitory information recording medium recited in claim 4, wherein:

said information recording/reproducing device is configured to record the two-dimensional video content on the second information recording area based on the presetting information recorded on the first information recording area.

11. An information recording/reproducing device configured to record data on the non-transitory information recording medium recited in claim 5, wherein:

in a case where the invalidation information is recorded on the second information recording area, said information recording/reproducing device (i) determines that the presetting information, which is specified by the invalidation information as being invalid, is invalid and (ii) cancels the recording preset by the presetting information for recording the two-dimensional video content on the second information recording area.

12. An information recording/reproducing device configured to record data on the non-transitory information recording medium recited in claim 6, wherein:
in a case where the permission information is recorded on the first information recording area, said information recording/reproducing device (i) arranges the two-dimensional video content and the complementary information such that the two-dimensional video content and the complementary information are reproducible as the three-dimensional video and (ii) records, on the second information recording area, the two-dimensional video content and the complementary information thus arranged.

13. A non-transitory information recording medium comprising:
at least one recording layer, which is at least readable to read out at least information therefrom, the at least one recording layer to which a plurality of information recording areas are allotted, wherein
the plurality of information recording areas including (a) a first information recording area on which (i) a video content, which is a two-dimensional video, and (ii) recording process information are recorded in advance and (b) a second information recording area on which information is recordable,
the recording process information being information for use in recording, on the second information recording area, complementary information for use in converting the video content into a three-dimensional video, the complementary information being recorded on the second information recording area in such a manner that the video content is reproducible as the three-dimensional video,
the recording process information contains arrangement process information, which is information for use in (i) arranging the video content and the complementary information such that the video content and the complementary information are reproducible as the three-dimensional video and (ii) recording, on the second information recording area, the video content and the complementary information thus arranged, and
the arrangement process information being information on an arrangement process of (i) dividing the complementary information into divided pieces of the complementary information, (ii) providing a recording space between one divided piece and a next divided piece of the complementary information, and then (iii) inserting, into the recording space, each of information units of a video content, which information unit corresponds to the one divided piece of the complementary information, thereby to alternately arrange the respective divided pieces of the complementary information and the respective information units of the video content.

14. The non-transitory information recording medium as set forth in claim 13, wherein:
the first information recording area is a read-only area.

15. The non-transitory information recording medium as set forth in claim 13, wherein:
the recording process information contains download information which is information for use in downloading the complementary information and recording the complementary information thus downloaded on the second information recording area.

16. The non-transitory information recording medium as set forth in claim 13, wherein:
the recording process information contains a decompressing program which is a program for use in decompressing the complementary information, if the complementary information has been compressed.

17. The non-transitory information recording medium as set forth in claim 13, wherein:
permission information is recorded on the first information recording area in advance, the permission information indicating that conversion of the video content into the three-dimensional video is permitted.

18. The non-transitory information recording medium as set forth in claim 13, further comprising:
a substrate;
at least one intermediate layer which is provided over the substrate; and
a light transmitting layer which is provided over the substrate and is a layer positioned farthest from the substrate,
the at least one recording layer being a plurality of recording layers which are provided over the substrate,
each of the at least one intermediate layer being provided to intervene adjacent ones of the plurality of recording layers so that the plurality of recording layers are separated from each other,
the plurality of recording layers being readable by use of reproduction light,
at least one of the plurality of recording layers being a read only layer and at least another one of the plurality of recording layers being a recordable layer,
the first information recording area being allotted to the read only layer, and
the second information recording area being allotted to the recordable layer.

19. A method for reproducing a three-dimensional video recorded on the non-transitory information recording medium recited in claim 13, the method comprising the steps of:
carrying out a temporary storing process, in which, in a case where the complementary information is recorded on the second information recording area, the complementary information is (i) read out from the second information recording area and (ii) stored in a temporary memory; and
carrying out a reproducing process, in which (i) the complementary information is read out from the temporary memory in which the complementary information has been stored in the temporary storing process, and the video content is read out from the first information recording area, (ii) the video content and the complementary information thus read out are arranged and synchronized so as to be reproducible as the three-dimensional video, and then (iii) the video content and the complementary information thus arranged and synchronized are reproduced as the three-dimensional video.

20. An information recording/reproducing device configured to record a three-dimensional video on and to reproduce the three-dimensional video recorded on the non-transitory information recording medium recited in claim 13, said information recording/reproducing device comprising:
a memory control processor configured or programmed to (i) read out, from the second information recording area, the complementary information, if the complementary information is recorded on the second information recording area, and (ii) cause a temporary memory to store the complementary information thus read out; and
a reproduction control processor configured or programmed to (i) read out the complementary information stored in the temporary memory and the video content recorded on the first information recording area, (ii)

arrange and synchronize the video content and the complementary information so as to cause the video content and the complementary information to be reproducible as the three-dimensional video, and (iii) reproduce, as the three-dimensional video, the video content and the complementary information thus arranged and synchronized.

21. An information recording/reproducing device configured to record data on the non-transitory information recording medium recited in claim 13, wherein:
said information recording/reproducing device is configured to record the complementary information on the second information recording area based on the recording process information recorded on the first information recording area.

22. An information recording/reproducing device configured to record data on the non-transitory information recording medium recited in claim 15, wherein:
said information recording/reproducing device is configured to download the complementary information and to record the complementary information thus downloaded on the second information recording area, based on the download information which is recorded on the first information recording area.

23. An information recording/reproducing device configured to record data on the non-transitory information recording medium recited in claim 13, wherein:
based on the arrangement process information recorded on the first information recording area, said information recording/reproducing device (i) arranges the video content, which has been read out from the first information recording area, and the complementary information, which relates to the video content, such that the video content and the complementary information are reproducible as the three-dimensional video, and (ii) records, on the second information recording area, the video content and the complementary information thus arranged.

24. An information recording/reproducing device configured to record data on the non-transitory information recording medium recited in claim 16, wherein:
said information recording/reproducing device is configured to decompress the complementary information, which has been compressed, by use of the decompressing program recorded on the first information recording area.

25. An information recording/reproducing device configured to record data on the non-transitory information recording medium recited in claim 17, wherein:
in a case where it is confirmed that the permission information, which is valid, is recorded on the first information recording area, said information recording/reproducing device (i) arranges the video content, which is permitted by the permission information to be converted into the three-dimensional video, and the complementary information, which relates to the video content, such that the video content and the complementary information are reproducible as the three-dimensional video and (ii) records, on the second information recording area, the video content and the complementary information thus arranged.

26. A method for recording a three-dimensional video on the non-transitory information recording medium recited in claim 13, the method comprising the steps of:
(a) decompressing the complementary information, if the complementary information has been compressed, so as to obtain decompressed complementary information;
(b) causing a temporary memory to store the decompressed complementary information; and
(c) carrying out a recording process, in which (i) the decompressed complementary information is read out from the temporary memory in which the decompressed complementary information has been stored in the step (b), and the video content is read out from the first information recording area, (ii) the video content and the decompressed complementary information thus read out are arranged such that the video content and the decompressed complementary information are reproducible as a three-dimensional video, and (iii) the video content and the decompressed complementary information, which have thus arranged, are stored in the second information recording area.

27. An information recording/reproducing device configured to record a three-dimensional video on and to reproduce the three-dimensional video recorded on the non-transitory information recording medium recited in claim 13, said information recording/reproducing device comprising:
a decompressing processor configured or programmed to decompress the complementary information, if the complementary information has been compressed, so as to obtain decompressed complementary information;
a memory control processor configured or programmed to cause a temporary memory to store the decompressed complementary information; and
a recording control processor configured or programmed to (i) read out the decompressed complementary information stored in the temporary memory and the video content recorded on the first information recording area, (ii) arrange the video content and the decompressed complementary information, which have been thus read out, such that the video content and the decompressed complementary information are reproducible as the three-dimensional video, and (iii) record, on the second information recording area, the video content and the decompressed complementary information thus arranged.

28. A three-dimensional-conversion unit configured to convert a two-dimensional video content into a three-dimensional video, said three-dimensional-conversion unit comprising:
an information separating processor configured or programmed to (i) separate, from an externally-obtained content which the three-dimensional-conversion unit obtains externally and which corresponds to a two-dimensional television, the two-dimensional video content and compressed complementary information which is information for use in converting the two-dimensional video content into the three-dimensional video and (ii) output the two-dimensional video content and the compressed complementary information thus separated from the externally-obtained content;
a decompressing processor configured or programmed to decompress the compressed complementary information, which has been outputted from the information separating processor, so as to obtain decompressed complementary information; and
an arranging processor configured or programmed to carry out an arrangement process to alternatingly arrange the two-dimensional video content and the decompressed complementary information such that the two-dimensional video content and the decompressed complementary information are reproducible as the three-dimensional video, the arrangement process being carried out by adjusting a time difference between (i) a time point at which the two-dimensional video content and the compressed complementary information are outputted from the information separating processor and (ii) a time point at which the decompressing processor finishes decompressing the compressed complementary information.

29. The three-dimensional-conversion unit as set forth in claim 28, further comprising:
a memory control processor configured or programmed to control a predetermined temporary memory to store information,
the memory control processor configured or programmed to control the predetermined temporary memory to store the two-dimensional video content which has been separated from the externally-obtained content by the information separating processor, and
the arranging processor configured or programmed to adjust the time difference by adjusting time required for reading out the two-dimensional video content stored in the predetermined temporary memory.

30. An information recording device comprising:
the three-dimensional-conversion unit recited in claim 28; and
a recording control processor configured or programmed to record, on a predetermined information recording medium, the two-dimensional video content and the decompressed complementary information which have been arranged by the arranging processor.

* * * * *